US012719692B2

(12) United States Patent
Tsuchida et al.

(10) Patent No.: US 12,719,692 B2
(45) Date of Patent: Aug. 25, 2026

(54) INFORMATION PROCESSING SYSTEM, DATA PROVIDING APPARATUS, DATA PROCESSING APPARATUS, DATA RECEIVING APPARATUS, METHOD, AND COMPUTER READABLE MEDIUM

(71) Applicant: NEC Corporation, Tokyo (JP)

(72) Inventors: Hikaru Tsuchida, Tokyo (JP); Haruna Fukuda, Tokyo (JP); Kengo Mori, Tokyo (JP); Toshiyuki Isshiki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 8 days.

(21) Appl. No.: 18/845,973

(22) PCT Filed: Mar. 23, 2022

(86) PCT No.: PCT/JP2022/013549
§ 371 (c)(1),
(2) Date: Sep. 11, 2024

(87) PCT Pub. No.: WO2023/181183
PCT Pub. Date: Sep. 28, 2023

(65) Prior Publication Data

US 2025/0202711 A1 Jun. 19, 2025

(51) Int. Cl.
*H04L 9/32* (2006.01)
*H04L 9/08* (2006.01)

(52) U.S. Cl.
CPC .......... *H04L 9/3236* (2013.01); *H04L 9/0869* (2013.01); *H04L 9/3247* (2013.01)

(58) Field of Classification Search
CPC ... H04L 9/3236; H04L 9/0869; H04L 9/3247; G06F 21/62; G06F 21/06
See application file for complete search history.

(56) References Cited

U.S. PATENT DOCUMENTS

2002/0194476 A1* 12/2002 Lewis .................. H04L 9/3247 713/169
2005/0138397 A1* 6/2005 Kusudo ............ H04N 21/43853 348/E5.006

(Continued)

FOREIGN PATENT DOCUMENTS

JP 2020-077256 A 5/2020
JP 2021-077223 A 5/2021

(Continued)

OTHER PUBLICATIONS

Suhail et al., "On the Role of Hash-Based Signatures in Quantum-Safe Internet of Things: Current Solutions and Future Directions", Jul. 2020, IEEE Internet of Things Journal, vol. 8, No. 1, pp. 1-17 (Year: 2020).*

(Continued)

*Primary Examiner* — Kenneth W Chang
(74) *Attorney, Agent, or Firm* — Sughrue Mion, PLLC

(57) ABSTRACT

A data providing apparatus sets a processing rule, sets predetermined random numbers, calculates a signature hash value corresponding to each of a plurality of data, generates a digital signature using the signature hash value, and transmits a data set, the digital signature, and the random numbers to a data processing apparatus. A data processing apparatus performs a process for processing processing-target data, calculates an after-processing hash value corresponding to each of the processing-target data, and transmits the already-processed data set, the after-processing hash value, and the digital signature to a data receiving apparatus. A data receiving apparatus calculates a verification hash value corresponding to each of the plurality of data by using the already-processed data set and the after-processing hash value, and verifies the verification hash value and the digital signature.

30 Claims, 23 Drawing Sheets

ORIGINAL DATA

| ROW | ADDRESS |
|---|---|
| 1 | TOKYO |
| 2 | TOKYO |
| 3 | KANAGAWA |
| 4 | KANAGAWA |
| 5 | OSAKA |

RANDOM NUMBER DATA

| ADDRESS | RANDOM NUMBER |
|---|---|
| TOKYO | $R_1$ |
| KANAGAWA | $R_2$ |
| OSAKA | $R_3$ |

(56) References Cited

U.S. PATENT DOCUMENTS

2005/0177495 A1* 8/2005 Crosson Smith ...... G06Q 40/02
705/39
2006/0053155 A1* 3/2006 Suga ...................... G06F 21/64
707/999.102
2008/0301451 A1* 12/2008 Parkinson ............ H04L 9/3236
713/176
2013/0138698 A1* 5/2013 Harada .............. G06F 16/2246
707/797
2020/0202345 A1* 6/2020 Zhang .................. H04L 9/3066

FOREIGN PATENT DOCUMENTS

JP 2021-081777 A 5/2021
WO 2021/245806 A1 12/2021

OTHER PUBLICATIONS

JP Office Communication for JP Application No. 2024-508905, mailed on Sep. 2, 2025 with English Translation.
International Search Report for PCT Application No. PCT/JP2022/013549, mailed on Jun. 21, 2022.
Yumiko Togashi et al., Proposal of Anonymization Signature Method for Verification of Anonymization, Computer Security Symposium 2021, Information Processing Society of Japan, Oct. 26-29, 2021, pp. 1-6.

* cited by examiner

| NAME | ADDRESS |
|---|---|
| AA | TOKYO |
| BB | TOKYO |
| CC | KANAGAWA |

ANONYMIZATION

| NAME | ADDRESS |
|---|---|
| AA | KANTO |
| BB | TOKYO |
| CC | JAPAN |

| | $c_1$ | ··· | $c_j$ | ··· | $c_{j'}$ |
|---|---|---|---|---|---|
| 1 | $a_{11}$ | ··· | $a_{1j}$ | ··· | $a_{1j'}$ |
| ··· | ··· | ··· | ··· | ··· | ··· |
| $i$ | $a_{i1}$ | ··· | $a_{ij}$ | ··· | $a_{ij'}$ |

COLUMN THAT IS NOT TO BE PROCESSED

COLUMN THAT IS TO BE PROCESSED

Fig. 13

Random Number Table

| Attribute Value of Layer 1 that $C_{j'}$ can take | Corresponding Random Number |
|---|---|
| ... | ... |
| $v$ | $r_v$ |
| ... | ... |

Fig. 15

| | $c_{j'}$ |
|---|---|
| 1 | $a_{1j'}$ |
| … | … |
| $i$ | $a_{ij'}$ |

→

| | $c_{j'}$ |
|---|---|
| 1 | $(p_{k_{1,j'}}, a_{1,j'}, h_{1,j'}, k_{1,j'})$ |
| … | … |
| $i$ | $(p_{k_{i,j'}}, a_{i,j'}, h_{i,j'}, k_{i,j'})$ |

Fig. 16

| | $c_{j'}$ |
|---|---|
| 1 | $a_{1j'}$ |
| … | … |
| $i$ | $a_{ij'}$ |

→

| | $c_{j'}$ |
|---|---|
| 1 | $h_{1,j',2}$ |
| … | … |
| $i$ | $(a_{ij'},\ h_{i,j',1})$ |

Fig. 18

| | $c_{j'}$ |
|---|---|
| $i$ | $a_{ij'}$ |
| … | … |
| $i'$ | $a_{i'j'}$ |

→

| | $c_{j'}$ |
|---|---|
| $i$ | $(p_{K_{i,j'}}, a_{i,j'} h_{i,j',k_{i,j'}})$ |
| … | … |
| $i'$ | $h_{i',j',\ell_{j'}}$ |

Fig. 21

| | Attribute #1 | Attribute #2 | Attribute #3 | ... | Attribute #n |
|---|---|---|---|---|---|
| Row #1 | Attribute Value #11 | Attribute Value #12 | Attribute Value #13 | ... | Attribute Value #1n |
| ... | ... | ... | ... | ... | ... |
| Row #m | Attribute Value #m1 | Attribute Value #m2 | Attribute Value #m3 | ... | Attribute Value #mn |

INFORMATION PROCESSING SYSTEM, DATA PROVIDING APPARATUS, DATA PROCESSING APPARATUS, DATA RECEIVING APPARATUS, METHOD, AND COMPUTER READABLE MEDIUM

This application is a National Stage Entry of PCT/JP2022/013549 filed on Mar. 23, 2022, the contents of all of which are incorporated herein by reference, in their entirety.

TECHNICAL FIELD

The present disclosure relates to an information processing system, a data providing apparatus, a data processing apparatus, a data receiving apparatus, a method, and a computer readable medium.

BACKGROUND ART

Recently, the use of anonymous processing information (anonymized data) on the premise that personal information should be appropriately protected has been increasing. When a researcher or the like uses anonymized data, it is important to ensure that the data has not been illegitimately altered (i.e., to ensure the validity of the data) in order to ensure the validity of the result of the use of the data. That is, when illegitimate data is used, knowledge obtained from the data will also be illegitimate, and thus measures and services that are provided based on the data may be inappropriate. A digital signature technology is one of technologies by which it is possible to verify that electronic data has not been altered. However, in the case where a digital signature is simply applied to data, when the data is anonymized, the data is altered by the anonymization, and therefore the validity thereof may not be verified.

In relation to such a technology, Non-patent Literature 1 discloses, as a validity verification technology for a data anonymization process, a method for verifying the validity of anonymization in which a sanitizable signature technology is applied. Non-patent Literature 1 discloses a method capable of reducing data exchanged between a signature creator, an anonymizer, and a verifier. In the technology disclosed in Non-patent Literature 1, random number data indicating random numbers corresponding to respective attribute values of original data, and a generalized hierarchical tree are managed separately from the original data, and a process for generating a signature, anonymizing, and verifying the signature are performed while referring to information on the random number data and the like.

CITATION LIST

Non Patent Literature

Non-patent Literature 1: Yumiko Togashi et al., "Proposal of Anonymization Signature Method for Verification of Anonymization", Computer Security Symposium 2021, 26-29 Oct. 2021

SUMMARY OF INVENTION

Technical Problem

In the technology disclosed in Non-patent Literature 1, the amount of transmitted data is reduced by adding a restriction that "when the value of a certain cell is processed, the same processing is performed on other cells having the same attribute value as the value of the certain cell". That is, in the technology disclosed in Non-patent Literature 1, there is a restriction that for a certain attribute, the same processing needs to be performed on each of the same attribute values even when they are recorded in different records (different cells). However, there are cases where it is necessary to perform different processing for different records even when they have the same attribute values for a certain attribute. Therefore, it is desired to eliminate such a restriction on processing for the same attribute values.

The present disclosure has been made in order to solve the above-described problem, and an object thereof is to provide a system, an apparatus, a method, and a program capable of reducing the amount of transmitted data without imposing a restriction on processing for the data.

Solution to Problem

An information processing system according to the present disclosure includes: a data providing apparatus configured to provide a data set including a plurality of data about at least one attribute; a data processing apparatus configured to process at least one of the plurality of data; and a data receiving apparatus configured to receive the data set of which at least one data has already been processed, in which

- the data providing apparatus includes: processing rule setting means for setting a processing rule for each of the at least one attribute; random number setting means for setting predetermined random numbers for states corresponding to a plurality of attribute values, the plurality of attribute values being values that processing-target data about an attribute to be processed can take under the processing rule; signature hash value calculation means for calculating, for each of the plurality of data, a signature hash value corresponding to the data; signature generation means for generating a digital signature by using the signature hash value; and first transmitting means for transmitting the data set, the digital signature, and the random number to the data processing apparatus, the signature hash value calculation means calculates, for the processing-target data, a first hash value for a data sequence obtained by using the processing-target data and the random number set for the attribute value corresponding to the processing-target data, calculates an intermediate hash value for a data sequence obtained by combining the processing-target data and the first hash value, and calculates a signature hash value corresponding to the processing-target data by using the intermediate hash value,
- the data processing apparatus includes: processing performing means for performing a process for processing the processing-target data; after-processing hash value calculation means for calculating, for each of the processing-target data, an after-processing hash value corresponding to the processing-target data; and second transmitting means for transmitting, to the data receiving apparatus, the data set of which the processing-target data has already been processed, the after-processing hash value corresponding to the processing-target data, and the digital signature, the after-processing hash value calculation means calculates, for the already-processed processing-target data, a first hash value for a data sequence obtained by using the not-yet-processed processing-target data and the random number set for an attribute value corresponding to this not-yet-processed processing-target data, calculates an intermediate hash value for a data sequence obtained by combining the not-yet-processed processing-target data and the first hash value, and calculates an after-processing hash value corresponding to the already-processed processing-target data by using the intermediate hash value, and the data receiving apparatus includes: verification hash value calculation means for calculating, for each of the plurality of data, a verification hash value corresponding to the data by using the data set of which the processing-target data has already been processed and the after-processing hash value; and verification means for verifying the verification hash value and the digital signature.

Further, a data providing apparatus according to the present disclosure includes: processing rule setting means for setting a processing rule for each of at least one attribute in a data set, the data set including a plurality of data about the at least one attribute; random number setting means for setting predetermined random numbers for states corresponding to a plurality of attribute values, the plurality of attribute values being values that processing-target data about an attribute to be processed can take under the processing rule; signature hash value calculation means for calculating, for each of the plurality of data, a signature hash value corresponding to the data; signature generation means for generating a digital signature by using the signature hash value; and transmitting means for transmitting the data set, the digital signature, and the random number to a data processing apparatus, the data processing apparatus being configured to process at least one of the plurality of data, in which the signature hash value calculation means calculates, for the processing-target data, a first hash value for a data sequence obtained by using the processing-target data and the random number set for the attribute value corresponding to the processing-target data, calculates an intermediate hash value for a data sequence obtained by combining the processing-target data and the first hash value, and calculates a signature hash value corresponding to the processing-target data by using the intermediate hash value.

Further, a data processing apparatus according to the present disclosure includes: processing performing means for performing a process for processing processing-target data about an attribute to be processed under a processing rule set for each of at least one attribute in a data providing apparatus, the data providing apparatus being configured to provide a data set including a plurality of data about the at least one attribute; after-processing hash value calculation means for calculating, for each of the processing-target data, an after-processing hash value corresponding to the processing-target data; and transmitting means for transmitting, to a data receiving apparatus, the data set of which the processing-target data has already been processed, the after-processing hash value corresponding to the processing-target data, and a digital signature generated in the data providing apparatus, the data receiving apparatus being configured to receive the data set of which at least one data has already been processed, in which the after-processing hash value calculation means calculates, for the already-processed processing-target data, a first hash value for a data sequence obtained by using the not-yet-processed processing-target data and a random number set for an attribute value corresponding to this not-yet-processed processing-target data, calculates an intermediate hash value for a data sequence obtained by combining the not-yet-processed processing-target data and the first hash value, and calculates an after-processing hash value corresponding to the already-processed processing-target data by using the intermediate hash value.

Further, a data receiving apparatus according to the present disclosure includes: verification hash value calculation means for calculating, by using a data set including a plurality of data about at least one attribute, and after-processing hash values each corresponding to a respective one of processing-target data, calculated in a data processing apparatus, verification hash values each corresponding to a respective one of the plurality of data, the data set being a data set of which processing-target data is data about an attribute to be processed under a processing rule set for a respective one of the at least one attribute in a data providing apparatus and has already been processed, the data providing apparatus being configured to provide the data set, and the data processing apparatus being configured to process at least one of the plurality of data; and verification means for verifying the verification hash value and a digital signature generated in the data providing apparatus.

Further, an information processing method according to the present disclosure includes, by a data providing apparatus configured to provide a data set including a plurality of data about at least one attribute, setting a processing rule for each of the at least one attribute; setting predetermined random numbers for states corresponding to a plurality of attribute values, the plurality of attribute values being values that processing-target data about an attribute to be processed can take under the processing rule; calculating, for each of the plurality of data, a signature hash value corresponding to the data by calculating, for the processing-target data, a first hash value for a data sequence obtained by using the processing-target data and the random number set for the attribute value corresponding to the processing-target data, calculating an intermediate hash value for a data sequence obtained by combining the processing-target data and the first hash value, and calculating a signature hash value corresponding to the processing-target data by using the intermediate hash value; generating a digital signature by using the signature hash value; and transmitting the data set, the digital signature, and the random number to a data processing apparatus, the data processing apparatus being configured to process at least one of the plurality of data, by the data processing apparatus, performing a process for processing the processing-target data; calculating, for each of the processing-target data, an after-processing hash value corresponding to the processing-target data by calculating, for the already-processed processing-target data, a first hash value for a data sequence obtained by using the not-yet-processed processing-target data and a random number set for an attribute value corresponding to this not-yet-processed processing-target data, calculating an intermediate hash value for a data sequence obtained by combining the not-yet-processed processing-target data and the first hash value, and calculating an after-processing hash value corresponding to the already-processed processing-target data by using the intermediate hash value; and transmitting the data set of which the processing-target data has already been processed, the after-processing hash value corresponding to the processing-target data, and the digital signature to a data receiving apparatus, the data receiving apparatus being configured to receive the data set of which at least one data has already been processed, and by the data receiving apparatus, calculating, for each of the plurality of data, a verification hash value corresponding to the data by using the data set of which the processing-target data has already been processed and the after-processing hash value; and verifying the verification hash value and the digital signature.

Further, a data providing method according to the present disclosure includes: setting a processing rule for each of at least one attribute in a data set, the data set including a plurality of data about the at least one attribute; setting predetermined random numbers for states corresponding to a plurality of attribute values, the plurality of attribute values being values that processing-target data about an attribute to be processed can take under the processing rule; calculating, for each of the plurality of data, a signature hash value corresponding to the data by calculating, for the processing-target data, a first hash value for a data sequence obtained by using the processing-target data and the random number set for the attribute value corresponding to the processing-target data, calculating an intermediate hash value for a data sequence obtained by combining the processing-target data and the first hash value, and calculating a signature hash value corresponding to the processing-target data by using the intermediate hash value; generating a digital signature by using the signature hash value; and transmitting the data set, the digital signature, and the random number to a data processing apparatus, the data processing apparatus being configured to process at least one of the plurality of data.

Further, a data processing method according to the present disclosure includes: performing a process for processing processing-target data about an attribute to be processed under a processing rule set for each of at least one attribute in a data providing apparatus, the data providing apparatus being configured to provide a data set including a plurality of data about the at least one attribute; calculating, for each of the processing-target data, an after-processing hash value corresponding to the processing-target data by calculating, for the already-processed processing-target data, a first hash value for a data sequence obtained by using the not-yet-processed processing-target data and a random number set for an attribute value corresponding to this not-yet-processed processing-target data, calculating an intermediate hash value for a data sequence obtained by combining the not-yet-processed processing-target data and the first hash value, and calculating an after-processing hash value corresponding to the already-processed processing-target data by using the intermediate hash value; and transmitting, to a data receiving apparatus, the data set of which the processing-target data has already been processed, the after-processing hash value corresponding to the processing-target data, and a digital signature generated in the data providing apparatus, the data receiving apparatus being configured to receive the data set of which at least one data has already been processed.

Further, a data receiving method according to the present disclosure includes: calculating, by using a data set including a plurality of data about at least one attribute, and after-processing hash values each corresponding to a respective one of processing-target data, calculated in a data processing apparatus, verification hash values each corresponding to a respective one of the plurality of data, the data set being a data set of which processing-target data is data about an attribute to be processed under a processing rule set for a respective one of the at least one attribute in a data providing apparatus and has already been processed, the data providing apparatus being configured to provide the data set, and the data processing apparatus being configured to process at least one of the plurality of data; and verifying the verification hash value and a digital signature generated in the data providing apparatus.

Further, a first program according to the present disclosure causes a computer to perform: a step of setting a processing rule for each of at least one attribute in a data set, the data set including a plurality of data about the at least one attribute; a step of setting predetermined random numbers for states corresponding to a plurality of attribute values, the plurality of attribute values being values that processing-target data about an attribute to be processed can take under the processing rule; a step of calculating, for each of the plurality of data, a signature hash value corresponding to the data by calculating, for the processing-target data, a first hash value for a data sequence obtained by using the processing-target data and the random number set for the attribute value corresponding to the processing-target data, calculating an intermediate hash value for a data sequence obtained by combining the processing-target data and the first hash value, and calculating a signature hash value corresponding to the processing-target data by using the intermediate hash value; a step of generating a digital signature by using the signature hash value; and a step of transmitting the data set, the digital signature, and the random number to a data processing apparatus, the data processing apparatus being configured to process at least one of the plurality of data.

Further, a second program according to the present disclosure causes a computer to perform: a step of performing a process for processing processing-target data about an attribute to be processed under a processing rule set for each of at least one attribute in a data providing apparatus, the data providing apparatus being configured to provide a data set including a plurality of data about the at least one attribute; a step of calculating, for each of the processing-target data, an after-processing hash value corresponding to the processing-target data by calculating, for the already-processed processing-target data, a first hash value for a data sequence obtained by using the not-yet-processed processing-target data and a random number set for an attribute value corresponding to this not-yet-processed processing-target data, calculating an intermediate hash value for a data sequence obtained by combining the not-yet-processed processing-target data and the first hash value, and calculating an after-processing hash value corresponding to the already-processed processing-target data by using the intermediate hash value; and a step of transmitting, to a data receiving apparatus, the data set of which the processing-target data has already been processed, the after-processing hash value corresponding to the processing-target data, and a digital signature generated in the data providing apparatus, the data receiving apparatus being configured to receive the data set of which at least one data has already been processed.

Further, a third program according to the present disclosure causes a computer to perform: a step of calculating, by using a data set including a plurality of data about at least one attribute, and after-processing hash values each corresponding to a respective one of processing-target data, calculated in a data processing apparatus, verification hash values each corresponding to a respective one of the plurality of data, the data set being a data set of which processing-target data is data about an attribute to be processed under a processing rule set for a respective one of the at least one attribute in a data providing apparatus and has already been processed, the data providing apparatus being configured to provide the data set, and the data processing apparatus being configured to process at least one of the plurality of data; and a step of verifying the verification hash value and a digital signature generated in the data providing apparatus.

Advantageous Effects of Invention

According to the present disclosure, it is possible to provide a system, an apparatus, a method, and a program capable of reducing the amount of transmitted data without imposing a restriction on processing for the data.

BRIEF DESCRIPTION OF DRAWINGS

FIG. 13 shows a table for explaining a process performed by a processing rule setting unit according to the second example embodiment;

FIG. 15 shows an example of a random number table according to the second example embodiment;

FIG. 16 shows tables for explaining a process performed by a data processing apparatus according to the second example embodiment;

FIG. 18 shows tables for explaining a process performed by a data processing apparatus according to the third example embodiment;

FIG. 21 shows tables for explaining a process performed by a data processing apparatus according to the fourth example embodiment;

EXAMPLE EMBODIMENT

Outline of Example Embodiment

Prior to describing an example embodiment, an outline of an example embodiment will be described. Note that although example embodiments will be described hereinafter, the following example embodiments are not intended to limit the invention specified by the claims. Further, not all combinations of features described in the example embodiments are essential for the means for solving the invention. Further, indices (alphabet) used in the following description may not be common throughout this specification.

Firstly, a general flow of data for signature verification involving anonymizing processing will be described. For example, original data (data set) is composed of at least one record. The record is a unit for a chunk of data. When the original data is medical data, the record contains at least one data about a certain patient. Further, for example, the original data is composed of at least one attribute. The attribute indicates the type of the data. Examples of attributes include a name, an address, an age, a gender, and the like corresponding to each record. Further, for example, the original data may be in a table format with rows and columns. In this case, each row may correspond to a record and each column may correspond to an attribute. Each data corresponding to each cell in the table format has an attribute value corresponding to the attribute. When the attribute is an “address”, the attribute value may indicate, for example, “Tokyo”, “Kanagawa”, “Osaka”, or the like Further, a data provider (i.e., a data providing entity) which provides original data (data set) may generate a signature (electronic signature; digital signature) for the original data by using a random number, and send the original data and the signature to a data processing entity. The data processing entity processes the original data (anonymizing processing), and sends the processed data and the signature to a data recipient (i.e., a data receiving entity). Examples of the processing (anonymizing processing) include “deletion” and “generalization”. The “deletion” is processing for deleting data (attribute value). The “generalization” is processing for generalizing (abstracting) an attribute value. The data recipient (data verifier) verifies the signature by using the processed data and the signature, and thereby verifies the validity of the processed data. The data recipient can use the processed data of which the validity has been verified.

A comparative example will be described hereinafter before describing this example embodiment.

Figure 1:
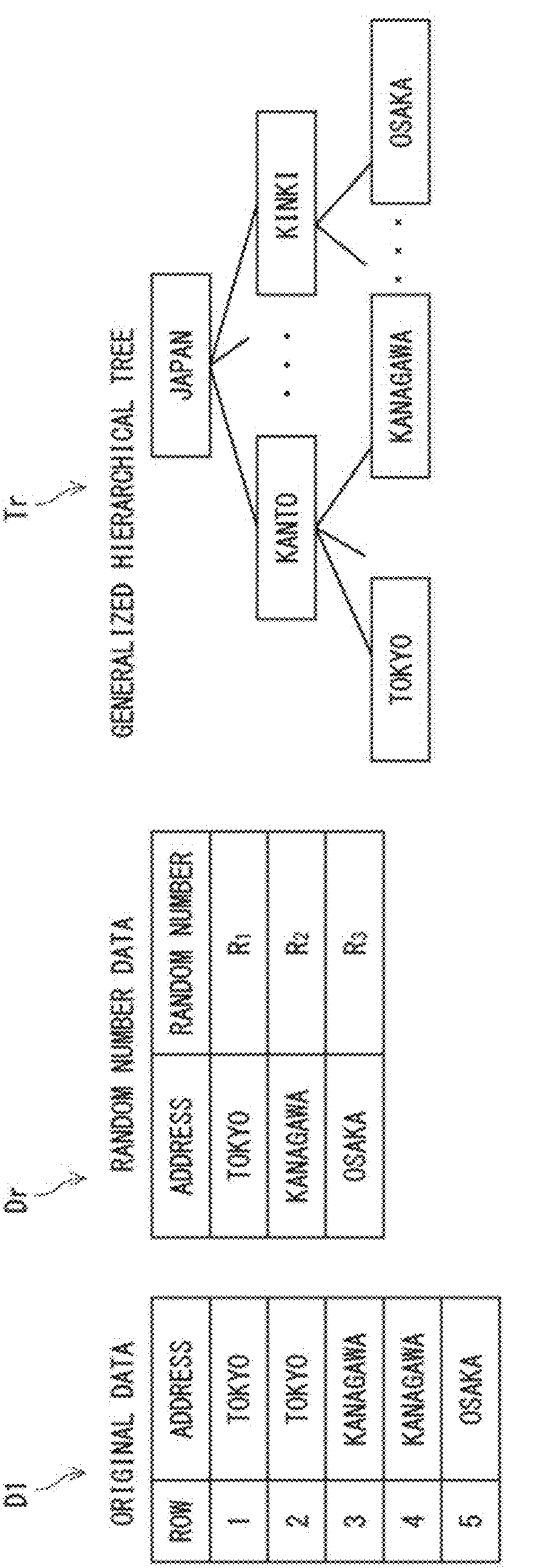
FIG. 1 shows a diagram and a table for explaining a technology used in a comparative example.
Figure 2:
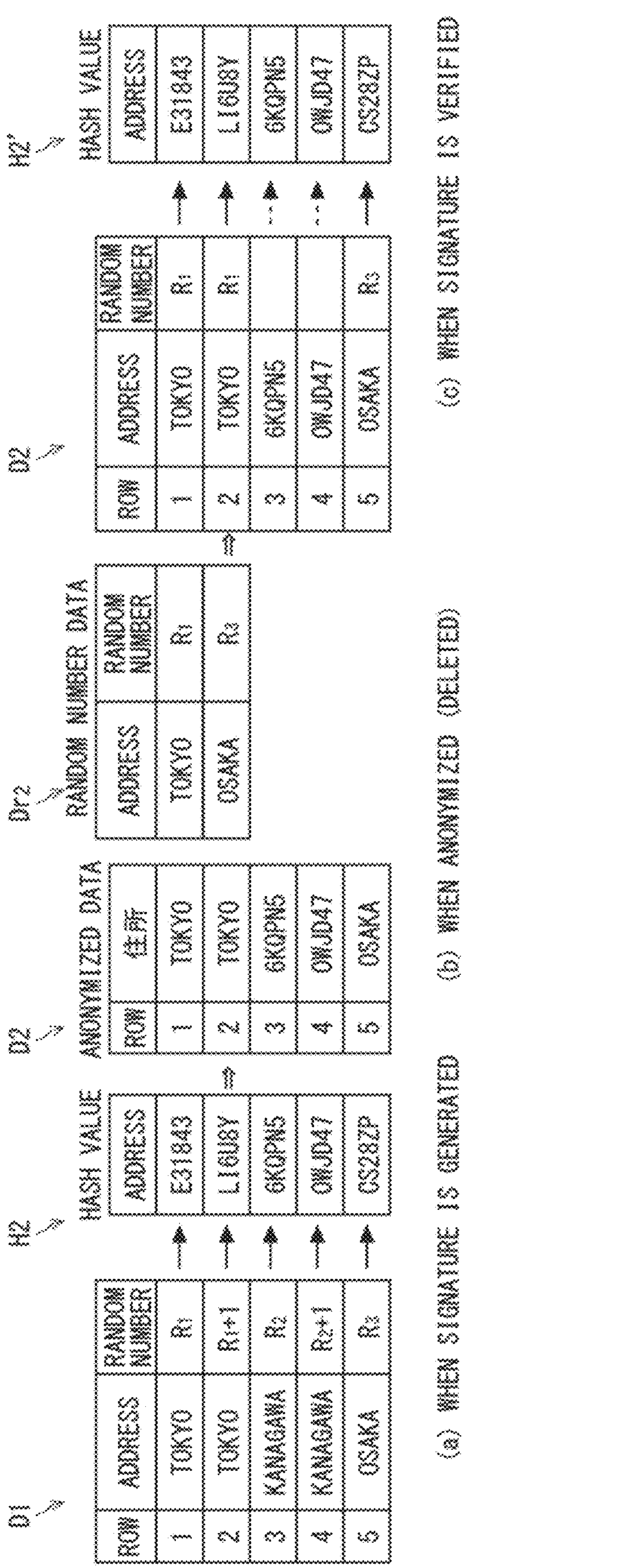
FIG. 2 shows tables for explaining the technology used in the comparative example.
Figure 3:
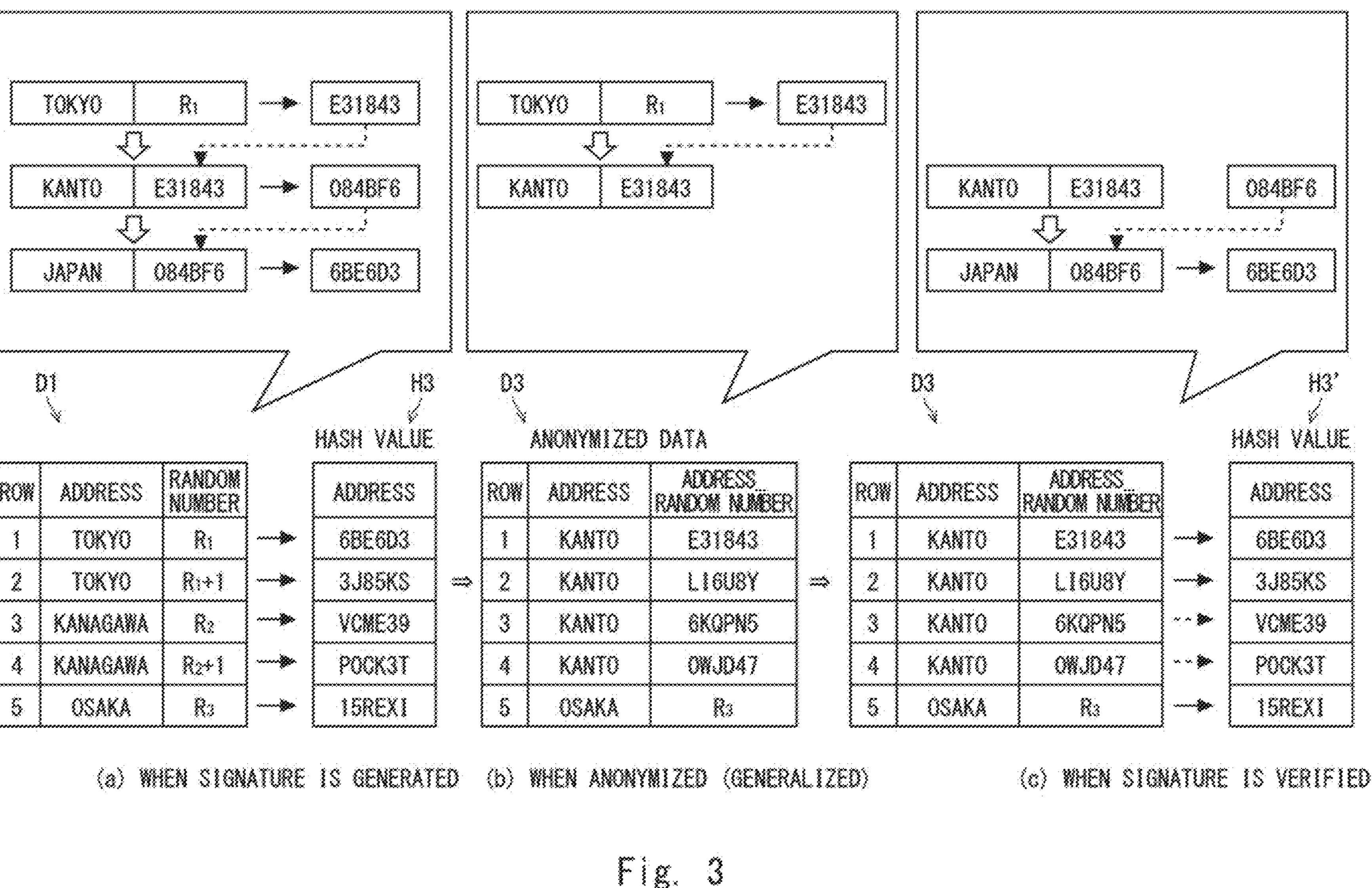
FIG. 3 shows diagrams and tables for explaining the technology used in the comparative example.

FIGS. 1 to 3 are diagrams and tables for explaining a technology used in the comparative example. The comparative example corresponds to the technology disclosed in Non-patent Literature 1. FIG. 1 shows data used in the comparative example. As shown in FIG. 1, original data D1, random number data Dr, and a generalized hierarchical tree Tr are used in the comparison example.

In the original data D1, one record is formed in each row. In the example shown in FIG. 1, the original data D1 has five records. Further, the original data D1 has at least one attribute. In the example shown in FIG. 1, the original data D1 has the attribute "Address". The attribute value in the first row is "Tokyo"; the attribute value in the second row is "Tokyo"; the attribute value in the third row is "Kanagawa"; the attribute value in the fourth row is "Kanagawa"; and the attribute value in the fifth row is "Osaka".

The random number data Dr indicates a random number corresponding to a possible attribute value for each attribute. The random number data Dr shown in FIG. 1 indicates random numbers corresponding to respective attribute values of the attribute "Address". The random number corresponding to "Tokyo" is $R_1$; the random number corresponding to "Kanagawa" is $R_2$; and the random number corresponding to "Osaka" is $R_3$. In the comparative example, the amount of transmitted data is reduced by preparing the random number data Dr in advance. Further, in the comparative example, the random number data Dr can be used by a data provider, a data processing entity, and a data recipient.

The generalized hierarchical tree Tr has a hierarchical structure (tree structure) and shows a rule for generalizing (abstracting) attribute values of the corresponding attribute. FIG. 1 shows a generalized hierarchical tree Tr corresponding to the attribute "Address". In the generalized hierarchical tree Tr, the higher a node is located in the hierarchical structure, the more generalized (abstracted) attribute value is disposed at the node. Further, the lower a node is located in the hierarchical structure, the less generalized (abstracted) attribute value is disposed at the node. The least abstracted (least generalized) attribute values are disposed at leaf nodes at the lowest layer (in a layer "1") in the hierarchical structure. On the other hand, the most abstracted (most generalized) attribute value is disposed at the root node at the highest layer (in a layer "l") in the hierarchical structure. Note that l indicates the height of the generalized hierarchical tree Tr. In the generalized hierarchical tree Tr shown in FIG. 1, l is three (l=3).

In the generalized hierarchical tree Tr shown in FIG. 1, leaf nodes in the layer "1" correspond to "Prefecture Names" such as "Tokyo" and "Kanagawa". Further, intermediate nodes in the layer "2" correspond to "Region Names" such as "Kanto (region)" and "Kinki (region)" which are more abstracted than the prefectures. Further, the root node in the layer "3" corresponds to a "Country Name" which is "Japan" and is the most abstracted. In the comparative example, the generalized hierarchical tree Tr is used by the data provider, the data processing entity, and the data recipient.

Note that as described above, in the comparative example, the amount of data is reduced by adding a restriction that "when the value of a certain cell is processed, the same processing is performed on other cells having the same attribute value as the value of the certain cell". That is, in the comparative example, there is a restriction that for a certain attribute, the same processing needs to be performed on each of the same attribute values even when they are recorded in different records (different cells).

FIG. 2 shows tables for explaining a case where deletion processing is performed according to the comparative example. When a signature is generated in (a) the data provider uses, for each cell, a hash value which is data obtained by combining an attribute value corresponding to the cell and a random number corresponding to this attribute value as the hash value of the cell. However, when there are a plurality of attribute values same as each other in the same attribute, the data provider generates a new random number from the random number corresponding to this attribute value and uses the generated new random number for the calculation of the hash value. For example, when a random number for an attribute value A is R and the attribute value A appears three times in the attribute, the random numbers R, R+1, and R+2 are combined for the respective attribute values. In this way, the data provider calculates a hash value H2 corresponding to each attribute. Then, one hash value is calculated from the hash value H2, and a signature for the calculated hash value is generated.

Further, when anonymization (deleting processing) is performed in (b), the data processing entity performs anonymizing processing according to the request of a data user within the scope of an anonymizing processing policy set by the signature generator. Regarding attributes that are not processed, the value of the original data is provided to the verifier as anonymized data. This feature also applies to the case shown in FIG. 3.

Further, the data processing entity replaces, for the attribute value to be deleted, a hash value which is data obtained by combining the attribute value to be deleted and the corresponding random number with the attribute value of this attribute to be deleted similarly to when the signature was generated. When a plurality of attribute values same as each other are included in the attribute, the data processing entity generates a new random number from the random number corresponding to the attribute value and uses the generated new random number for the calculation of the hash value. In the example shown in FIG. 2, the attribute value "Kanagawa" is the attribute value to be deleted. Anonymized data D2, and random number data Dr2 obtained by deleting the attribute value "Kanagawa", which is the attribute value to be deleted, and its random number from the original data are provided to the data recipient (data verifier).

Further, when the signature is verified in (c), the data recipient (data verifier) calculates, when there are random numbers for respective attribute values in the anonymized data D2 in the random number data Dr2 (i.e., they are not processed), a hash value in the same manner as being calculated when the signature was generated. In the example shown in FIG. 2, a hash value is calculated for each of the attribute values "Tokyo" and "Osaka" in the same manner as being calculated when the signature was generated. On the other hand, when there is no random number for each attribute value in the anonymized data D2 in the random number data Dr2 (i.e., when the processing (deleting) has already been performed), the data recipient uses the value of the anonymized data D2 as it is as the hash value corresponding to the cell. In the example shown in FIG. 2, regarding the attribute value "Kanagawa", the value of the anonymized data D2 is used as it is as the hash value of the cell.

In this way, the data recipient calculates a hash value H2' corresponding to the anonymized data D2. Then, the data recipient calculates one hash value from the hash value H2'. Then, the data recipient verifies the validity of the anonymized data D2 by determining whether or not a value obtained by decrypting the signature for the hash value H2 corresponding to the original data D1 by using a verification key matches with the hash value H2' corresponding to the anonymized data D2. When both the values match with each other, the verification of the anonymized data D2 succeeds, whereas when they do not match with each other, the verification of the anonymized data D2 fails.

FIG. 3 shows diagrams and tables for explaining a case where generalizing processing according to a comparative example is performed. When a signature is generated in (a), the data provider repeats, for each cell, generalization under a rule that "a hash value of data obtained by combining an attribute value and a random number is used as a random number for an attribute value in a layer one level higher in the generalized hierarchical tree Tr". Then, the data provider uses a hash value of data obtained by combining an attribute value at the highest layer and a random number corresponding thereto as the hash value of the cell.

For example, in the cell of the attribute value "Tokyo" in the first row, the data provider uses a hash value "E31843" of data obtained by combining the attribute value "Tokyo" and a random number $R_1$ corresponding thereto as a random number corresponding to the attribute value "Kanto" in the layer one level higher than that of the attribute value "Tokyo". Then, the data provider uses a hash value "084BF6" of data obtained by combining the attribute value "Kanto" and a random number "E31843" corresponding thereto as a random number corresponding to the attribute value "Japan" in the layer one level higher than that of the attribute value "Kanto".

Then, the data provider uses a hash value "6BE6D3" of data obtained by combining the attribute value "Japan" in the highest layer and a random number "084BF6" corresponding thereto as a hash value corresponding to the cell of the attribute "Address" in the first row. However, similarly to the deletion case, when there are a plurality of attribute values same as each other in the same attribute, the data provider generates a new random number from the random number corresponding to this attribute value and uses the generated new random number for the calculation of the hash value. In this way, the data provider calculates a hash value H3 corresponding to each attribute. Then, one hash value is calculated from the hash value H3, and a signature for the calculated hash value is generated.

Further, when anonymization (generalizing processing) is performed in (b), the data processing entity generalizes the data to be generalized in the same manner as being genialized when the signature was generated. That is, the data processing entity repeats, for each cell, generalization under a rule "a hash value of data obtained by combining an attribute value and a random number is used as a random number for an attribute value in a layer one level higher in the generalized hierarchical tree Tr". Then, the data processing entity generates a generalized attribute value and a random number corresponding to this attribute value.

In the example shown in FIG. 3, the attribute values "Tokyo" and "Kanagawa" are generalized to the attribute value "Kanto". The data processing entity generates anonymized data D3 in which the generalized attribute value is associated with a random number corresponding thereto. Note that regarding the cell of the un-generalized attribute value "Osaka", the attribute value "Osaka" is associated with a random number $R_3$ in the anonymized data D3. The random number $R_3$ is a random number corresponding to the attribute value "Osaka" in the random number data Dr. The anonymized data D3 and the after-generalization generalized hierarchical tree are provided to the data recipient (data verifier). In the after-generalization generalized hierarchical tree, attribute values before the generalization are deleted.

Further, (c) when the signature is verified in (c), the data recipient (data verifier) calculates, when there are random numbers for respective attribute value in the anonymized data D3 (i.e., they are not processed), a hash value in the same manner as being calculated when the signature was generated. In the example shown in FIG. 3, a hash value is calculated for the attribute value "Osaka" in the same manner as being calculated when the signature was generated. In contrast, when a random number sequence (hash value) is associated with the anonymized data D3, it has already been processed. In this case, the data recipient calculates, by using the random number sequence (hash value) associated with the attribute values of the attribute and the generalized hierarchical tree, a hash value of data obtained by combining the attribute value at the highest layer and a random number corresponding thereto.

For example, in the cell of the attribute value "Kanto" in the first row, the data recipient uses a hash value "084BF6" of data obtained by combining the attribute value "Kanto" and a corresponding random number "E31843" corresponding thereto as a random number corresponding to the attribute value "Japan" in the layer one level higher than that of the attribute value "Kanto". Then, the data recipient uses a hash value "6BE6D3" of data obtained by combining the attribute value "Japan" in the highest layer and a random number "084BF6" corresponding thereto as a hash value corresponding to the cell of the attribute "Address" in the first row.

In this way, the data recipient calculates a hash value H3' corresponding to the anonymized data D3. Then, the data recipient calculates one hash value from the hash value H3'. Then, the data recipient verifies the validity of the anonymized data D3 by determining whether or not a value obtained by decrypting the signature for the hash value H3 corresponding to the original data D1 by using the verification key matches with the hash value H3' corresponding to the anonymized data D3. When both the values match with each other, the verification of the anonymized data D3 succeeds, whereas when they do not match with each other, the verification of the anonymized data D3 fails.

As described above, in the comparative example, there is a restriction that "for a certain attribute, the same processing needs to be performed on each of the same attribute values even when they are recorded in different records (different cells)". However, there are case where even records having the same attribute value for a certain attribute need to be subjected to processes different from each other. Therefore, it is desired to eliminate such a restriction.

Here, assume that processing is performed without complying with the above-described restriction in the comparative example. For example, in the example shown in FIG. 2, all the records each having the attribute value "Kanagawa" are to be subjected to "deleting" processing. In contrast to this, assume that the attribute value "Kanagawa" of the record in the third row is subjected to "deleting" processing, and the attribute value "Kanagawa" of the record in the fourth row is not subjected to "deleting" processing.

In this case, the data processing entity performs the "deleting" processing on the attribute value "Kanagawa" of the record in the third row as described above. Meanwhile, the data processing entity leaves the attribute value "Kanagawa" of the record in the fourth row as it is in the anonymized data D2. Then, the attribute value "Kanagawa" and its random number are not to be deleted in the random number data Dr2. That is, the random number data Dr is provided to the data recipient.

In this case, as described above, the data recipient uses the value of the anonymized data D2 as it is as the hash value of the cell in the third row. Meanwhile, the hash value of the cell in the fourth row is calculated by using the random number $R_2$ of the provided random number data Dr in the same manner as being calculated when the signature was generated. Note that the random number that is used when a hash value is generated for the cell in the third row and the random number that is used when a hash value is generated for the cell in the fourth row are the same as each other and are both the random number $R_2$. Therefore, there is a risk that the original value of the cell in the third row could be inferred by using the random number $R_2$. Therefore, there is a risk that it could be known to the data recipient that the attribute value of the original data in the cell in the third row was "Kanagawa". This is because the data recipient has obtained knowledge about the random number $R_2$ corresponding to the deleted attribute value "Kanagawa". On the other hand, unless the random number $R_2$ is provided to the data recipient, the data recipient cannot generate the hash value of the cell in the fourth row. Therefore, it is impossible to appropriately verify the signature.

The above-described situation can also occur even in the case of the "generalizing" processing shown in FIG. 3. That is, assume that in FIG. 3, the attribute value "Tokyo" in the first row is generalized to the attribute value "Kanto", and the attribute value "Tokyo" in the second row is not generalized. In this case, since the random number $R_1$ corresponding to the attribute value "Tokyo" in the record in the second row could be contained in the anonymized data D3, there is a risk that it could be known to the data recipient that the attribute value of the original data in the cell in the first row is "Tokyo". Therefore, in the comparative example (Non-patent Literature 1), it is necessary to impose the restriction that "for a certain attribute, the same processing needs to be performed on each of the same attribute values even when they are recorded in different records (different cells)".

In contrast, in this example embodiment, as will be described hereinafter, random numbers corresponding to respective attribute values are set in advance, so that the amount of transmitted data is reduced and these random numbers are not provided to the data recipient. Therefore, in this example embodiment, it is possible to reduce the amount of transmitted data without imposing any restriction on the processing of data.

First Example Embodiment

An example embodiment will be described hereinafter with reference to the drawings. In order to clarify the explanation, the following descriptions and drawings are omitted and simplified as appropriate. Further, the same elements are assigned the same reference numerals (or symbols) throughout the drawings, and redundant descriptions thereof are omitted as appropriate.

Figure 4:
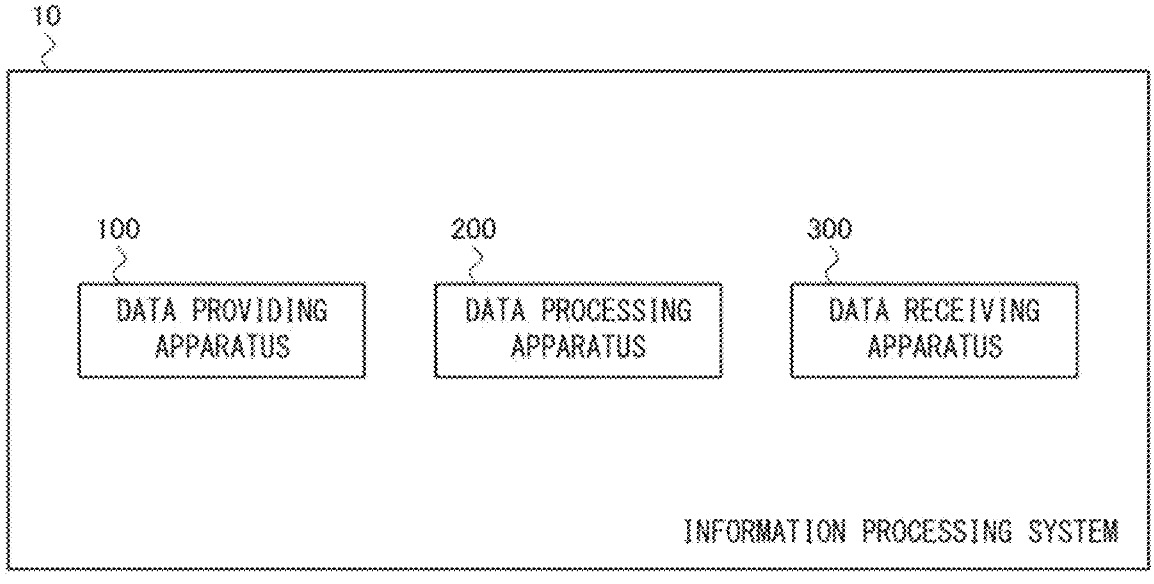
FIG. 4 shows a configuration of an information processing system according to a first example embodiment.

FIG. 4 shows a configuration of an information processing system 10 according to a first example embodiment. The information processing system 10 includes a data providing apparatus 100, a data processing apparatus 200, and a data receiving apparatus 300. Although the data providing apparatus 100, the data processing apparatus 200, and the data receiving apparatus 300 are physically separated from each other in this example, they may be integrally formed. The data providing apparatus 100, the data processing apparatus 200, and the data receiving apparatus 300 are connected to each other through a wire or wirelessly so that they can communicate with each other. The data providing apparatus 100 may be managed by the above-described data provider. The data processing apparatus 200 may be managed by the above-described data processing entity. The data receiving apparatus 300 may be managed by the above-described data recipient.

By the above-described apparatuses, the information processing system 10 generates a signature for data (data set) to be provided, processes (anonymizes) at least a part of the data, and verifies the signature for the data set of which the at least one data has been processed. Details of these features will be described later. Note that the information processing system 10 may also function as a digital signature system (a signature system or an electronic signature system) for putting a digital signature (an electronic signature), a data processing system for processing data, or a signature verification system (a verification system) for verifying a signature.

Figure 5:
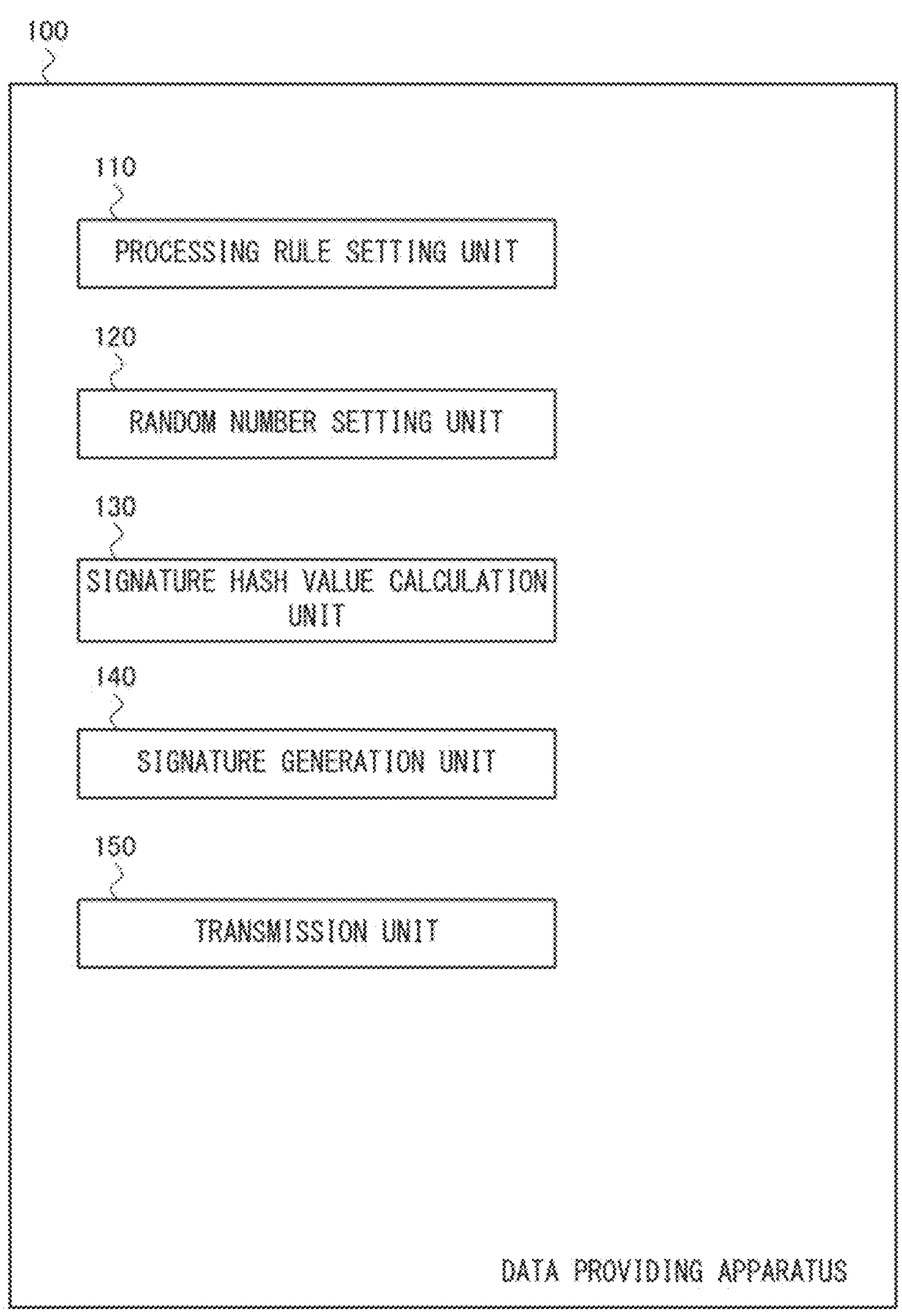
FIG. 5 shows a configuration of a data providing apparatus according to the first example embodiment.

FIG. 5 shows a configuration of the data providing apparatus 100 according to the first example embodiment. The data providing apparatus 100 includes, as its components, a processing rule setting unit 110, a random number setting unit 120, a signature hash value calculation unit 130, a signature generation unit 140, and a transmission unit 150. The processing rule setting unit 110 functions as processing rule setting means. The random number setting unit 120 functions as random number setting means. The signature hash value calculation unit 130 functions as signature hash value calculation means (first hash value calculation means or first calculation means). The signature generation unit 140 functions as signature generation means. The transmission unit 150 functions as transmitting means (first transmitting means).

A data set composed of a plurality of data about at least one attribute is input to the data providing apparatus 100 by a data provider. Then, the data providing apparatus 100 provides the data set. As described above, the data set is composed of at least one record and at least one attribute. Further, as described above, the data set may be formed, for example, in a table format with rows and columns. Further, each row may correspond to a record, and each column may correspond to an attribute. The data set may be, for example, but is not limited to, medical data of a plurality of patients. Further, the data providing apparatus 100 generates a digital signature for the data (data set) to be provided. Note that the data providing apparatus 100 may also function as a signature generation apparatus that generates a digital signature (electronic signature).

The data providing apparatus 100 may be implemented by, for example, an information processing apparatus such as a computer. That is, the data providing apparatus 100 includes an arithmetic apparatus such as a CPU (Central Processing Unit) and a storage device such as a memory or a disk. The data providing apparatus 100 implements each of the above-described components by, for example, having the arithmetic apparatus execute a program stored in the storage device. This feature also applies to other example embodiments described later. Further, the functions of each component will be described later.

Figure 6:
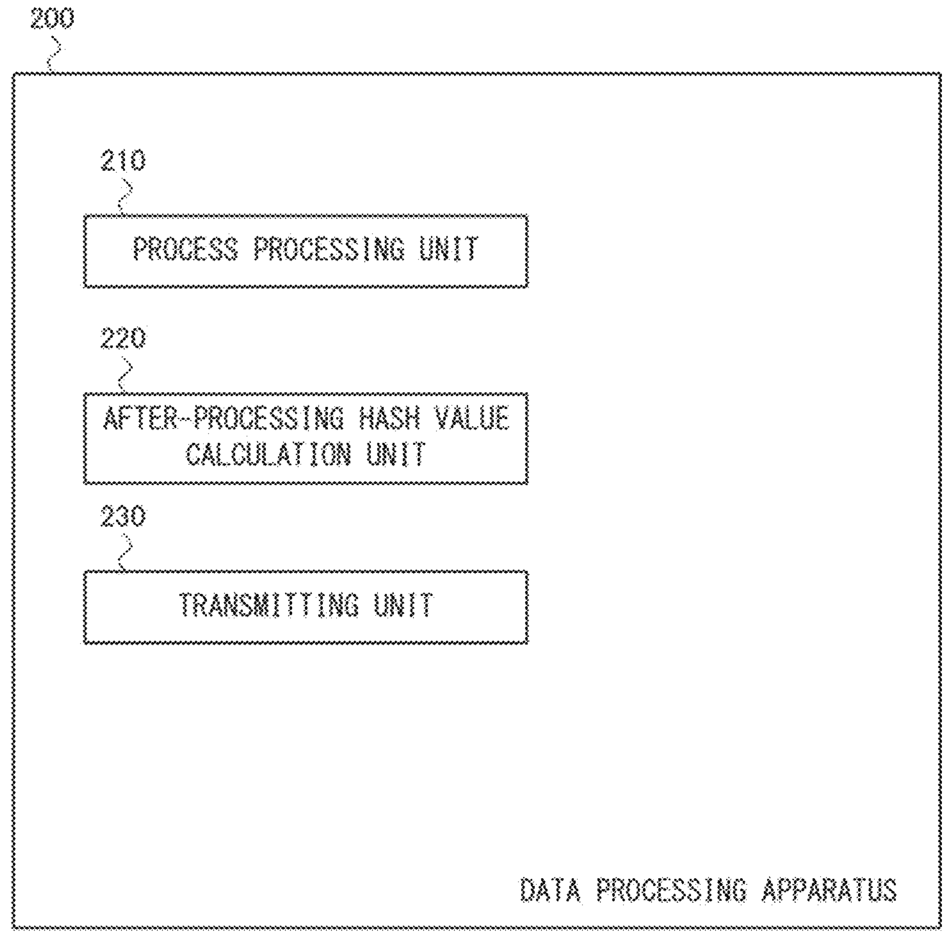
FIG. 6 shows a configuration of a data processing apparatus according to the first example embodiment.

FIG. 6 shows a configuration of the data processing apparatus 200 according to the first example embodiment. The data processing apparatus 200 includes, as its components, a processing performing unit 210, an after-processing hash value calculation unit 220, and a transmitting unit 230. The processing performing unit 210 functions as processing performing means. The after-processing hash value calculation unit 220 functions as after-processing hash value calculation means (second hash value calculation means or second calculation means). The transmitting unit 230 functions as transmitting means (second transmitting means).

The data processing apparatus 200 acquires (receives) information containing a data set and a digital signature from the data providing apparatus 100. Then, the data processing apparatus 200 processes at least one of a plurality of data included in the data set provided from the data providing apparatus 100. Note that the data processing apparatus 200 may also function as an anonymizing apparatus that anonymizes data (anonymizing processing).

The data processing apparatus 200 may be implemented by, for example, an information processing apparatus such as a computer. That is, the data processing apparatus 200 includes an arithmetic apparatus such as a CPU (Central Processing Unit) and a storage device such as a memory or a disk. The data processing apparatus 200 implements each of the above-described components by, for example, having the arithmetic apparatus execute a program stored in the storage device. This feature also applies to other example embodiments described later. Further, the functions of each component will be described later.

Figure 7:
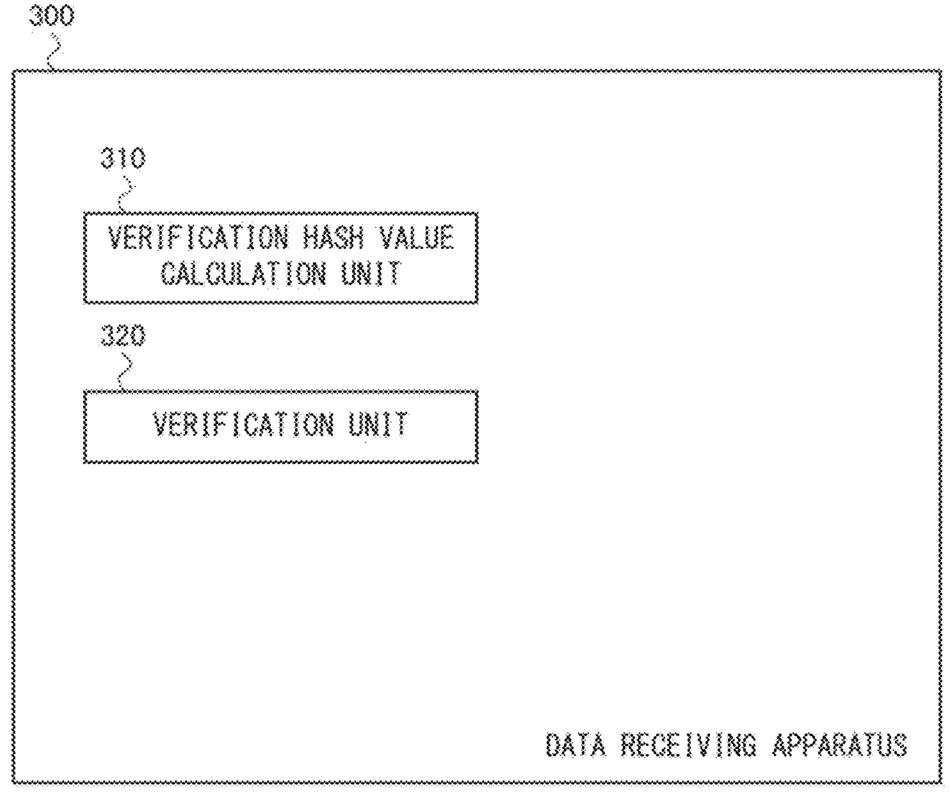
FIG. 7 shows a configuration of a data receiving apparatus according to the first example embodiment.

FIG. 7 shows a configuration of the data receiving apparatus 300 according to the first example embodiment. The data receiving apparatus 300 includes, as its components, a verification hash value calculation unit 310 and a verification unit 320. The verification hash value calculation unit 310 functions as verification hash value calculation means. The verification unit 320 functions as verification means (signature verification means).

The data receiving apparatus 300 acquires (receives) a data set of which at least a part of data has been processed and a digital signature from the data processing apparatus 200. Then, the data receiving apparatus 300 verifies the signature for the data set of which at least one data has been processed. Note that the data receiving apparatus 300 can also function as a signature verification apparatus (verification apparatus) that verifies a signature.

The data receiving apparatus 300 may be implemented by, for example, an information processing apparatus such as a computer. That is, the data receiving apparatus 300 includes an arithmetic apparatus such as a CPU (Central Processing Unit) and a storage device such as a memory or a disk. The data receiving apparatus 300 implements each of the above-described components by, for example, having the arithmetic apparatus execute a program stored in the storage device. This feature also applies to other example embodiments described later. Further, the functions of each component will be described later.

Figure 8:
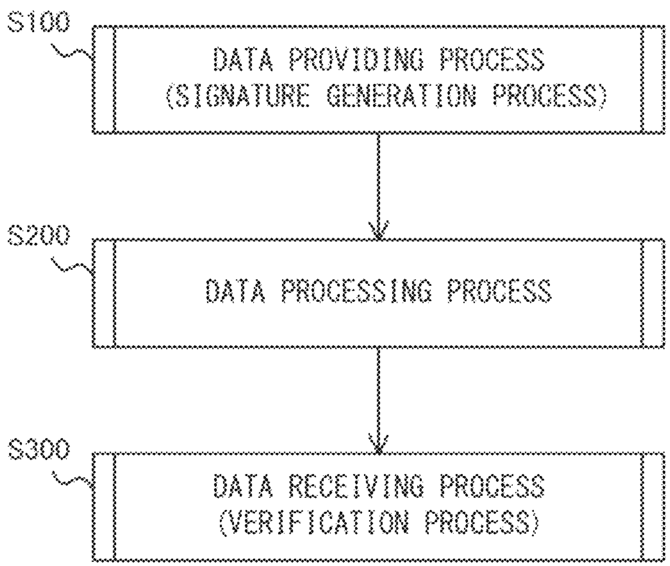
FIG. 8 is a flowchart showing an information processing method performed by the information processing system according to the first example embodiment.

FIG. 8 is a flowchart showing an information processing method performed by the information processing system 10 according to the first example embodiment. The information processing method performed by the information processing system 10 can be implemented as a digital signature method (a signature method or an electronic signature method), a data processing system, or a signature verification method (a verification method).

The information processing system 10 performs a data providing process (Step S100). Specifically, the data providing apparatus 100 of the information processing system 10 provides a data set composed of a plurality of data about at least one attribute. Note that the data providing apparatus 100 performs a signature generation process for the provided data (data set) as described above. Details of the process in the step S100 will be described later.

The information processing system 10 performs a data processing process (Step S200). Specifically, the data processing apparatus 200 of the information processing system 10 acquires information containing a data set and a digital signature from the data providing apparatus 100. Then, the data processing apparatus 200 processes at least one of a plurality of data included in the data set. Details of the process in the step S200 will be described later.

The information processing system 10 performs a data receiving process (Step S300). Specifically, the data receiving apparatus 300 of the information processing system 10 acquires the data set of which at least one data has been processed and the digital signature from the data processing apparatus 200. Then, the data receiving apparatus 300 verifies a signature for the data set of which at least one data has been processed (verification process). Details of the process in the step S300 will be described later.

Figure 9:
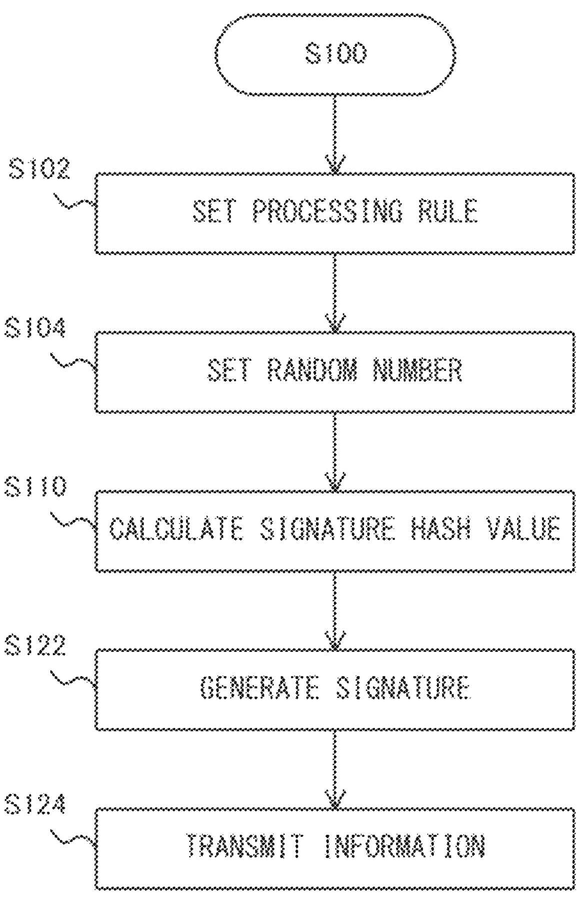
FIG. 9 is a flowchart showing a data providing process performed by the data providing apparatus according to the first example embodiment.

FIG. 9 is a flowchart showing a data providing process (S100) performed by the data providing apparatus 100 according to the first example embodiment. Although the flowchart shown in FIG. 9 shows the data providing method, it can also be considered that it shows a digital signature method (a signature method or an electronic signature method).

The data providing apparatus 100 sets a processing rule (Step S102). Specifically, the processing rule setting unit 110 sets a processing rule for each of attributes of a plurality of data constituting the data set (original data). Note that the processing rule setting unit 110 may set a processing rule according to an operation performed by the user (data provider). That is, the processing rule setting unit 110 may set a processing rule that is arbitrarily determined by the user. In the data processing process (S200), processing performed according to the processing rule can be considered to be legitimate processing (anonymization). Meanwhile, processing performed without complying with the processing rule can be considered to be illegitimate processing.

Note that as the processing rule, at least whether or not each attribute should be subjected to processing (anonymization) may be specified. For example, as the processing rule, it is specified that an attribute “Address” should be subjected to the processing and attributes “Name” and “Age” should not be subjected to the processing. Note that in the data processing process (S200), not all attribute values of data of the attribute to be processed need to be processed.

Further, the processing rule may include a hierarchical structure having layers corresponding to respective states including a not-yet-processed attribute value (i.e., an attribute value that has not been processed yet) and an already-processed attribute value (i.e., an attribute value that has already been processed), set for each attribute to be processed. This hierarchical structure is, for example, but is not limited to, the above-described generalized hierarchical tree. Note that the “state including attribute values after processing” includes a state in which data (attribute value) has been deleted by “deleting” processing. In the case where the processing rule includes a hierarchical structure, processing is considered to be legitimate one (anonymization) in the data processing process (S200) when it is processing according to the hierarchical structure.

The data providing apparatus 100 sets random numbers (Step S104). Specifically, the random number setting unit 120 sets predetermined random numbers for states corresponding to a plurality of attribute values that processing-target data about an attribute to be processed can take under the processing rule. For example, when an attribute “Address” is to be processed, the random number setting unit 120 sets a random number for each of the attribute values “Tokyo”, “Kanagawa”, “Osaka”, and the like. These random number are used in the calculation of a signature hash value and the calculation of an after-processing hash value performed in the data processing apparatus 200 (which will be described later). However, these random numbers are not used in the calculation of a verification hash value performed in the data receiving apparatus 300 (which will be described later). That is, these random numbers are not transmitted to the data receiving apparatus 300.

The data providing apparatus 100 calculates a signature hash value (Step S110). Specifically, the signature hash value calculation unit 130 calculates a signature hash value corresponding to each of the plurality of data included in the data set. Note that each of the signature hash values corresponds to a respective one of the plurality of data included in the data set and is a hash value used to generate a digital signature. Details of these features will be described later.

More specifically, the signature hash value calculation unit 130 calculates, for the processing-target data, a first hash value (beginning hash value, starting hash value) for a data sequence (data series, data string, data stream) obtained by using the processing-target data and the random number set for the attribute value corresponding to the processing-target data. Further, the signature hash value calculation unit 130 calculates an intermediate hash value for a data sequence obtained by combining the processing-target data and the first hash value. Then, the signature hash value calculation unit 130 calculates a signature hash value corresponding to the processing-target data by using this intermediate hash value.

Note that the first hash value is a hash value corresponding to the attribute value of the processing-target data (i.e., the data that has not been processed yet) among the data included in the data set. Details of these features will be described later. Further, the intermediate hash value is a hash value used before the signature hash value is calculated. In other words, the intermediate hash value is a hash value corresponding to a state (attribute value) that the processing-target data can take by the processing. Further, the first hash value corresponds to an intermediate hash value corresponding to the processing-target data. Details of these features will be described later. Note that in this example embodiment, a hash chain from the first hash value to the signature hash value is formed. The hash value of the head of the hash chain corresponds to the first hash value, and the hash value at the end of the hash chain corresponds to the signature hash value. Further, a hash value(s) other than the hash value at the end of the hash chain (signature hash value) corresponds to the intermediate hash value. That is, in the hash chain, there can be an intermediate hash value(s) between the first hash value and the signature hash value (the hash value at the end of the hash chain).

Note that when a hierarchical structure is included in the processing rule, the signature hash value calculation unit 130 may calculate, for a data sequence obtained by combining the processing-target data and the first hash value, an intermediate hash value corresponding to a state of a layer higher than that of the attribute value of the processing-target data in the hierarchical structure. Therefore, there can be a state including some kind of corresponding already-processed attribute value for each intermediate hash value. Note that the hash chain may be formed by repeating the above-described process.

Further, the signature hash value calculation unit 130 may calculate, for an attribute that is not to be processed and for each data, a hash value calculated for a corresponding attribute value as a signature hash value corresponding to the data. Further, the signature hash value calculation unit 130 may calculate a first hash value for a data sequence obtained by using the processing-target data, a random number set for an attribute value corresponding to the processing-target data, and an index for identifying the processing-target data. Details of these features will be described later. Note that the index for identifying the processing-target data may be, for example, an index of the above-described record. That is, the index may be a row number in the data set in the table format. In this way, it is possible to make first hash values calculated for a plurality of processing-target data of which the attribute values are the same as each other different from each other.

The data providing apparatus 100 generates a signature (Step S122). Specifically, the signature generation unit 140 generates a digital signature by using a signature hash value corresponding to each of the plurality of data. For example, the signature generation unit 140 may calculate a hash value for a data sequence obtained by combining the signature hash values of data corresponding to respective records, and generate a digital signature by using the obtained hash value and a private key. Details of these features will be described later.

The data providing apparatus 100 transmits information (Step S124). Specifically, the transmission unit 150 transmits the data set, the digital signature, and the random numbers to the data processing apparatus 200. Details of these features will be described later. Note that the data providing apparatus 100 may temporarily store therein the information to be transmitted before transmitting the information to the data processing apparatus 200.

Figure 10:
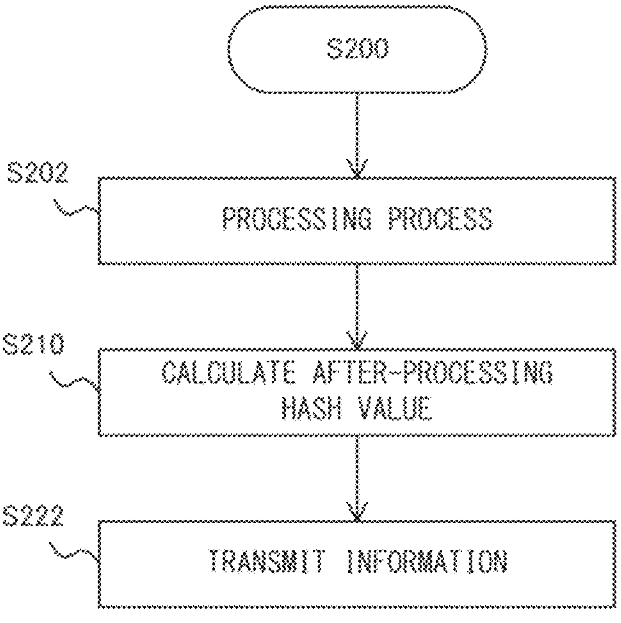
FIG. 10 is a flowchart showing a data processing process performed by the data processing apparatus according to the first example embodiment.

FIG. 10 is a flowchart showing a data processing process (S200) performed by the data processing apparatus 200 according to the first example embodiment. The data processing apparatus 200 performs a processing process (Step S202). Specifically, the processing performing unit 210 performs a process for processing (anonymizing) the processing-target data corresponding to the attribute to be the processed. Note that the processing performing unit 210 may perform processing according to an operation performed by the user (data processing entity). That is, the user (data processing entity) may arbitrarily determine what kind of processing should be performed for each processing-target data.

The data processing apparatus 200 calculates an after-processing hash value (Step S210). Specifically, the after-processing hash value calculation unit 220 calculates an after-processing hash value corresponding to the processing-target data. Note that the after-processing hash value is an intermediate hash value corresponding to each of processing-target data (each of attribute values). The after-processing hash value is paired with the corresponding processing-target data, and they are provided to the data receiving apparatus 300. The after-processing hash value may correspond to the processing-target data that has already been processed (already-processed attribute value) and may correspond to the processing-target data that is not processed (attribute value of the original data). That is, when the processing-target data has been processed, the after-processing hash value may correspond to the processing-target data that has already been processed (already-processed attribute value). Further, when the processing-target data is not processed, the after-processing hash value may correspond to the processing-target data that is not processed (attribute value of the original data). The after-processing hash value can be used to generate a verification hash value in the data receiving apparatus 300 as will be described later.

Note that the after-processing hash value calculation unit 220 calculates, for the processing-target data that has already been processed, a first hash value for a data sequence obtained by using the not-yet-processed processing-target data (i.e., the processing-target data that has not been processed yet) and a random number set for the attribute value corresponding to the not-yet-processed processing-target data. Further, the after-processing hash value calculation unit 220 calculates an intermediate hash value for a data sequence obtained by combining the not-yet-processed processing-target data and the first hash value. Then, the after-processing hash value calculation unit 220 calculates an after-processing hash value corresponding to the already-processed processing-target data (i.e., the processing-target data that has already been processed) by using the intermediate hash value. Details of these features will be described later.

Note that as described above, a hierarchical structure may be included in the processing rule. In this case, the after-processing hash value calculation unit 220 may calculate, for a data sequence obtained by combining the not-yet-processed processing-target data and the first hash value, an intermediate hash value corresponding to a state of a layer higher than that of the attribute value of the not-yet-processed processing-target data in the hierarchical structure. Details of these features will be described later.

Further, the after-processing hash value calculation unit 220 may calculate, for an attribute value that has not been processed among the attributes to be processed under the processing rule, an after-processing hash value as described below. That is, the after-processing hash value calculation unit 220 may calculate a first hash value calculated for a data sequence obtained by using the attribute value and a random number set for the attribute value as the after-processing hash value. Details of these features will be described later. In this way, even for an attribute value that has not been processed among the attributes to be processed under the processing rule, it is possible to calculate a verification hash value without providing a random number to the data receiving apparatus 300.

Further, the after-processing hash value calculation unit 220 may calculate a first hash value for a data sequence obtained by using the processing-target data, a random number set for an attribute value corresponding to the processing-target data, and an index for identifying the processing-target data. Details of these features will be described later. Note that the index for identifying the processing-target data may be, for example, an index of the above-described record. That is, the index may be a row number in the data set in the table format. In this way, it is possible to make first hash values calculated for a plurality of processing-target data of which the attribute values are the same as each other different from each other. Further, the after-processing hash value calculation unit 220 can calculate the same first hash value as the first hash value calculated, by the data providing apparatus 100, for each of a plurality of processing-target data of which the records are the same as each other.

The data processing apparatus 200 transmits information (Step S222). Specifically, the transmitting unit 230 transmits the data set of which the processing-target data has already been processed, the after-processing hash value corresponding to the processing-target data, and the digital signature to the data receiving apparatus 300. Details of these features will be described later. Note that the data processing apparatus 200 may temporarily store therein the information to be transmitted before transmitting the information to the data receiving apparatus 300.

Figure 11:
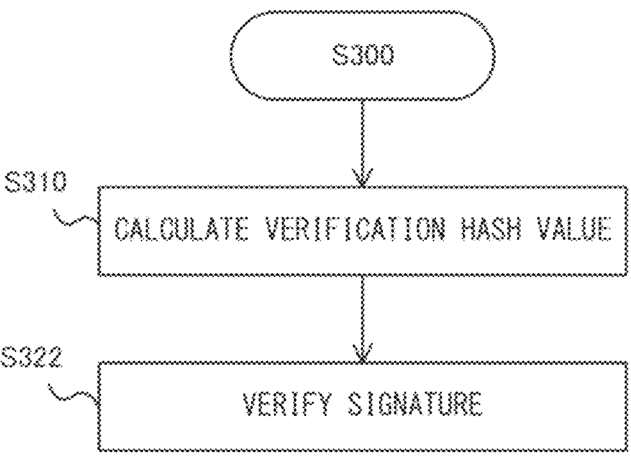
FIG. 11 is a flowchart showing a data receiving process performed by the data receiving apparatus according to the first example embodiment.

FIG. 11 is a flowchart showing a data receiving process (S300) performed by the data receiving apparatus 300 according to the first example embodiment. Although the flowchart shown in FIG. 11 shows the data receiving method, it can also be considered that it shows a signature verification method (verification method).

The data receiving apparatus 300 calculates a verification hash value (Step S310). Specifically, the verification hash value calculation unit 310 calculates a verification hash value by using the data set of which the processing-target data has already been processed and the after-processing hash value. Note that each of the verification hash values corresponds to a respective one of the processing-target data and a respective one of the data that is not to be processed, and is used to calculate, from the already-processed data set (i.e., the data set that has already been processed), a hash value that will be compared (matched) with a hash value corresponding to the digital signature. Details of these features will be described later.

The data receiving apparatus 300 verifies a signature (Step S322). Specifically, the verification unit 320 verifies the verification hash value and the digital signature. For example, the verification unit 320 calculates a hash value H' for a data sequence obtained by combining the verification hash values of data corresponding to respective records. Further, the verification unit 320 may verify the digital signature by using the digital signature, a verification key, and the hash value H'. In this way, the validity of the already-processed data set can be verified.

In the information processing system 10 according to the first example embodiment, the data providing apparatus 100 sets predetermined random numbers for states corresponding to a plurality of attribute values that the processing-target data about the attribute to be processed can take under the processing rule. Further, the data providing apparatus 100 calculates, for the processing-target data, a first hash value for a data sequence obtained by using the processing-target data and a random number set for an attribute value corresponding thereto. Further, the data providing apparatus 100 calculates an intermediate hash value for a data sequence obtained by combining the processing-target data and the first hash value. Then, the data providing apparatus 100 calculates a signature hash value corresponding to the processing-target data by using this intermediate hash value.

Further, the data processing apparatus 200 calculates, for the already-processed processing-target data (i.e., the processing-target data that has already been processed), a first hash value for a data sequence obtained by using the not-yet-processed processing-target data and a random number set for an attribute value corresponding thereto. Further, the data processing apparatus 200 calculates an intermediate hash value for a data sequence obtained by combining the not-yet-processed processing-target data and the first hash value. Then, the data processing apparatus 200 calculates an after-processing hash value corresponding to the already-processed processing-target data by using this intermediate hash value.

Since the information processing system 10 according to the first example embodiment generates a digital signature by using random numbers that are set in advance, the amount of transmitted data can be reduced. Further, by the above-described configuration, the information processing system 10 according to the first example embodiment prevents the random number from being provided to the data receiving apparatus 300 (data recipient). Therefore, there is no need to impose the restriction that "for a certain attribute, the same processing needs to be performed on each of the same attribute values even when they are recorded in different records (different cells)". Therefore, in this example embodiment, it is possible to reduce the amount of transmitted data without imposing any restriction on the processing of data.

Second Example Embodiment

Next, a second example embodiment will be described. In order to clarify the explanation, the following descriptions and drawings are omitted and simplified as appropriate. Further, the same elements are assigned the same reference numerals (or symbols) throughout the drawings, and redundant descriptions thereof are omitted as appropriate. Note that the configuration of a system according to the second example embodiment is substantially the same as that of the system according to the first example embodiment, and therefore descriptions thereof will be omitted. That is, the information processing system 10 according to the second example embodiment includes a data providing apparatus 100, a data processing apparatus 200, and a data receiving apparatus 300. The second example embodiment corresponds to what is obtained by applying the above-described configuration according to the first example embodiment to a case where "generalizing" processing (anonymization) is performed. Note that in the following description, "$x_y$" may also be expressed as "x_y" for the sake of the expression.

Figure 12:
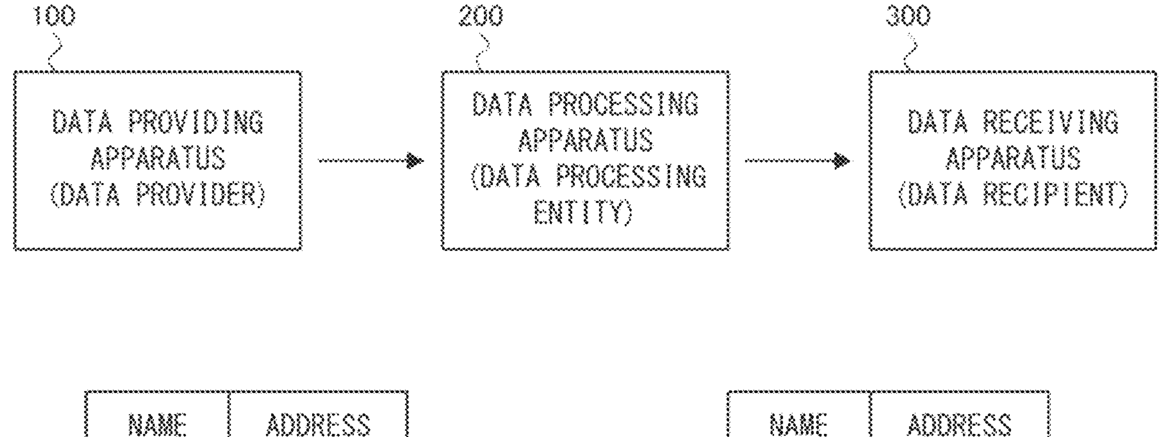
FIG. 12 shows a diagram and tables for explaining a flow of processes performed in an information processing system according to a second example embodiment.
Figure 12:

FIG. 12 shows a diagram and tables for explaining a flow of processes performed in the information processing system 10 according to the second example embodiment. FIG. 12 shows an example in which a data set having two columns for attributes "Name" and "Address" is processed (generalized). Further, the column of the attribute "Name" is a column of an attribute that is not to be processed by the data processing apparatus 200 (data processing entity). Meanwhile, the column of the attribute "Address" is a column of an attribute that is processed (generalized) by the data processing apparatus 200 (data processing entity). That is, in the data set, there are a column of an attribute that is processed and a column of an attribute that is not processed in a mixed manner.

Note that the generalizing processing is performed along the generalized hierarchical tree Tr shown in FIG. 1. As described above, in the generalized hierarchical tree Tr, the higher the layer is, the more the attribute value therein is generalized (abstracted). Note that the generalized hierarchical tree Tr is set by the data providing apparatus 100 (data provider). Further, it is assumed that each node has only one parent node adjacent thereto. In other words, it is assumed that, for each node, the number of layers that are one level higher than that node is only one.

A data set Da1, which is the original data (plaintext), is provided from the data providing apparatus 100 to the data processing apparatus 200. In a record of a name "AA", an attribute value of the attribute "Address" is "Tokyo". In a record of a name "BB", an attribute value of the attribute "Address" is "Tokyo". In a record of a name "CC", an attribute value of the attribute "Address" is "Kanagawa". Note that in the data set Da1 of the original data, the layers of the attribute values of the attribute "Address" of all the records are the same as each other. In the example shown in FIG. 12, the layer of the attribute values of the attribute "Address" in the data set Da1 of the original data is the lowest layer "1" (prefecture name) in the generalized hierarchical tree Tr.

The data processing apparatus 200 generalizes (anonymizes) the attribute value "Tokyo" of the attribute "Address" of the record of the name "AA" to the attribute value "Kanto". Further, the data processing apparatus 200 leaves the attribute value "Tokyo" of the attribute "Address" of the record of the name "BB" as the attribute value "Tokyo", i.e., does not generalize it. Further, the data processing apparatus 200 generalizes (anonymizes) the attribute value "Kanagawa" of the attribute "Address" of the record of the name "CC" to the attribute value "Japan". In this way, the data processing apparatus 200 generates anonymized data Da2 and transmits the generated anonymized data Da2 to the data receiving apparatus 300 (data recipient).

Note that in this example embodiment, regarding the column of the attribute to be generalized, there are cases where the layers of attributes that are originally the same as each other are changed from one to another after they are generalized. In the example shown in FIG. 12, the attribute value "Tokyo" of the attribute "Address" of the record of the name "AA" is generalized to an attribute value in a layer one level higher than the original layer. Meanwhile, the attribute value "Tokyo" of the attribute "Address" of the record of the name "BB" is not generalized. The attribute value "Kanagawa" of the attribute "Address" of the record of the name "CC" is generalized to an attribute value in a layer two levels higher than the original layer.

Further, in this example embodiment, unlike the comparative example, there are cases where the layers of the records are changed from one to another after they are generalized even when the records have attribute values same as each other. In the example shown in FIG. 12, while the attribute value "Tokyo" in the record of the name "AA" is generalized to the attribute value "Kanto" in the layer one level higher than the original layer, the attribute value "Tokyo" in the record of the name "BB" remains as the attribute value "Tokyo", i.e., is not generalized.

Similarly to the first example embodiment, the data providing apparatus 100 according to the second example embodiment performs a signature generation process (S100); the data processing apparatus 200 performs a data processing process (S200); and the data receiving apparatus 300 performs a verification process (S300). These processes will be described hereinafter.

<Signature Generation Process>

Firstly, the signature generation process (S100) performed in the generalization processing will be described. In the data providing apparatus 100, the processing rule setting unit 110 sets a processing rule for each of attributes of a plurality of data constituting a data set (original data) (S102). Firstly, the processing rule setting unit 110 determines, for each column (each attribute) in the data set, whether or not the column (attribute) is to be processed (generalized).

FIG. 13 shows a table for explaining a process performed by the processing rule setting unit 110 according to the second example embodiment. As shown in FIG. 13, the data set, which is the original data, is formed in a table format (matrix format). Further, each row corresponds to each record, and each column corresponds to each attribute. Further, an index of the row is represented by i, and an index of the column is represented by j. Further, an attribute value in a cell in a row i and a column j is represented by $a_{ij}$.

The processing rule setting unit 110 sets attributes which are not to be processed (generalized). Further, the processing rule setting unit 110 sets attributes which are to be processed (generalized). Note that a set of columns of attributes which are not to be processed is represented by C, and a set of columns of attributes which are to be processed is represented by C'. In this case, for each column, relations $c_j \in C$ and $c_{j'} \in C'$ hold. That is, the index of a column of attributes to be processed is represented by j'.

Further, the processing rule setting unit 110 sets a generalized hierarchical tree $T_{j'}$ for the columns $c_{j'}$ of attributes to be processed. That is, the processing rule setting unit 110 sets, for each of the attributes to be processed, a generalized hierarchical tree having a hierarchical structure that shows a rule for generalizing a not-yet-processed attribute value (i.e., an attribute value that has not been processed yet), and shows attribute values in such a manner that the higher the layer of an attribute value is, the more the attribute value has been generalized. Note that the generalized hierarchical tree $T_{j'}$ can be set for each column of attributes to be processed. Note that the height of the generalized hierarchical tree $T_{j'}$ is represented by $l_{j'}$.

Figure 14:
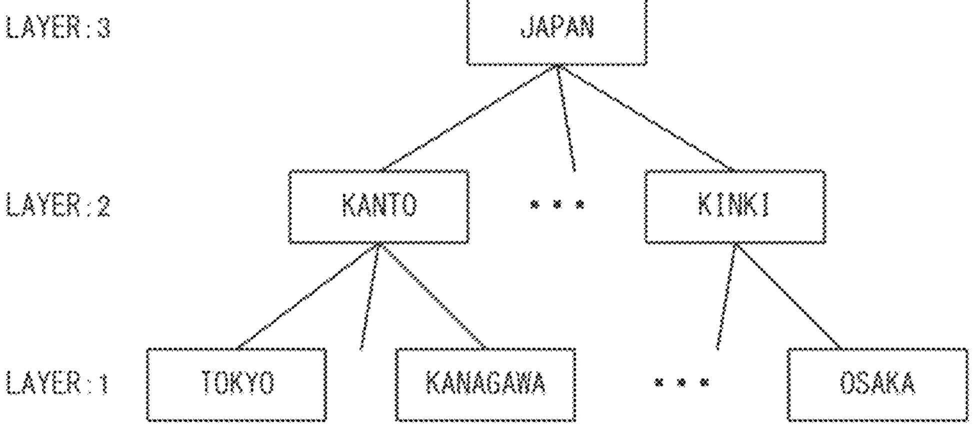
FIG. 14 shows a diagram for explaining a generalized hierarchical tree according to the second example embodiment.

FIG. 14 shows a diagram for explaining the generalized hierarchical tree $T_{j'}$ according to the second example embodiment. FIG. 14 shows an example of the generalized hierarchical tree $T_{j'}$ in which a column of the attribute "Address" is represented by $c_{j'}$. In this example, the height $l_{j'}$ of the generalized hierarchical tree $T_{j'}$ is three ($l_j$=3). Further, the layer "1" (leaf nodes) corresponds to the "Prefecture Name" such as attribute values "Tokyo", "Kanagawa", and "Osaka". Further, the layer "2" (intermediate nodes) corresponds to the "Region Name" such as "Kanto" and "Kinki (region)" which are more abstracted than the prefectures. Further, the layer "3" (root node) corresponds to the "Country Name" which is "Japan" and is the most abstracted.

The random number setting unit 120 sets predetermined random numbers for states corresponding to a plurality of attribute values that processing-target data about an attribute to be processed (generalized) can take under the processing rule (S104). That is, the random number setting unit 120 sets predetermined random numbers for states corresponding to a plurality of attribute values that the processing-target data can take in the original data. Then, the random number setting unit 120 generates a random number table showing random numbers set for respective attribute values. That is, the random number setting unit 120 generates a random number table $R_{j'}$ for a column $c_{j'}$. The random number table $R_{j'}$ can be generated for each column of attributes to be processed.

FIG. 15 shows a table for explaining a random number table according to the second example embodiment. In the example shown in FIG. 15, a random number $r_v$ is set for an attribute value v in a layer "1" that the column $c_{j'}$ can take. As described above, a random number is set for each attribute value in each column in the random number table $R_{j'}$.

The signature hash value calculation unit 130 calculates a signature hash value corresponding to each of a plurality of data included in the data set (S110). The signature hash value calculation unit 130 calculates, for an attribute value $a_{ij}$ in a column $c_j$ of an attribute that is not to be processed and for each row i (for each record), a hash value $h_{ij}$ by using a hash function H and using the below-shown Expression (1). The calculated hash value corresponds to the signature hash value for the attribute that is not to be processed.

[Expression 1]

$$h_{i,j} = H(a_{i,j}) \tag{1}$$

Further, the signature hash value calculation unit 130 calculates, for the column $c_{j'}$ of an attribute to be processed and for each row i (for each record), a signature hash value $h_{ij'}$ corresponding to the processing-target data for a cell in a row i and a column $c_{j'}$ by using the random number table $R_{j'}$ and using the below-shown Expressions (2) to (3). Note that it is assumed that the attribute value $a_{ij'}$ is an attribute value in the layer "1" in the generalized hierarchical tree $T_{j'}$. Further, it is assumed that the attribute value of a parent node in a layer k of the attribute value $a_{ij}$ is expressed as p_(k, $a_{ij'}$). Note that a relation p_(1, $a_{ij'}$)=$a_{ij'}$ holds.

In the example of the generalized hierarchical tree $T_j$ shown in FIG. 14, when p_(1, $a_{ij'}$)=$a_{ij}$="Tokyo", relations p_(2, $a_{ij'}$)="Kanto" and p_(3, $a_{ij'}$)="Japan" hold. Therefore, p_(k, $a_{ij'}$) can be considered to be an attribute value in the layer k which is the same as or higher than its own layer of the attribute value $a_{ij'}$. Further, an intermediate hash value corresponding to the attribute value in the layer k is represented by $h_{ij',k}$.

The signature hash value calculation unit 130 calculates a first hash value $h_{ij',1}$ corresponding to the attribute value $a_{ij'}$ by using the below-shown Expression (2).

[Expression 2]

$$h_{i,j',1} = H\left(a_{i,j'} \,\|\, r_{a_{i,j'}} + i\right) \tag{2}$$

As shown by Expression (2), the first hash value $h_{ij',1}$ is a hash value obtained for a data sequence obtained by combining the attribute value $a_{ij'}$ and a value obtained by adding a row number i to a random number r_$a_{ij'}$ corresponding thereto. That is, the first hash value $h_{ij',1}$ is a hash value calculated for a data sequence obtained by using the attribute value $a_{ij'}$, a random number set for the attribute value $a_{ij'}$, and an index i of the attribute value $a_{ij'}$. In the example of the generalized hierarchical tree $T_{j'}$ shown in FIG. 14, the hash value obtained for the data sequence obtained by combining the attribute value $a_{ij}$="Tokyo" and a value obtained by adding i to the random number corresponding to the attribute value "Tokyo" is used as the first hash value $h_{ij',1}$ corresponding to the attribute value "Tokyo".

Note that by adding i to the random number, it is possible to, even when the attribute values of records are the same as each other, make first hash values calculated for these records different from each other. Note that although it is assumed that the hash value of a data sequence obtained by combining the attribute value $a_{ij'}$ and a value obtained by adding the row number i to the random number r_$a_{ij'}$ is calculated in Expression (2), the calculation of a hash value is not limited to this example. The hash value to be calculated may be a hash value of a data sequence obtained by combining the attribute value $a_{ij'}$ and a value obtained by adding a value (i−1) to the random number r_$a_{ij'}$. Alternatively, the hash value to be calculated may be a hash value of a data sequence obtained by combining the attribute value $a_{ij'}$ and a value obtained by adding a value (2×i) to the random number r_$a_{ij'}$. These facts apply to other example embodiments.

Note that the random number r_$a_{ij'}$ is concealed by calculating the hash value using a data sequence obtained by using the attribute value $a_{ij'}$ and a random number r_$a_{ij'}$ corresponding thereto. Therefore, the first hash value $h_{ij',1}$ can be considered to be a hash value for concealing the random number r_$a_{ij'}$. That is, in this example embodiment, by calculating the first hash value $h_{ij',1}$, it is possible to use a random number set in advance and conceal this random number from the data recipient at the same time. These facts apply to other example embodiments.

Next, the signature hash value calculation unit 130 calculates an intermediate hash value corresponding to an attribute value in each layer of the generalized hierarchical tree $T_{j'}$ by using the below-shown Expression (3).

[Expression 3]

$$h_{i,j',k+1} = H\left(p_{k,a_{i,j'}} \,\|\, h_{i,j',k}\right) \text{ for } k = 1, \ldots \ell_{j'} \tag{3}$$

Expression (3) shows that a hash value of data obtained by combining an attribute value p_(k, $a_{ij'}$) in a layer k and an intermediate hash value $h_{ij',k}$ corresponding thereto is calculated as an intermediate hash value $h_{ij',k+1}$ corresponding to an attribute value p_((k+1), $a_{ij'}$) in a layer (k+1). That is, the signature hash value calculation unit 130 calculates, for a data sequence obtained by combining an intermediate hash value and an attribute value in a layer corresponding to this intermediate hash value, an intermediate hash value corresponding to a state of a layer higher than that of this attribute value in the hierarchical structure.

Note that in Expression (3), when k=1, it becomes the below-shown Expression (4). Note that as described above, a relation p_(1, $a_{ij'}$)=$a_{ij'}$ holds. Therefore, in this example embodiment, unlike the comparative example, the attribute value $a_{ij'}$ of the data set (original data) is used twice, i.e., used in Expression (2) for calculating the first hash value and in Expression (3) (Expression (4)) for calculating an intermediate hash value corresponding to an attribute value in a layer one level higher.

[Expression 4]

$$h_{i,j',2} = H\left(p_{1,a_{i,j'}} \,\|\, h_{i,j',1}\right) \tag{4}$$

In the example of the generalized hierarchical tree $T_{j'}$ shown in FIG. 14, the signature hash value calculation unit 130 calculates a hash value of data obtained by combining the attribute value "Tokyo" and the first hash value (intermediate hash value) $h_{ij',1}$ corresponding thereto as the intermediate hash value $h_{ij',2}$ corresponding to the attribute value "Kanto". Further, the signature hash value calculation unit 130 calculates a hash value of data obtained by combining the attribute value "Kanto" and the intermediate hash value $h_{ij',2}$ corresponding thereto as the intermediate hash value $h_{ij',3}$ corresponding to the attribute value "Japan".

Then, the signature hash value calculation unit 130 calculates a hash value h_(i, j', $l_{j'}$+1) of data obtained by combining an attribute value p_($l_{j'}$, $a_{ij'}$) in the highest layer $l_{j'}$ and an intermediate hash value h_(i, j', $l_{j'}$) corresponding thereto. The hash value h_(i, j', $l_{j'}$+1) is used as a signature hash value $h_{ij'}$ corresponding to the processing-target data corresponding to a cell in a row i and a column $c_{j'}$. That is, the below-shown Expression (5) holds.

[Expression 5]

$$h_{i,j'} = h_{i,j',\ell_{j'}+1} \tag{5}$$

That is, the signature hash value calculation unit 130 calculates a hash value calculated for a data sequence obtaining by combining an attribute value in the highest layer in the hierarchical structure and an intermediate hash value corresponding to this attribute value as a signature hash value. In the example of the generalized hierarchical tree $T_{j'}$ shown in FIG. 14, the signature hash value calculation unit 130 calculates a hash value $h_{ij',4}$ of data obtained by combining the attribute value "Japan" and an intermediate hash value $h_{ij',3}$ corresponding thereto as a signature hash value $h_{ij'}$ corresponding to a cell in a row i and a column $c_{j'}$.

Note that by repeating the calculation expressed by Expression (3) from a layer k=1 to the highest layer k=$l_{j'}$, a hash chain is formed along the generalized hierarchical tree $T_{j'}$ as shown by the below-shown Expression (6).

[Expression 6]

$$h_{i,j',1} \rightarrow h_{i,j',2} \rightarrow \ldots \rightarrow h_{i,j',\ell_{j'}} \rightarrow h_{i,j',\ell_{j'}+1} \tag{6}$$

The hash chain shown by Expression (6) is successively formed by an intermediate hash value corresponding to an attribute value in a layer k=1 (first hash value), intermediate hash values corresponding attribute values in layers k=2, . . . , an intermediate hash value corresponding to an attribute value in a layer k=$l_{j'}$, and a hash value at the end. In the example of the generalized hierarchical tree $T_{j'}$ shown in FIG. 14, a hash chain is formed by an intermediate hash value corresponding to the attribute value "Tokyo" (first hash value), an intermediate hash value corresponding to the attribute value "Kanto", an intermediate hash value corresponding to the attribute value "Japan", and a hash value at the end. Note that the hash value at the end corresponds to the signature hash value. In other words, Expressions (2) and (3) indicate that intermediate hash values are calculated from the first hash value to the hash value at the end along the generalized hierarchical tree $T_{j'}$.

The signature generation unit 140 generates a digital signature by using signature hash values corresponding to the plurality of data, respectively, (S122). Specifically, the signature generation unit 140 calculates a hash value $h_i$ for each row i as follows. That is, the signature generation unit 140 calculates, for each row i, a hash value $h_i$ by concatenating all the signature hash values corresponding to the data in respective columns j (columns $c_{j'}$) as shown by the below-shown Expression (7).

[Expression 7]

$$h_i = H\left(h_{i,1} \| \ldots \| h_{i,j} \| \ldots \| h_{i,j'} \| \ldots\right) \tag{7}$$

Further, the signature generation unit 140 generates, for the calculated hash value $h_i$, a digital signature $\sigma_i$ according to a digital signature algorithm by using a private key of the data provider. For example, the signature generation unit 140 may generate a signature $\sigma_i$ by an RSA signature method or a DSA (Digital Signature Algorithm) signature method by using the hash value $h_i$ and the private key. Note that although a signature is generated for each row (each record) in this example, it may be generated for the whole data. In this case, the signature generation unit 140 may collectively calculate a hash value h for {$h_i$}, which is a pair (set) of $h_i$ for all i, and thereby generate a signature $\sigma$ for h. Note that {$x_i$} stands for a set of x for i. These facts apply to other example embodiments.

The transmission unit 150 transmits at least the data set, the digital signature, and the random number to the data processing apparatus 200. Specifically, the transmission unit 150 transmits the original data (data set) including information of C and C', the signature $\{\sigma_i\}$ for each row, the generalized hierarchical tree $\{T_{j'}\}$ for each column to be processed, and the random number table $\{R_{j'}\}$ for each column to be processed to the data processing apparatus 200.

<Data Processing Process>

Next, the data processing process (S200) performed in the generalization process will be described. In the data processing apparatus 200, the processing performing unit 210 performs a process for performing generalizing processing (anonymization) for processing-target data corresponding to an attribute to be processed (S202). The data processing entity performs generalizing processing for each attribute value in the column of the attribute to be subjected to the generalizing processing according to the generalized hierarchical tree $T_{j'}$ transmitted from the data providing apparatus 100. In the example shown in FIG. 14, for example, the cell of the attribute value "Tokyo" is generalized to the attribute value "Kanto" or the attribute value "Japan", or is left as the attribute value "Tokyo" without being generalized. Further, for example, the cell of the attribute value "Osaka" is generalized to the attribute value "Kinki" or the attribute value "Japan", or is left as the attribute value "Osaka" without being generalized.

The processing performing unit 210 changes, for the column $c_{j'}$ of the attribute to be processed, the attribute value $a_{ij'}$ to an attribute value $p\_(k_{ij'}, a_{ij'})$. That is, the processing performing unit 210 sets an attribute value $p\_(k_{ij'}, a_{ij'})$ in a cell in a row i and a column $c_{j'}$. Note that the attribute value $p\_(k_{ij'}, a_{ij'})$ indicates a value that is obtained by generalizing the attribute value $a_{ij'}$ to an attribute value in a layer $k_{ij'}$ in the generalized hierarchical tree $T_{j'}$. For example, when $a_{ij}$="Tokyo" is generalized to the attribute value "Kanto", $k_{ij'}$ is equal to 2 ($k_{ij}$=2) and $p\_(2, a_{ij'})$ is "Kanto" ($p\_(2, a_{ij'})$="Kanto"). Note that when the attribute value $a_{ij'}$ is not generalized, $k_{ij}$ is equal to 1 ($k_{ij}$=1) and $p\_(1, a_{ij'})$ is equal to $a_{ij}$ ($p\_(1, a_{ij'})=a_{ij}$).

The after-processing hash value calculation unit 220 calculates an after-processing hash value for the column of the attribute to be processed (S210). Specifically, the after-processing hash value calculation unit 220 calculates an intermediate hash value $h\_(i, j', k_{ij'})$ corresponding to the already-processed attribute value $p\_(k_{ij'}, a_{ij'})$ of the attribute value $a_{ij'}$ by using the above-shown Expression (2) and the below-shown Expression (8). Expression (8) corresponds to performing the calculation expressed by Expression 3 up to an after-generalization layer $k_{ij'}$. This intermediate hash value $h\_(i, j', k_{ij'})$ corresponds to the after-processing hash value.

[Expression 8]

$$h_{i,j',k+1} = H\left(p_{k,a_{i,j'}} \,\|\, h_{i,j',k}\right) \text{ for } k = 1, \ldots k_{i,j'} - 1 \tag{8}$$

Therefore, the after-processing hash value calculation unit 220 calculates, for a data sequence obtaining by combining an intermediate hash value and an attribute value in a layer corresponding to this intermediate hash value, an intermediate hash value corresponding to an attribute value in a layer higher than that of the aforementioned attribute value in the hierarchical structure. Then, the after-processing hash value calculation unit 220 calculates an intermediate hash value corresponding to the attribute value corresponding to the already-processed processing-target data as the after-processing hash value corresponding to the already-processed processing-target data.

It should be noted that Expression (8) is used when the attribute value is generalized, and is not used when the attribute value is not generalized. When the attribute value $a_{ij'}$ is not generalized, the after-processing hash value calculation unit 220 calculates an intermediate hash value $h_{i,j',1}$, which is the first hash value corresponding to $p\_(1, a_{ij'})=a_{ij'}$, by using Expression (2). This intermediate hash value $h_{i,j',1}$ correspond to the after-processing hash value. That is, the after-processing hash value calculation unit 220 calculates, for an attribute value that has not been processed among the attribute values to be processed (i.e., in the attribute to be processed), a first hash value calculated for a data sequence obtained by using this attribute value and a random number set for this attribute value as the after-processing hash value.

In the example of the generalized hierarchical tree $T_{j'}$ shown in FIG. 14, when the attribute value "Tokyo" is generalized to the attribute value "Kanto" corresponding to $k_{ij}$=2, the after-processing hash value calculation unit 220 calculates the first hash value $h_{i,j',1}$ corresponding to $p\_(1, a_{ij'})=a_{ij}$="Tokyo" by using Expression (2). Then, the after-processing hash value calculation unit 220 calculates the after-processing hash value (intermediate hash value) $h_{i,j',2}$ corresponding to $p\_(2, a_{ij'})$="Kanto" by using Expression (8). On the other hand, when the attribute value "Tokyo" is not generalized, the after-processing hash value calculation unit 220 calculates the after-processing hash value (first hash value) $h_{i,j',1}$ corresponding to $p\_(1, a_{ij'})=a_{ij}$="Tokyo" by using Expression (2).

The after-processing hash value calculation unit 220 sets the intermediate hash value $h\ (i, j', k_{ij'})$ corresponding to the attribute value $p\_(k_{ij'}, a_{ij'})$ in a cell in a row i and a column $c_{j'}$. This intermediate hash value $h\_(i, j', k_{ij'})$ corresponds to the after-processing hash value. A hash chain from the first hash value to a hash value corresponding to the already-processed attribute value is formed by the after-processing hash value.

FIG. 16 shows tables for explaining a process performed by the data processing apparatus 200 according to the second example embodiment. For example, for a column $c_j$ to be processed, a pair of an attribute value $p\_(k_{1j'}, a_{1j'})$ which has been processed (or has not been processed) and an after-processing hash value $h\_(1, j', k_{1j'})$ corresponding thereto as shown by the below-shown Expression (9) is set in a cell of an attribute value $a_{1j'}$ in a row i=1.

[Expression 9]

$$\left(p_{k_{1,j'},a_{1,j'}}, h_{1,j',k_{1,j'}}\right) \tag{9}$$

Similarly, for a column $c_{j'}$ to be processed, a pair of an attribute value $p\_(k_{ij'}, a_{ij'})$ which has been processed (or has not been processed) and an after-processing hash value $h\_(i, j', k_{ij'})$ corresponding thereto as shown by the below-shown Expression (10) is set in a cell of an attribute value $a_{ij'}$ in a row i.

[Expression 10]

$$(p_{k_{i,j'},a_{i,j'}}\ h_{i,j',k_{i,j'}}) \tag{10}$$

Note that if the data processing entity illegitimately processes the attribute value in the column $c_{j'}$ without conforming to the generalized hierarchical tree $T_{j'}$, the above-described hash chain is broken. That is, an appropriate hash chain as shown in the above-shown Expression (6) is not formed by the data processing apparatus 200. Therefore, the illegitimacy will be detected in the subsequent signature verification.

The transmitting unit 230 transmits the data set of which the processing-target data has already been processed (anonymized data), the after-processing hash value corresponding to the processing-target data, and the digital signature to the data receiving apparatus 300 (S222). Specifically, the transmitting unit 230 transmits, to the data receiving apparatus 300, a data set which includes the information of C and C' and in which a pair of the attribute value and the after-processing hash value as shown by Expression (10) is set for a cell (i, $c_j$) of the column $c_{j'}$ to be processed (i.e., a cell in a row i and a column $c_{j'}$). That is, the transmitting unit 230 transmits, to the data receiving apparatus 300, a pair of the attribute value which has been processed (or has not been processed) and the after-processing hash value as shown in Expression (10) for a cell (i, $c_{j'}$) of the column $c_{j'}$ to be processed.

Further, the transmitting unit 230 transmits a signature $\{\sigma_i\}$ for each row and the generalized hierarchical tree $\{T_{j'}\}$ for each column to be processed to the data receiving apparatus 300. Note that the transmitting unit 230 does not transmit the random number table $\{R_{j'}\}$ to the data receiving apparatus 300. That is, for an attribute value that has not been processed among the attribute values to be processed (i.e., in the attribute to be processed), the first hash value is transmitted to the data receiving apparatus 300 as the after-processing hash value. In this way, the signature verification can be performed in the data receiving apparatus 300 without transmitting a random number to the data receiving apparatus 300. Therefore, unlike the comparative example, the data processing apparatus 200 does not transmit a random number to the data receiving apparatus 300.

<Verification Process>

Next, the verification process (S300) performed in the generalization process will be described. In the data receiving apparatus 300, the verification hash value calculation unit 310 calculates a verification hash value (S310). Specifically, the verification hash value calculation unit 310 calculates, for an attribute value $a_{ij}$ in a column $c_j$ of an attribute that is not to be processed and for each row i (for each record), a hash value $h_{ij}$ by using the above-shown Expression (1). The calculated hash value corresponds to the verification hash value for the attribute that is not to be processed.

Further, the verification hash value calculation unit 310 calculates, for the column $c_{j'}$ of an attribute to be processed and for each row i (for each record), a verification hash value $h_{ij'}$ by using the generalized hierarchical tree $T_{j'}$ as follows. The verification hash value calculation unit 310 extracts a pair of an attribute value p_($k_{ij'}$, $a_{ij'}$) which has been processed (or has not been processed), set in a cell (i, $c_{j'}$) and an after-processing hash value h_(i, j', $k_{ij'}$) corresponding thereto (shown by the above-shown Expression (10)).

Next, the verification hash value calculation unit 310 calculates an intermediate hash value corresponding to an attribute value in each layer of the generalized hierarchical tree $T_{j'}$ by using the below-shown Expression (11). Note that p_(k, p_($k_{ij'}$, $a_{ij'}$)) is an attribute value of a parent node of an attribute value p_($k_{ij'}$, $a_{ij'}$) in a layer k of the generalized hierarchical tree $T_{j'}$. Note that when k=$k_{ij'}$, a relation p_($k_{ij'}$, p_($k_{ij'}$, $a_{ij'}$))=p_($k_{ij'}$, $a_{ij'}$) holds.

[Expression 11]

$$h_{i,j',k+1} = H\left(p_{k,p_{k_{i,j'},a_{i,j'}}} \,\|\, h_{i,j',k}\right) \text{ for } k = k_{i,j'}, \ldots\ \ell_{j'} \tag{11}$$

Expression (11) shows that when the initial value k=$k_{ij'}$, a hash value of data obtained by combining the extracted attribute value p_($k_{ij'}$, $a_{ij'}$) and the after-processing hash value h_(i, j', $k_{ij'}$) is calculated as an intermediate hash value corresponding to the attribute value in a layer one level higher than the layer $k_{ij'}$. That is, the verification hash value calculation unit 310 calculates, for a data sequence obtained by combining the after-processing hash value and the attribute value of the already-processed processing-target data, corresponding to this after-processing hash value, an intermediate hash value corresponding to the attribute value in a layer higher than the layer of this attribute value in the hierarchical structure. Note that the initial value in Expression (11) differs from that in Expression (3).

Further, Expression (11) shows that a hash value of data obtained by combining an attribute value p_(k, p_($k_{ij'}$, $a_{ij'}$)) in the layer k and an intermediate hash value $h_{ij',\,k}$ corresponding thereto is calculated as an intermediate hash value $h_{ij',\,k+1}$ corresponding to the attribute value p_((k+1), p_($k_{ij'}$, $a_{ij'}$)) in a layer (k+1). That is, the verification hash value calculation unit 310 calculates, for a data sequence obtained by combining an intermediate hash value and an attribute value in a layer corresponding to this intermediate hash value, an intermediate hash value corresponding to a state of a layer higher than that of this attribute value in the hierarchical structure.

In the example of the generalized hierarchical tree $T_{j'}$ shown in FIG. 14, when $a_{ij}$="Tokyo" is generalized to the attribute value "Kanto", the initial value k is expressed as k=$k_{ij'}$=2 in Expression (11). Therefore, a relation p_($k_{ij'}$, $a_{ij'}$)=p_(2, $a_{ij'}$)="Kanto" holds. Therefore, the verification hash value calculation unit 310 calculates a hash value of data obtained by combining the attribute value "Kanto" and an after-processing hash value $h_{i,\,j',\,2}$ corresponding thereto as an intermediate hash value $h_{i,\,j',\,3}$ corresponding to the attribute value "Japan".

Then, the verification hash value calculation unit 310 calculates a hash value h_(i, j', $l_j$+1) of data obtained by combining an attribute value p_($l_{j'}$, p_($k_{ij'}$, $a_{ij'}$)) in the highest layer $l_{j'}$ and an intermediate hash value h_(i, j', $l_{j'}$) corresponding thereto. The hash value h_(i, j', $l_j$+1) is used as a verification hash value $h_{ij'}$ corresponding to the processing-target data corresponding to a cell in a row i and a column $c_{j'}$. That is, the below-shown Expression (12) holds.

[Expression 12]

$$h_{i,j'} = h_{i,j',\ell_{j'}+1} \tag{12}$$

That is, the verification hash value calculation unit 310 calculates a hash value calculated for a data sequence obtaining by combining an attribute value in the highest layer of the hierarchical structure and an intermediate hash value corresponding to this attribute value as a verification hash value. In the example of the generalized hierarchical tree $T_{j'}$ shown in FIG. 14, the verification hash value calculation unit 310 calculates a hash value $h_{ij',4}$ of data obtained by combining the attribute value "Japan" and an intermediate hash value $h_{ij',3}$ corresponding thereto as a verification hash value $h_{ij'}$ corresponding to a cell in a row i and a column $c_{j'}$.

The verification unit 320 verifies a signature (S322). That is, the verification unit 320 verifies the verification hash value and the digital signature. Specifically, the verification unit 320 calculates, for each row i, a hash value $h_i$ by concatenating all the verification hash values corresponding to the data in respective columns j (columns $c_{j'}$) as shown by the below-shown Expression (13). Then, $\{h_i'\}$ is obtained by calculating a hash value $h_i'$ for each of all the rows i (records).

[Expression 13]

$$h_i' = H(h_{i,1} \| \ldots \| h_{i,j} \| \ldots \| h_{i,j'} \| \ldots) \tag{13}$$

Then, the verification unit 320 verifies, from the obtained $\{h_i'\}$ and a signature $\{\sigma_i\}$ transmitted from the data providing apparatus 100, the signature according to the verification algorithm in the digital signature by using a verification key of the data provider. The verification unit 320 verifies the signature, for example, according to the verification algorithm in the above-described RSA or DSA by using the signature $\{\sigma_i\}$, $\{h_i'\}$, and the verification key. In this way, the verification unit 320 verifies the validity of the already-processed data set provided from the data processing apparatus 200. These facts apply to other example embodiments.

When the verification has succeeded, it is known that no illegitimate processing has occurred (i.e., has been made) by the data processing entity and that the data passed from the data processing entity is based on the data of the data provider. On the other hand, when the verification has failed, it is known that there is a possibility that illegitimate processing has occurred (i.e., has been made) by the data processing entity, or false data other than that based on the data of the data provider is contained in the data passed from the data processing entity. These facts apply to other example embodiments.

Third Example Embodiment

Next, a third example embodiment will be described. In order to clarify the explanation, the following descriptions and drawings are omitted and simplified as appropriate. Further, the same elements are assigned the same reference numerals (or symbols) throughout the drawings, and redundant descriptions thereof are omitted as appropriate. Note that the configuration of a system according to the third example embodiment is substantially the same as that of the system according to the first example embodiment, and therefore descriptions thereof will be omitted. That is, the information processing system 10 according to the third example embodiment includes a data providing apparatus 100, a data processing apparatus 200, and a data receiving apparatus 300. The third example embodiment corresponds to what is obtained by applying the above-described configuration according to the first example embodiment to a case where "deleting" processing (anonymization) is performed.

Figure 17:
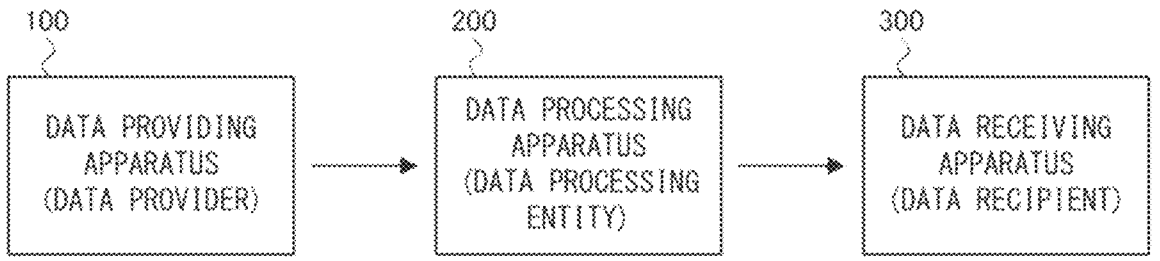
FIG. 17 shows diagrams and tables for explaining a flow of processes performed in an information processing system according to a third example embodiment.
Figure 17:
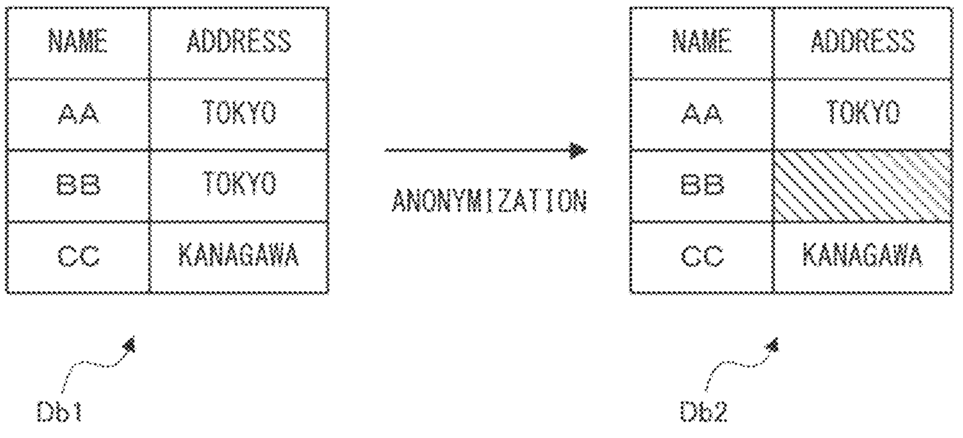

FIG. 17 shows diagrams and tables for explaining a flow of processes performed in the information processing system 10 according to the third example embodiment. FIG. 17 shows an example in which a data set having two columns for attributes "Name" and "Address" is processed (deleted). Similarly to FIG. 12, the column of the attribute "Name" is a column of an attribute that is not to be processed by the data processing apparatus 200 (data processing entity). Meanwhile, the column of the attribute "Address" is a column of an attribute that is to be processed (deleted) by the data processing apparatus 200 (data processing entity). Note that since generalization is not performed in the third example embodiment, the generalized hierarchical tree is unnecessary.

A data set Db1, which is the original data (plaintext), is provided from the data providing apparatus 100 to the data processing apparatus 200. The data set Db1 is substantially the same as the data set Da1 shown in FIG. 12. The data processing apparatus 200 deletes (anonymizes) the attribute value "Tokyo" of the attribute "Address" of the record of the name "BB". Further, the data processing apparatus 200 leaves the attribute value "Tokyo" of the attribute "Address" of the record of the name "AA" as the attribute value "Tokyo", i.e., does not delete it. Further, the data processing apparatus 200 leaves the attribute value "Kanagawa" of the attribute "Address" of the record of the name "CC" as the attribute value "Kanagawa", i.e., does not delete it. In this way, the data processing apparatus 200 generates anonymized data Db2 and transmits the generated anonymized data Db2 to the data receiving apparatus 300 (data recipient).

Note that in this example embodiment, regarding the column of the attributes to be deleted, there are cases where the layers of attributes that are originally the same as each other are changed from one to another after the deleting processing is performed. In the example shown in FIG. 17, the attribute value "Tokyo" of the attribute "Address" of the record of the name "AA" is not deleted. Meanwhile, the attribute value "Tokyo" of the attribute "Address" of the record of the name "BB" is deleted. The attribute value "Kanagawa" of the attribute "Address" of the record of the name "CC" is not deleted.

Further, in this example embodiment, unlike the comparative example, there are cases where the states of the records are changed from one to another after the deleting processing is performed even when the records have attribute values same as each other. In the example shown in FIG. 17, the attribute value "Tokyo" is not deleted in the record of the name "AA", while the attribute value "Tokyo" is deleted in the record of the name "BB".

Similarly to the first example embodiment, the data providing apparatus 100 according to the third example embodiment performs a signature generation process (S100); the data processing apparatus 200 performs a data processing process (S200); and the data receiving apparatus 300 performs a verification process (S300). These processes will be described hereinafter.

<Signature Generation Process>

Firstly, the signature generation process (S100) performed in the deleting processing will be described. In the data providing apparatus 100, similarly to the case of generalization, the processing rule setting unit 110 sets a processing rule for each of attributes of a plurality of data constituting a data set (original data) (S102). Firstly, similarly to the case of generalization, the processing rule setting unit 110 determines, for each column (each attribute) in the data set, whether or not the column (attribute) is to be processed (deleted) as shown in FIG. 13. That is, the processing rule setting unit 110 sets, for each of the attributes to be processed, a rule for deleting a not-yet-processed attribute value (i.e., an attribute value that has not been processed yet).

Then, the processing rule setting unit 110 sets an attribute that is not to be processed (deleted). Further, the processing rule setting unit 110 sets an attribute to be processed (deleted). Note that a set of columns of attributes which are not to be processed is represented by C, and a set of columns of attributes which are to be processed is represented by C'. In this case, for each column, relations $c_j \in C$ and $c_{j'} \in C'$ hold. That is, the index of a column of attributes to be processed is represented by j'. Note that in the case of the deleting processing, the processing rule setting unit 110 does not have to set a generalized hierarchical tree.

The random number setting unit 120 sets predetermined random numbers for states corresponding to a plurality of attribute values that processing-target data about an attribute to be processed (deleted) can take under the processing rule (S104). That is, the random number setting unit 120 sets predetermined random numbers for states corresponding to a plurality of attribute values that the processing-target data can take in the original data. Then, as shown in FIG. 15, the random number setting unit 120 generates a random number table showing random numbers set for respective attribute values. That is, the random number setting unit 120 generates a random number table $R_{j'}$ for a column $c_{j'}$. The random number table $R_{j'}$ can be generated for each column of attributes to be processed.

The signature hash value calculation unit 130 calculates a signature hash value corresponding to each of a plurality of data included in the data set (S110). The signature hash value calculation unit 130 calculates, for an attribute value $a_{ij}$ in a column $c_j$ of an attribute that is not to be processed and for each row i (for each record), a hash value $h_{ij}$ by using a hash function H and using the above-shown Expression (1). The calculated hash value corresponds to the signature hash value for the attribute that is not to be processed.

Further, the signature hash value calculation unit 130 calculates, for the column $c_j$ of an attribute to be processed and for each row i (for each record), a signature hash value $h_{ij'}$ corresponding to the processing-target data corresponding to a cell in a row i and a column $c_{j'}$ by using the random number table $R_{j'}$ and using the below-shown Expressions (14) to (15).

The signature hash value calculation unit 130 calculates a first hash value $h_{ij',1}$ corresponding to the attribute value $a_{ij'}$ by using the below-shown Expression (14).

[Expression 14]

$$h_{i,j',1} = H\left(a_{i,j'} \| r_{a_{i,j'}} + i\right) \tag{14}$$

As shown by Expression (14), the first hash value $h_{ij',1}$ is a hash value obtained for a data sequence obtained by combining an attribute value $a_{ij'}$ and a value obtained by adding a row number i to a random number $r\_a_{ij'}$ corresponding thereto. Note that Expression (14) is substantially the same as the above-shown Expression (2).

Next, the signature hash value calculation unit 130 calculates a hash values $h_{ij',2}$ by using the below-shown Expression (15).

[Expression 15]

$$h_{i,j',2} = H\left(a_{i,j'} \| h_{i,j',1}\right) \tag{15}$$

Expression (15) shows that a hash value $h_{ij',2}$ of data obtained by combining an attribute value $a_{ij'}$ and a first hash value $h_{ij',1}$ corresponding thereto is calculated. Further, the hash value $h_{ij',2}$ is used as a signature hash value $h_{ij'}$ corresponding to the processing-target data corresponding to a cell in a row i and a column $c_{j'}$. That is, the below-shown Expression (16) holds.

[Expression 16]

$$h_{i,j'} = h_{i,j',2} \tag{16}$$

That is, the signature hash value calculation unit 130 calculates a hash value of data obtained by combining the attribute value $a_{ij'}$ and the first hash value $h_{ij',1}$ corresponding thereto as the signature hash value. That is, the signature hash value calculation unit 130 calculates, for the processing-target data, a hash value calculated for a data sequence obtained by combining this processing-target data and the first hash value as the signature hash value.

Note that a hash chain like the one shown by the below-shown Expression 17 is formed by the calculation expressed by Expressions (14) and (15).

[Expression 17]

$$h_{i,j',1} \rightarrow h_{i,j',2} \tag{17}$$

The hash chain shown in Expression (17) is successively formed by a hash value corresponding to the original attribute value (first hash value) and a hash value at the end corresponding to the after-deletion state. Note that the hash value at the end corresponds to the signature hash value. Note that although the generalized hierarchical tree is not required in the deleting processing, it may be interpreted that the hash value related to the deleting processing is calculated along a hierarchy having a height "1".

The signature generation unit 140 generates a digital signature by using signature hash values corresponding to the plurality of data, respectively, (S122). Specifically, the signature generation unit 140 calculates a hash value $h_i$ for each row i substantially in the same manner as being calculated in the second example embodiment. That is, the signature generation unit 140 calculates, for each row i, a hash value $h_i$ by concatenating all the signature hash values corresponding to the data in respective columns j (columns $c_{j'}$) as shown by the above-shown Expression (7). Further, the signature generation unit 140 generates, for the calculated hash value $h_i$, a digital signature $\sigma_i$ according to a digital signature algorithm by using a private key of the data provider substantially in the same manner as being generated in the second example embodiment.

The transmission unit 150 transmits at least the data set, the digital signature, and the random number to the data processing apparatus 200. Specifically, the transmission unit 150 transmits the original data (data set) including information of C and C', the signature $\{\sigma_i\}$ for each row, and the random number table $\{R_{j'}\}$ for each column to be processed to the data processing apparatus 200.

<Data Processing Process>

Next, the data processing process (S200) performed in the deleting processing will be described. In the data processing apparatus 200, the processing performing unit 210 performs a process for performing deleting processing (anonymization) for processing-target data corresponding to an attribute to be processed (S202). The data processing entity performs deleting processing for each attribute value in the column of the attribute to be subjected to the deleting processing.

The after-processing hash value calculation unit 220 calculates an after-processing hash value for the column of the attribute to be processed (S210). Specifically, the after-processing hash value calculation unit 220 calculates an intermediate hash value corresponding to the after-processing state of the attribute value $a_{ij'}$ by using the above-shown Expressions (14) and (15). This intermediate hash value corresponds to the after-processing hash value.

Note that when the attribute value $a_{ij'}$ is deleted, the after-processing hash value calculation unit 220 calculates an intermediate hash value $h_{i,j',2}$ corresponding to the state in which the attribute value $a_{ij'}$ has been deleted by using Expressions (14) and (15). This intermediate hash values $h_{i,j',2}$ correspond to the after-processing hash value. That is, the after-processing hash value calculation unit 220 calculates, for the processing-target data that has already been subjected to the deleting processing, a hash value calculated for a data sequence obtaining by combining this processing-target data and the first hash value as the after-processing hash value.

On the other hand, when the attribute value $a_{ij'}$ is not deleted, the after-processing hash value calculation unit 220 calculates an intermediate hash value $h_{i,j',1}$, which is the first hash value corresponding to the attribute value $a_{ij'}$, by using Expression (14). This intermediate hash value $h_{i,j',1}$ correspond to the after-processing hash value. That is, the after-processing hash value calculation unit 220 calculates, for an attribute value that has not been processed among the attribute values to be processed (i.e., in the attribute to be processed), a first hash value calculated for a data sequence obtained by using this attribute value and a random number set for this attribute value as the after-processing hash value.

FIG. 18 shows tables for explaining a process performed by the data processing apparatus 200 according to the third example embodiment. When the after-processing hash value calculation unit 220 deletes the attribute value $a_{ij'}$ for a cell in a row i and a column $c_{j'}$, it sets an intermediate hash values $h_{i,j',2}$, which is the after-processing hash value corresponding to the after-deletion state, in the cell. In the example shown in FIG. 18, since the attribute value $a_{1j'}$ is deleted for the cell in the row "1", the intermediate hash value $h_{1,j',2}$, which is the after-processing hash value corresponding to the after-deletion state, is set in the cell. On the other hand, when the after-processing hash value calculation unit 220 does not delete the attribute value $a_{ij'}$ for a cell in a row i and a column $c_{j'}$, a pair $(a_{ij'}, h_{i,j',1})$ of the attribute value $a_{ij'}$ and the first hash value $h_{i,j',1}$, which is the after-processing hash value (intermediate hash value) corresponding thereto, is set in the cell.

Note that if the data processing entity illegitimately processes the attribute value in the column $c_{j'}$ without complying with the deleting rule, the above-described hash chain is broken. That is, an appropriate hash chain as shown in the above-shown Expression (17) is not formed by the data processing apparatus 200. Therefore, the illegitimacy will be detected in the subsequent signature verification.

The transmitting unit 230 transmits the data set of which the processing-target data has already been processed (anonymized data), the after-processing hash value corresponding to the processing-target data, and the digital signature to the data receiving apparatus 300 (S222). Specifically, the transmitting unit 230 transmits, to the data receiving apparatus 300, a data set which includes the information of C and C' and in which a pair of the attribute value and the after-processing hash value as shown in FIG. 18 is set for a cell (i, $c_{j'}$) of the column $c_{j'}$ to be processed (i.e., a cell in a row i and a column $c_{j'}$). That is, the transmitting unit 230 transmits, to the data receiving apparatus 300, a pair of the attribute value which has been processed (or has not been processed) and the after-processing hash value for a cell (i, $c_{j'}$) of the column $c_{j'}$ to be processed.

Further, the transmitting unit 230 transmits a signature $\{\sigma_i\}$ for each row to the data receiving apparatus 300. Note that the transmitting unit 230 does not transmit the random number table $\{R_{j'}\}$ to the data receiving apparatus 300. That is, for an attribute value that has not been processed among the attribute values to be processed (i.e., in the attribute to be processed), the first hash value is transmitted to the data receiving apparatus 300 as the after-processing hash value. In this way, the signature verification can be performed in the data receiving apparatus 300 without transmitting a random number to the data receiving apparatus 300. Therefore, the transmitting unit 230 does not transmit a random number to the data receiving apparatus 300.

<Verification Process>

Next, the verification process (S300) performed in the deleting processing will be described. In the data receiving apparatus 300, the verification hash value calculation unit 310 calculates a verification hash value (S310). Specifically, the verification hash value calculation unit 310 calculates, for an attribute value $a_{ij}$ in a column $c_j$ of an attribute that is not to be processed and for each row i (for each record), a hash value $h_{ij}$ by using the above-shown Expression (1). The calculated hash value corresponds to the verification hash value for the attribute that is not to be processed.

Further, the verification hash value calculation unit 310 calculates, for the column $c_j$ of an attribute to be processed and for each row i (for each record), a verification hash value $h_{ij}$ as follows. When the attribute value for the cell (i, $c_{j'}$) has been deleted, the verification hash value calculation unit 310 extracts an after-processing hash value $h_{i,j',2}$ set in this cell. Then, the verification hash value calculation unit 310 uses this after-processing hash values $h_{i,j',2}$ as the verification hash value $h_{ij'}$. That is, the below-shown Expression (18) holds. That is, the verification hash value calculation unit 310 calculates, for the processing-target data that has already been subjected to the deleting processing, an after-processing hash value corresponding to this processing-target data as the verification hash value.

[Expression 18]

$$h_{i,j'} \rightarrow h_{i,j',2} \tag{18}$$

On the other hand, when the attribute value for the cell (i, $c_{j'}$) has not been deleted, the verification hash value calculation unit 310 extracts a pair ($a_{ij'}$, $h_{i,j',1}$) of the attribute value $a_{ij'}$ set in this cell and the after-processing hash values $h_{i,j',1}$ corresponding thereto. Then, the verification hash value calculation unit 310 calculates the verification hash value $h_{ij'}$ as shown by the below-shown Expression (19).

[Expression 19]

$$h_{i,j'} = H(a_{ij'} \| h_{i,j',1}) \tag{19}$$

Expression (19) shows that a hash value of data obtained by combining the attribute value $a_{ij'}$ and the first hash value $h_{ij',1}$ corresponding thereto is calculated as the verification hash value $h_{ij'}$. Note that the right side of Expression (19) corresponds to the hash value $h_{ij',2}$.

The verification unit 320 verifies a signature (S322). That is, the verification unit 320 verifies the verification hash value and the digital signature. Specifically, the verification unit 320 calculates, for each row i, a hash value $h_i$ by concatenating all the verification hash values corresponding to the data in respective columns j (columns $c_{j'}$) as shown by the above-shown Expression (13). Then, $\{h_i'\}$ is obtained by calculating a hash value $h_i'$ for each of all the rows i (records). Then, similarly to the second example embodiment, the verification unit 320 verifies, from the obtained $\{h_i'\}$ and a signature $\{\sigma_i\}$ transmitted from the data providing apparatus 100, the signature according to the verification algorithm in the digital signature by using a verification key of the data provider.

Fourth Example Embodiment

Next, a fourth example embodiment will be described. In order to clarify the explanation, the following descriptions and drawings are omitted and simplified as appropriate. Further, the same elements are assigned the same reference numerals (or symbols) throughout the drawings, and redundant descriptions thereof are omitted as appropriate. Note that the configuration of a system according to the fourth example embodiment is substantially the same as that of the system according to the first example embodiment, and therefore descriptions thereof will be omitted. That is, the information processing system 10 according to the fourth example embodiment includes a data providing apparatus 100, a data processing apparatus 200, and a data receiving apparatus 300. The fourth example embodiment corresponds to what is obtained by applying the above-described configuration according to the first example embodiment to a case where "generalizing" and "deleting" processing (anonymization) is performed. In other words, in the fourth example embodiment, the "generalizing" processing is extended to "deleting" processing.

Figure 19:
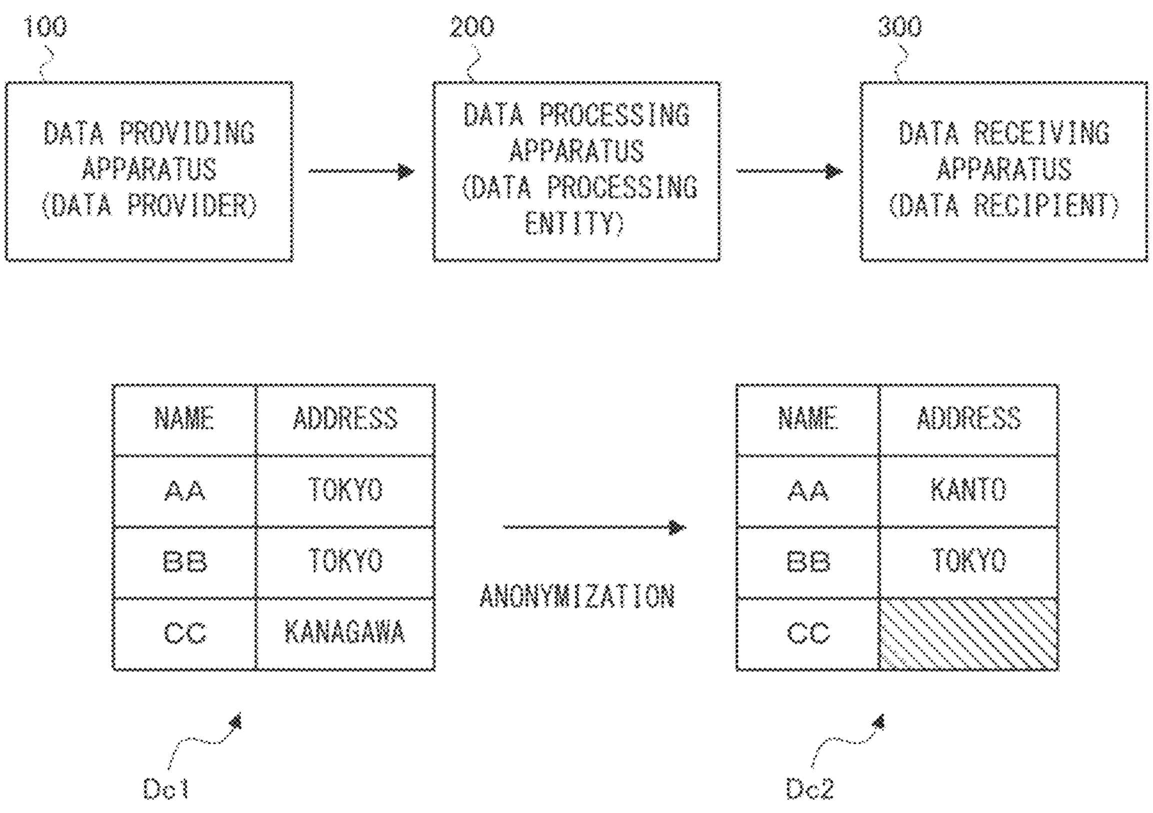
FIG. 19 shows diagrams and tables for explaining a flow of processes performed in information processing system according to a fourth example embodiment.

FIG. 19 shows diagrams and tables for explaining a flow of processes performed in the information processing system 10 according to the fourth example embodiment. FIG. 19 shows an example in which a data set having two columns for attributes "Name" and "Address" is processed (generalized and deleted). Further, the column of the attribute "Name" is a column of an attribute that is not to be processed by the data processing apparatus 200 (data processing entity). Meanwhile, the column of the attribute "Address" is a column of an attribute that is processed (generalized and deleted) by the data processing apparatus 200 (data processing entity). That is, in the data set, there are a column of an attribute that is processed and a column of an attribute that is not processed in a mixed manner. Further, generalizing and deleting processing can be performed in a column of one attribute to be processed. That is, there can be a record to be generalized, a record to be deleted, and a record to be neither processed nor deleted in a mixed manner in the same column.

A data set Dc1, which is the original data (plaintext), is provided from the data providing apparatus 100 to the data processing apparatus 200. The data set Dc1 is substantially the same as the data set Da1 shown in FIG. 12. The data processing apparatus 200 generalizes (anonymizes) the attribute value "Tokyo" of the attribute "Address" of the record of the name "AA" to the attribute value "Kanto". Further, the data processing apparatus 200 leaves the attribute value "Kanto". "Tokyo" of the attribute "Address" of the record of the name "BB" as the attribute value "Tokyo", i.e., does not process it. Further, the data processing apparatus 200 deletes (anonymizes) the attribute value "Kanagawa" of the attribute "Address" of the record of the name "CC". In this way, the data processing apparatus 200 generates anonymized data Dc2 and transmits the generated anonymized data Dc2 to the data receiving apparatus 300 (data recipient).

Note that in this example embodiment, regarding the column of the attribute to be generalized and deleted, there are cases where the layers of attributes that are originally the same as each other are changed from one to another after they are generalized. In the example shown in FIG. 19, the attribute value "Tokyo" of the attribute "Address" of the record of the name "AA" is generalized to an attribute value in a layer one level higher than the original layer. Meanwhile, the attribute value "Tokyo" of the attribute "Address" of the record of the name "BB" is not generalized. The attribute value "Kanagawa" of the attribute "Address" of the record of the name "CC" is deleted.

Further, in this example embodiment, unlike the comparative example, there are cases where the layers of the records are changed from one to another after they are generalized even when the records have attribute values same as each other. In the example shown in FIG. 19, while the attribute value "Tokyo" in the record of the name "AA" is generalized to the attribute value "Kanto" in the layer one level higher than the original layer, the attribute value "Tokyo" in the record of the name "BB" remains as the attribute value "Tokyo", i.e., is not generalized.

Similarly to the first example embodiment, the data providing apparatus 100 according to the fourth example embodiment performs a signature generation process (S100); the data processing apparatus 200 performs a data processing process (S200); and the data receiving apparatus 300 performs a verification process (S300). These processes will be described hereinafter.

<Signature Generation Process>

Firstly, the signature generation process (S100) performed in the generalizing and deleting processing will be described. In the data providing apparatus 100, the processing rule setting unit 110 sets a processing rule for each of attributes of a plurality of data constituting a data set (original data) as being set in the second example embodiment (S102). Firstly, similarly to the second example embodiment, the processing rule setting unit 110 determines, for each column (each attribute) in the data set, whether or not the column (attribute) in the data set should be processed (generalized and deleted) as shown in FIG. 13. That is, the processing rule setting unit 110 sets, for each of the attributes to be processed, a rule for processing a not-yet-processed attribute value.

Then, the processing rule setting unit 110 sets an attribute that is not to be processed. Further, the processing rule setting unit 110 sets an attribute to be processed. Note that a set of columns of attributes which are not to be processed is represented by C, and a set of columns of attributes which are to be processed is represented by C'. In this case, for each column, relations $c_j \in C$ and $c_{j'} \in C'$ hold. That is, the index of a column of attributes to be processed is represented by j'.

Further, the processing rule setting unit 110 sets a generalized hierarchical tree $T_{j'}$ for the columns $c_{j'}$ of attributes to be processed. That is, the processing rule setting unit 110 sets, for each of the attributes to be processed, a generalized hierarchical tree $T_{j'}$ showing a rule for processing (generalizing and deleting) the not-yet-processed attribute value. Note that in the fourth example embodiment, the generalized hierarchical tree $T_{j'}$ has such a hierarchical structure that it shows that the higher the layer of an attribute value is, the more the attribute value has been generalized, and the highest layer indicates a state in which the attribute value is to be deleted. That is, the processing rule setting unit 110 sets, in a layer higher than the second layer from the top, which is the most generalized layer in the generalized hierarchical tree, a state in which the attribute value of the processing-target data is to be deleted. Therefore, in the fourth example embodiment, the "deleting" processing may correspond to further generalizing the most generalized attribute value. Note that the generalized hierarchical tree $T_{j'}$ can be set for each column of attributes to be processed. Note that the height of the generalized hierarchical tree $T_{j'}$ is represented by $l_{j'}$.

Figure 20:
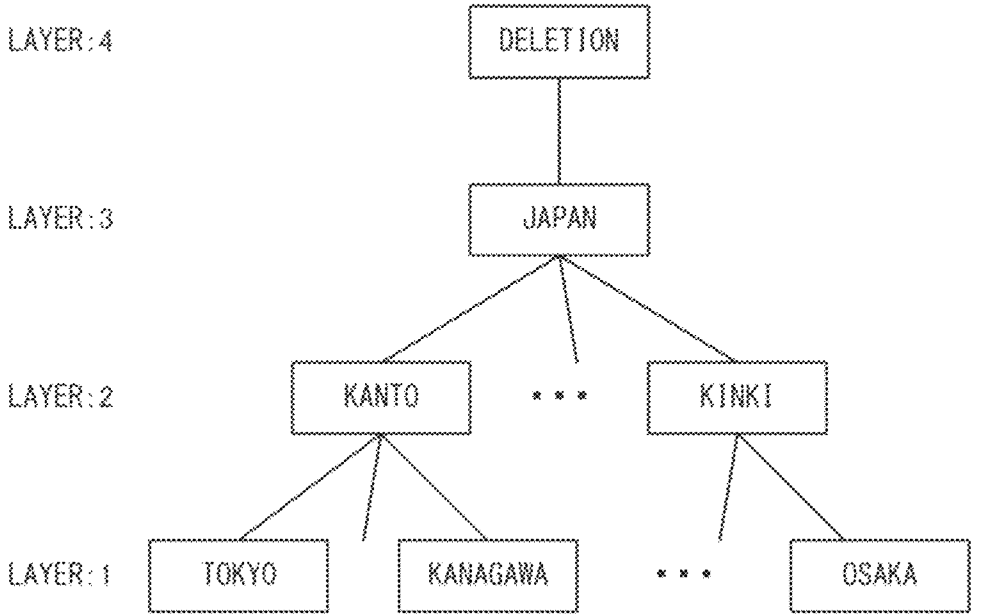
FIG. 20 shows an example of a generalized hierarchical tree according to the fourth example embodiment.

FIG. 20 shows a diagram for explaining the generalized hierarchical tree $T_{j'}$ according to the fourth example embodiment. FIG. 20 shows an example of the generalized hierarchical tree $T_{j'}$ in which a column of the attribute "Address" is represented by $c_{j'}$. In this example, the height $l_{j'}$ of the generalized hierarchical tree $T_{j'}$ is four ($l_j$=4). Further, the layer "1" (leaf nodes) corresponds to the "Prefecture Name" such as attribute values "Tokyo", "Kanagawa", and "Osaka". Further, the layer "2" (intermediate nodes) corresponds to the "Region Name" such as "Kanto" and "Kinki (region)" which are more abstracted than the prefectures. Further, the layer "3" (intermediate node) corresponds to the "Country Name" which is "Japan" and is the most abstracted. Further, the layer "4" (root node) corresponds to the state in which the attribute value has been deleted. Note that the state of the layer "4" can be considered to be a "state in which an attribute value is generalized to deletion".

The random number setting unit 120 sets predetermined random numbers for states corresponding to a plurality of attribute values that the processing-target data about the attribute to be processed can take under the processing rule (S104). That is, the random number setting unit 120 sets predetermined random numbers for states corresponding to a plurality of attribute values that the processing-target data can take in the original data. Then, as shown in FIG. 15, the random number setting unit 120 generates a random number table showing random numbers set for respective attribute values. That is, the random number setting unit 120 generates a random number table $R_{j'}$ for a column $c_{j'}$. The random number table $R_{j'}$ can be generated for each column of attributes to be processed.

The signature hash value calculation unit 130 calculates a signature hash value corresponding to each of a plurality of data included in the data set (S110). The signature hash value calculation unit 130 calculates, for an attribute value $a_{ij}$ in a column $c_j$ of an attribute that is not to be processed and for each row i (for each record), a hash value $h_{ij}$ by using a hash function H and using the above-shown Expression (1). The calculated hash value corresponds to the signature hash value for the attribute that is not to be processed.

Further, the signature hash value calculation unit 130 calculates, for the column $c_j$ of an attribute to be processed and for each row i (for each record), a signature hash value $h_{ij'}$ corresponding to the processing-target data for a cell in a row i and a column $c_{j'}$ by using the random number table $R_{j'}$ and using the below-shown Expressions (20) to (22). Note that it is assumed that the attribute value $a_{ij'}$ is an attribute value in the layer "1" in the generalized hierarchical tree $T_{j'}$. Further, it is assumed that the attribute value of a parent node in a layer k of the attribute value $a_{ij'}$ is expressed as p_(k, $a_{ij'}$). Note that a relation p_(1, $a_{ij'}$)=$a_{ij'}$ holds. In the example of the generalized hierarchical tree $T_{j'}$ shown in FIG. 20, when p_(1, $a_{ij'}$)=$a_{ij}$="Tokyo", relations p_(2, $a_{ij'}$)="Kanto" and p_(3, $a_{ij'}$)="Japan" hold. Further, an intermediate hash value corresponding to the state of a layer k (an attribute value, or a state in which an attribute value has been deleted) is represented by $h_{ij', k}$.

The signature hash value calculation unit 130 calculates a first hash value $h_{ij', 1}$ corresponding to the attribute value $a_{ij'}$ by using the below-shown Expression (20).

[Expression 20]

$$h_{i,j',1} = H\left(a_{i,j'} \| r_{a_{i,j'}} + i\right) \tag{20}$$

As shown in Expression (20), the first hash value $h_{ij', 1}$ is a hash value obtained for a data sequence obtained by combining the attribute value $a_{ij'}$ and a value obtained by adding a row number i to a random number r_$a_{ij'}$ corresponding thereto. Note that Expression (20) is substantially the same as the above-described Expression (2).

Next, the signature hash value calculation unit 130 calculates an intermediate hash value corresponding to an attribute value of each layer of the generalized hierarchical tree $T_{j'}$ by using the below-shown Expression (21).

[Expression 21]

$$h_{i,j',k+1} = H\left(p_{k,a_{i,j'}} \| h_{i,j',k}\right) \tag{21}$$

$$\text{for}$$

$$k = 1, \ldots \ell_{j'} - 1$$

Expression (21) shows that a hash value of data obtained by combining an attribute value p_(k, $a_{ij'}$) in a layer k and an intermediate hash value $h_{ij', k}$ corresponding thereto is calculated as an intermediate hash value $h_{ij', k+1}$ corresponding to an attribute value p_((k+1), $a_{ij'}$) in a layer (k+1). That is, the signature hash value calculation unit 130 calculates, for a data sequence obtained by combining an intermediate hash value and a state (attribute value) of a layer corresponding to this intermediate hash value, an intermediate hash value corresponding to a state (attribute value) of a layer higher than that of the state (attribute value) of the layer corresponding to the aforementioned intermediate hash value in the hierarchical structure.

Note that in Expression (21), when k=1, it becomes the above-shown Expression (4). Note that as described above, a relation p_(1, $a_{ij'}$)=$a_{ij'}$ holds. Therefore, in this example embodiment, the attribute value $a_{ij'}$ of the data set (original data) is used twice, i.e., used in Expression (20) for calculating the first hash value and in Expression (21) (Expression (4)) for calculating an intermediate hash value corresponding to a state (attribute value) of a layer one level higher.

Further, in Expression (21), when k=$l_{j'}$−1, an intermediate hash value h_(i, j', $l_{j'}$) corresponding to the state corresponding to the highest layer (state in which the attribute value has been deleted) is calculated. That is, an intermediate hash value h_(i, j', $l_{j'}$) is calculated for data obtained by combining the attribute value p_(($l_{j'}$−1), $a_{ij'}$) in the second layer from the top ("Japan" in the example shown in FIG. 20) and the intermediate hash value h_(i, j', $l_{j'}$−1) corresponding to this attribute value.

Further, the signature hash value calculation unit 130 calculates a hash value h_(i, j', $l_{j'}$+1) of the intermediate hash value h_(i, j', $l_{j'}$) corresponding to the state of the highest layer $l_{j'}$ (state in which an attribute value has been deleted) by using the below-shown Expression (22). Note that since there is no attribute value corresponding to the intermediate hash value h_(i, j', $l_{j'}$) (the attribute value has been deleted), no attribute value is combined on the right side of Expression (22) when the hash value is calculated.

[Expression 22]

$$h_{i,j',\ell_{j'}+1} = H\left(h_{i,j',\ell_{j'}}\right) \tag{22}$$

The hash value h_(i, j', $l_{j'}$+1) is used as a signature hash value $h_{ij'}$ corresponding to the processing-target data corresponding to a cell in a row i and a column $c_{j'}$. That is, the below-shown Expression (23) holds.

[Expression 23]

$$h_{i,j'} = h_{i,j',\ell_{j'}+1} \tag{23}$$

That is, the signature hash value calculation unit 130 calculates a hash value calculated for an intermediate hash value corresponding to the state of the highest layer in the hierarchical structure as the signature hash value. Further, the signature hash value calculation unit 130 calculates a hash value calculated for an intermediate hash value calculated for a data sequence obtaining by combining an attribute value of the second layer from the top in the hierarchical structure and an intermediate hash value corresponding to this attribute value as the signature hash value.

In the example of the generalized hierarchical tree $T_{j'}$ shown in FIG. 20, the signature hash value calculation unit 130 calculates an intermediate hash value $h_{ij', 4}$ for data obtained by combining the attribute value "Japan" in the second layer (k=$l_{j'}$−1) from the top and an intermediate hash value $h_{ij', 3}$ corresponding thereto by Expression (21). Then, the signature hash value calculation unit 130 calculates a hash value $h_{ij', 5}$ for the intermediate hash value $h_{ij', 4}$ by Expression (22). By Expression (23), the hash value $h_{ij', 5}$ is used as a signature hash value $h_{ij'}$ corresponding to a cell in a row i and a column $c_{j'}$.

Note that by performing the calculations expressed by Expressions (20) to (23) from a layer k=1 to the highest layer k=$l_{j'}$, a hash chain is formed along the generalized hierarchical tree $T_{j'}$ as shown by the below-shown Expression (24).

[Expression 24]

$$h_{i,j',1} \rightarrow h_{i,j',2} \rightarrow \cdots \rightarrow h_{i,j',\ell_{j'}-1} \rightarrow h_{i,j',\ell_{j'}} \rightarrow h_{i,j',\ell_{j'}+1} \tag{24}$$

The hash chain shown by Expression (24) is formed as follows. That is, they are formed in the order of the first hash value corresponding to an attribute value in a layer k=1, an intermediate hash value corresponding to an attribute value in a layer k=2, . . . , an intermediate hash value corresponding to an attribute value in a layer k=$l_{j'}$−1, an intermediate hash value corresponding to a state of a layer k=$l_{j'}$, and the hash value at the end. In the example of the generalized hierarchical tree shown in FIG. 20, the hash chain is formed by the first hash value corresponding to the attribute value "Tokyo", the intermediate hash value corresponding to the attribute value "Kanto", the intermediate hash value corresponding to the attribute value "Japan", the intermediate hash value corresponding to "Deletion", and the hash value at the end. Note that the hash value at the end corresponds to the signature hash value. In other words, Expressions (20) to (22) indicate that intermediate hash values are calculated from the first hash value to the hash value at the end along the generalized hierarchical tree $T_{j'}$.

The signature generation unit 140 generates a digital signature by using signature hash values corresponding to the plurality of data, respectively, (S122). Specifically, the signature generation unit 140 calculates a hash value $h_i$ for each row i substantially in the same manner as being calculated in the second example embodiment. That is, the signature generation unit 140 calculates, for each row i, a hash value $h_i$ by concatenating all the signature hash values corresponding to the data in respective columns j (columns $c_{j'}$) as shown by the above-shown Expression (7). Further, the signature generation unit 140 generates, for the calculated hash value $h_i$, a digital signature $\sigma_i$ according to a digital signature algorithm by using a private key of the data provider substantially in the same manner as being generated in the second example embodiment.

The transmission unit 150 transmits at least the data set, the digital signature, and the random number to the data processing apparatus 200. Specifically, the transmission unit 150 transmits the original data (data set) including information of C and C', the signature {$\sigma_i$} for each row, the generalized hierarchical tree {$T_{j'}$} for each column to be processed, and the random number table {$R_{j'}$} for each column to be processed to the data processing apparatus 200.

<Data Processing Process>

Next, the data processing process (S200) performed in the generalizing and deleting processing will be described. In the data processing apparatus 200, the processing performing unit 210 performs a process for performing generalizing or deleting processing (anonymization) for processing-target data corresponding to the attribute to be processed (S202). The data processing entity performs generalizing or deleting processing for each attribute value in the column of the attribute to be subjected to the generalizing processing according to the generalized hierarchical tree $T_{j'}$ transmitted from the data providing apparatus 100. In the example shown in FIG. 20, for example, the cell of the attribute value “Tokyo” is generalized to the attribute value “Kanto” or the attribute value “Japan”, or is left as the attribute value “Tokyo” without being generalized, or the attribute value is deleted. The cell of the attribute value “Osaka” is generalized to the attribute value “Kinki” or the attribute value “Japan”, or is left as the attribute value “Osaka” without being generalized, or the attribute value is deleted.

When the attribute value in the column $c_{j'}$ of the attribute to be processed is not deleted, the processing performing unit 210 changes the attribute value $a_{ij'}$ to an attribute value p_($k_{ij'}$, $a_{ij'}$). That is, the processing performing unit 210 sets an attribute value p_($k_{ij'}$, $a_{ij'}$) in a cell in a row i and a column $c_{j'}$. Note that $k_{ij'}$ is expressed as $k_{ij}$=1, . . . , $l_{j}$−1. Note that when $k_{ij}$=$l_{j'}$, the attribute value p_($k_{ij'}$, $a_{ij'}$) is not present because the attribute value has already been deleted.

Note that the attribute value p_($k_{ij'}$, $a_{ij'}$) indicates a value that is obtained by generalizing the attribute value $a_{ij'}$ to an attribute value in a layer $k_{ij'}$ in the generalized hierarchical tree $T_{j'}$. For example, when $a_{ij}$=“Tokyo” is generalized to the attribute value “Kanto”, $k_{ij'}$ is equal to 2 ($k_{ij}$=2) and p_(2, $a_{ij'}$) is “Kanto” (p_(2, $a_{ij'}$)=“Kanto”). Note that when the attribute value $a_{ij'}$ is not generalized, $k_{ij'}$ is equal to 1 ($k_{ij'}$=1) and p_(1, $a_{ij'}$) is equal to $a_{ij}$ (p_(1, $a_{ij'}$)=$a_{ij}$).

The after-processing hash value calculation unit 220 calculates an after-processing hash value for the column of the attribute to be processed (S210). Specifically, when the generalizing processing is to be performed, the after-processing hash value calculation unit 220 calculates an intermediate hash value h_(i, j', $k_{ij'}$) corresponding to the already-processed attribute value p_($k_{ij'}$, $a_{ij'}$) of the attribute value $a_{ij'}$ by using the above-shown Expression (20) and the below-shown Expression (25). Expression (25) corresponds to performing the calculation expressed by Expression (21) up to an after-generalization layer $k_{ij}$−1. This intermediate hash value h_(i, j', $k_{ij'}$) corresponds to the after-processing hash value. Note that $k_{ij'}$ is expressed as $k_{ij}$=2, . . . , $l_{j}$−1.

[Expression 25]

$$h_{i,j',k+1} = H\left(p_{k,a_{i,j'}} \| h_{i,j',k}\right) \quad \text{for} \quad k = 1, \ldots k_{i,j'} - 1 \tag{25}$$

Therefore, the after-processing hash value calculation unit 220 calculates, for a data sequence obtaining by combining an intermediate hash value and an attribute value in a layer corresponding to this intermediate hash value, an intermediate hash value corresponding to an attribute value in a layer higher than that of the aforementioned attribute value in the hierarchical structure. Then, when the processing-target data has been subjected to the generalizing processing, the after-processing hash value calculation unit 220 calculates an intermediate hash value corresponding to the attribute value corresponding to the already-processed processing-target data as the after-processing hash value corresponding to the already-processed processing-target data.

It should be noted that Expression (25) is used when the attribute value is processed (generalized or deleted), and is not used when the attribute value is not processed. When the attribute value $a_{ij'}$ is not to be processed, the after-processing hash value calculation unit 220 calculates an intermediate hash value $h_{i,j',1}$, which is the first hash value corresponding to p_(1, $a_{ij'}$)=$a_{ij'}$, by using Expression (20). This intermediate hash value $h_{i,j',1}$ correspond to the after-processing hash value. That is, the after-processing hash value calculation unit 220 calculates, for an attribute value that has not been processed among the attribute values to be processed (i.e., in the attribute to be processed), a first hash value calculated for a data sequence obtained by using this attribute value and a random number set for this attribute value as the after-processing hash value.

Further, when the deleting processing is to be performed, the after-processing hash value calculation unit 220 calculates an intermediate hash value h_(i, j', $l_{j'}$) corresponding to the state, in the layer $l_{j'}$, in which the attribute value $a_{ij'}$ has been deleted by using the above-shown Expressions (20) and (21). This intermediate hash value h_(i, j', $l_{j'}$) corresponds to the after-processing hash value. That is, when the processing-target data has been subjected to the deleting processing, the after-processing hash value calculation unit 220 calculates an intermediate hash value corresponding to the state of the highest layer in the hierarchical structure as the after-processing hash value corresponding to the already-processed processing-target data. In other words, the after-processing hash value calculation unit 220 calculates an intermediate hash value calculated for a data sequence obtaining by combining the attribute value of the second layer from the top in the hierarchical structure and the intermediate hash value corresponding to this attribute value as the after-processing hash value.

In the example of the generalized hierarchical tree $T_{j'}$ shown in FIG. 20, when the attribute value “Tokyo” is generalized to the attribute value “Kanto”, the after-processing hash value calculation unit 220 calculates the first hash value $h_{i,j',1}$ corresponding to p_(1, $a_{ij'}$)=$a_{ij}$=“Tokyo” by using Expression (20). Then, the after-processing hash value calculation unit 220 calculates the after-processing hash value (intermediate hash value) $h_{i,j',2}$ corresponding to p_(2, $a_{ij'}$)=“Kanto” by using Expression (25). On the other hand, when the attribute value “Tokyo” is not to be processed, the after-processing hash value calculation unit 220 calculates the first hash value $h_{i,j',1}$, which is the after-processing hash value corresponding to p_(1, $a_{ij'}$)=$a_{ij}$=“Tokyo”, by using Expression (20). Further, when the attribute value “Tokyo” is deleted, the after-processing hash value calculation unit 220 calculates the first hash value $h_{i,j',1}$ corresponding to p_(1, $a_{ij'}$)=$a_{ij}$=“Tokyo” by using Expression (20). Then, the after-processing hash value calculation unit 220 calculates the after-processing hash value (intermediate hash value) h_(i, j', $l_{j'}$) corresponding to the after-deletion state by using Expression (21).

The after-processing hash value calculation unit 220 sets an intermediate hash value h_(i, j', $k_{ij'}$) corresponding to the attribute value p_($k_{ij'}$, $a_{ij'}$) in the cell in a row i and a column $c_{j'}$ which has been subjected to the generalizing processing or has not been subjected thereto. Further, the after-processing hash value calculation unit 220 sets an intermediate hash value h_(i, j', $l_{j'}$) in the cell in a row i and a column $c_{j'}$ which has been subjected to the deleting processing. These intermediate hash values h_(i, j', $k_{ij'}$) and h_(i, j', $l_{j'}$) correspond to the after-processing hash values. A hash chain from the first hash value to a hash value corresponding to the already-processed attribute value is formed by the after-processing hash value.

FIG. 21 shows tables for explaining a process performed by the data processing apparatus 200 according to the fourth example embodiment. For a row i, generalizing processing has been performed or has not been performed. Further, for a row i', deleting processing has been performed.

In this case, for the column $c_{j'}$ to be processed, a pair of an attribute value p_($k_{ij'}$, $a_{ij'}$) which has been generalized (or has not been processed) and an after-processing hash value h_(i, j', $k_{ij'}$) corresponding thereto, as shown by the below-shown Expression (10), is set in the cell of the attribute value $a_{ij'}$ in the row i. Meanwhile, for the column $c_{j'}$ to be processed, an intermediate hash value h_(i', j', $l_{j'}$), which is the after-processing hash value corresponding to the after-deletion state, is set in the cell of the attribute value $a_{i'j'}$ in the row i', Note that if the data processing entity illegitimately processes the attribute value in the column $c_{j'}$ without conforming to the generalized hierarchical tree $T_{j'}$, the hash chain is broken. That is, an appropriate hash chain as shown in the above-shown Expression (24) is not formed by the data processing apparatus 200. Therefore, the illegitimacy will be detected in the subsequent signature verification.

The transmitting unit 230 transmits the data set which include information about C and C' and of which processing-target data has already been processed (anonymized data), the after-processing hash value corresponding to the processing-target data, and the digital signature to the data receiving apparatus 300 (S222). Specifically, the transmitting unit 230 transmits, for the cell (i, $c_{j'}$) in the column $c_{j'}$ to be processed (cell in a row i and a column $c_{j'}$), a data set in which a pair of the attribute value and the after-processing hash value, or the after-processing hash value corresponding to the after-deletion state is set to the data receiving apparatus 300.

Further, the transmitting unit 230 transmits a signature $\{\sigma_i\}$ for each row and the generalized hierarchical tree $\{T_{j'}\}$ for each column to be processed to the data receiving apparatus 300. Note that the transmitting unit 230 does not transmit the random number table $\{R_{j'}\}$ to the data receiving apparatus 300. That is, for an attribute value that has not been processed among the attribute values to be processed, the first hash value is transmitted to the data receiving apparatus 300 as the after-processing hash value. In this way, the signature verification can be performed in the data receiving apparatus 300 without transmitting a random number to the data receiving apparatus 300. Therefore, the transmitting unit 230 does not transmit a random number to the data receiving apparatus 300.

<Verification Process>

Next, the verification process (S300) performed in the generalization and deleting processing will be described. In the data receiving apparatus 300, the verification hash value calculation unit 310 calculates a verification hash value (S310). Specifically, the verification hash value calculation unit 310 calculates, for an attribute value $a_{ij}$ in a column $c_j$ of an attribute that is not to be processed and for each row i (for each record), a hash value $h_{ij}$ by using the above-shown Expression (1). The calculated hash value corresponds to the verification hash value for the attribute that is not to be processed.

Further, the verification hash value calculation unit 310 calculates, for the column $c_{j'}$ of an attribute to be processed and for each row i (for each record), a verification hash value $h_{ij'}$ by using the generalized hierarchical tree $T_{j'}$ as follows. Firstly, a cell for which generalizing processing has already been performed or has not been performed will be described. The verification hash value calculation unit 310 extracts a pair of an attribute value p_($k_{ij'}$, $a_{ij'}$) which has been processed (or has not been processed), set in the cell (i, $c_{j'}$) and an after-processing hash value h_(i, j', $k_{ij'}$) corresponding thereto.

The verification hash value calculation unit 310 calculates an intermediate hash value corresponding to an attribute value in each layer of the generalized hierarchical tree $T_{j'}$ by using the below-shown Expression (26). Note that p_(k, p_($k_{ij'}$, $a_{ij'}$)) is an attribute value of a parent node of an attribute value p_($k_{ij'}$, $a_{ij'}$) in a layer k of the generalized hierarchical tree $T_{j'}$. Note that when k=$k_{ij'}$, a relation p_($k_{ij'}$, p_($k_{ij'}$, $a_{ij}$))=p_($k_{ij'}$, $a_{ij'}$) holds.

[Expression 26]

$$h_{i,j',k+1} = H\left(p_{k,p_{k_{i,j'},a_{i,j'}}} \| h_{i,j',k}\right) \tag{26}$$

for $$k = k_{i,j'}, \ldots \ell_{j'} - 1$$

Expression (26) shows that when the initial value k=$k_{ij'}$, a hash value of data obtained by combining the extracted attribute value p_($k_{ij'}$, $a_{ij'}$) and the after-processing hash value h_(i, j', $k_{ij'}$) is calculated as an intermediate hash value corresponding to the attribute value in a layer one level higher than the layer $k_{ij'}$. That is, the verification hash value calculation unit 310 calculates, for a data sequence obtained by combining the after-processing hash value and the attribute value of the already-processed processing-target data, corresponding to this after-processing hash value, an intermediate hash value corresponding to the attribute value in a layer higher than the layer of this attribute value in the hierarchical structure. Note that the initial value in Expression (26) differs from that in Expression (21). Further, the final value in Expression (26) differs from that is Expression (11).

Further, Expression (26) shows that a hash value of data obtained by combining an attribute value p_(k, p_($k_{ij'}$, $a_{ij'}$)) in the layer k and an intermediate hash value $h_{ij',\ k}$ corresponding thereto is calculated as an intermediate hash value $h_{ij',\ k+1}$ corresponding to the attribute value p_((k+1), p_($k_{ij'}$, $a_{ij'}$)) in a layer (k+1). That is, the verification hash value calculation unit 310 calculates, for a data sequence obtained by combining an intermediate hash value and an attribute value in a layer corresponding to this intermediate hash value, an intermediate hash value corresponding to a state of a layer higher than that of this attribute value in the hierarchical structure.

Further, in Expression (26), when k=$l_j$−1, an intermediate hash value h_(i, j', $l_{j'}$) corresponding to the state corresponding to the highest layer (state in which the attribute value has been deleted) is calculated. That is, an intermediate hash value h_(i, j', $l_{j'}$) is calculated for data obtained by combining the attribute value p_(($l_j$−1), $a_{ij'}$) in the second layer from the top ("Japan" in the example shown in FIG. 20) and the intermediate hash value h_(i, j', $l_j$−1) corresponding to this attribute value.

Further, the verification hash value calculation unit 310 calculates a hash value h_(i, j', $l_j$+1) of the intermediate hash value h_(i, j', $l_{j'}$) corresponding to the state of the highest layer $l_{j'}$ (state in which an attribute value has been deleted) by using the below-shown Expression (27).

[Expression 27]

$$h_{i,j',\ell_{j'}+1}=H\left(h_{i,j',\ell_{j'}}\right) \tag{27}$$

The hash value h_(i, j', $l_{j'}$+1) is used as a verification hash value $h_{ij'}$ corresponding to the processing-target data corresponding to a cell in a row i and a column $c_{j'}$. That is, the below-shown Expression (28) holds. That is, the verification hash value calculation unit 310 calculates a hash value calculated for an intermediate hash value corresponding to the state of the highest layer in the hierarchical structure as the verification hash value.

[Expression 28]

$$h_{i,j'}=h_{i,j',\ell_{j'}+1} \tag{28}$$

In the example of the generalized hierarchical tree $T_{j'}$ shown in FIG. 20, when $a_{ij'}$="Tokyo" is generalized to the attribute value "Kanto", the initial value k is expressed as k=$k_{ij'}$=2. Therefore, a relation p_($k_{ij'}$, $a_{ij'}$)=p_(2, $a_{ij'}$)="Kanto" holds. Therefore, the verification hash value calculation unit 310 calculates a hash value of data obtained by combining the attribute value "Kanto" and an after-processing hash value $h_{i, j', 2}$ corresponding thereto as an intermediate hash value $h_{i, j', 3}$ corresponding to the attribute value "Japan". The verification hash value calculation unit 310 calculates a hash value of data obtained by combining the attribute value "Japan" and the after-processing hash value $h_{i, j', 3}$ corresponding thereto as an intermediate hash value $h_{i, j', 4}$ corresponding to "Deletion". Then, the verification hash value calculation unit 310 calculates a hash value $h_{i, j', 5}$ for the intermediate hash value $h_{i, j', 4}$ corresponding to "Deletion" as the verification hash value $h_{ij'}$.

Next, a cell that has already been subjected to deleting processing will be described. The verification hash value calculation unit 310 extracts an after-processing hash value h_(i, j', $l_{j'}$) corresponding to "Deletion", set in the cell (i, $c_{j'}$). Then, the verification hash value calculation unit 310 calculates a hash value h_(i, j', $l_{j'}$+1) for the after-processing hash value h_(i, j', $l_{j'}$) by the above-shown Expression (27).

The hash value h_(i, j', $l_{j'}$+1) is used as a verification hash value $h_{ij'}$ corresponding to the processing-target data corresponding to a cell in a row i and a column $c_{j'}$. That is, the above-shown Expression (28) holds. That is, the verification hash value calculation unit 310 calculates, for the processing-target data that has already been subjected to the deleting processing, a hash value calculated for the after-processing hash value corresponding to this processing-target data as the verification hash value.

The verification unit 320 verifies a signature (S322). That is, the verification unit 320 verifies the verification hash value and the digital signature. Specifically, the verification unit 320 calculates, for each row i, a hash value $h_i'$ by concatenating all the verification hash values corresponding to the data in respective columns j (columns $c_{j'}$) as shown by the above-shown Expression (13). Then, {$h_i'$} is obtained by calculating a hash value $h_i'$ for each of all the rows i (records). Then, similarly to the second example embodiment, the verification unit 320 verifies, from the obtained {$h_i'$} and a signature {$\sigma_i$} transmitted from the data providing apparatus 100, the signature according to the verification algorithm in the digital signature by using a verification key of the data provider.

In the second or third example embodiment, it is necessary to make a setting as to which of the "generalizing" and "deleting" processing should be performed for each attribute (column). In contrast, in the information processing system 10 according to the fourth example embodiment, the generalized hierarchical tree is extended, so that both the "generalizing" and "deleting" processing can be performed for a column for which the generalized hierarchical tree is set. Therefore, there is no need to make a setting as to which of the "generalizing" and "deleting" processing should be performed for each (column). Further, since both the "generalizing" and "deleting" processing can be performed for the same column, flexible processing can be performed for the column (attribute).

Note that in the fourth example embodiment, the number (height) of layers of the generalized hierarchical tree is increased, so that there is a possibility that the calculation load of the hash function increases compared with those in the second and third example embodiments. Conversely, in the second and third example embodiments, the calculation load of the hash function can be reduced compared with that in the fourth example embodiment. Further, in the fourth example embodiment, the generalized hierarchical tree set for a column which has been subjected to "Deleting" processing is provided to the data receiving apparatus 300. Therefore, even when "Deleting" processing has been performed, it may be known to the data recipient that the attribute value before the deletion is one of the attribute values in the layer "1" of the generalized hierarchical tree. In contrast, in the case of the third example embodiment, since the generalized hierarchical tree is not provided to the data receiving apparatus 300, it is possible to prevent, when "Deleting" processing has been performed, the attribute value before the deletion from being known to the data recipient.

Example of Application

Figure 22:
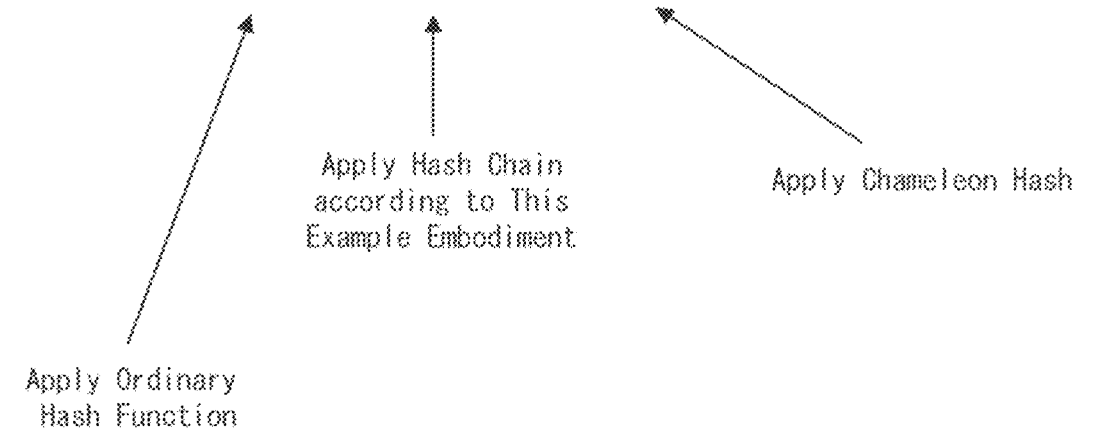
FIG. 22 shows a table for explaining an example in which an example embodiment of the present disclosure is applied.

FIG. 22 shows a table for explaining an example in which an example embodiment of the present disclosure is applied. In the above-described example embodiments, a setting as to whether or not each attribute is to be processed is made. Therefore, for an Attribute #1 which is an attribute not to be processed, a hash value is calculated by using an ordinary algorithm for a hash function, such as SHA 256, (see Expression (1)). Further, for an Attribute #2 which is an attribute to be processed, a hash value (signature hash value or the like) is calculated by applying the above-described hash chain.

Note that for the processing (generalization or deletion) according to the above-described example embodiments, it is necessary to perform processing conforming to the generalized hierarchical tree or processing for simply deleting the attribute value. Meanwhile, there may be a demand to perform arbitrary processing for an Attribute #3. In this case, a chameleon hash may be applied to the Attribute #3. That is, for the Attribute #3, a hash value may be calculated for Attribute Values #13 to #m3 by the chameleon hash. Note that by combining the chameleon hash and the digital signature, it is possible to form a sanitizable signature algorithm by which only the subject having a private key corresponding to a public key used to generate the chameleon hash can change the plaintext. For example, by allowing only the data processing entity to possess the private key corresponding to the public key used to generate the chameleon hash, only the data processing entity can carry out anonymizing processing for data while maintaining the validity (legitimacy) of the signature.

In this case, when the signature is generated, in Expression (7), a signature hash value $h_{i1}$ is calculated for the Attribute #1 by an ordinary hash function, and a signature hash value $h_{i2}$ is calculated for the Attribute #2 by the above-described hash chain. Further, a signature hash value his is calculated for the Attribute #3 by a chameleon hash function. Then, as shown in Expression (7), a hash value $h_i$ may be calculated by concatenating the signature hash values generated for the respective attributes with one another. By doing so, it is possible to perform arbitrary processing for a given attribute, so that the flexibility of the processing can be further improved.

Example of Hardware Configuration

An example of a configuration of hardware resources for implementing an apparatus and a system according to the above-described example embodiment by using one calculation processing apparatus (an information processing apparatus or a computer) will be described. However, the apparatus according to any of the example embodiments (i.e., a data providing apparatus, a data processing apparatus, and a data receiving apparatus) may be physically or functionally implemented by using at least two calculation processing apparatus. Further, the apparatus according to any of the example embodiments may be implemented as a dedicated apparatus or as a general-purpose information processing apparatus.

Figure 23:
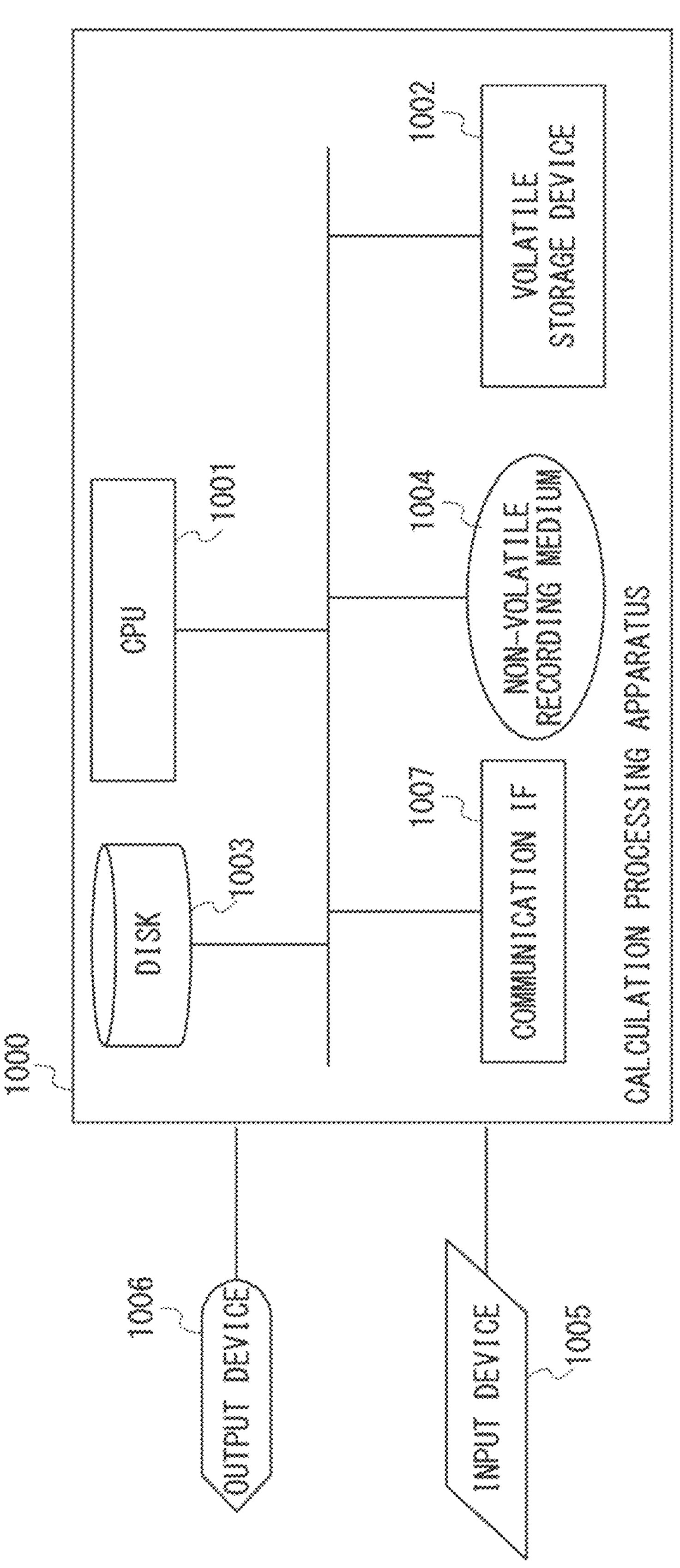
FIG. 23 is a block diagram schematically showing an example of a hardware configuration of a calculation processing apparatus capable of implementing an apparatus and a system according to each example embodiment.

FIG. 23 is a block diagram schematically showing an example of a hardware configuration of a calculation processing apparatus capable of implementing an apparatus or a system according to an example embodiment. A calculation processing apparatus 1000 includes a CPU 1001, a volatile storage device 1002, a disk 1003, a nonvolatile recording medium 1004, and a communication IF (IF: Interface) 1007. Therefore, it can be said that the apparatus according to any of the example embodiments includes the CPU 1001, the volatile storage device 1002, the disk 1003, the nonvolatile recording medium 1004, and the communication IF 1007. The calculation processing apparatus 1000 may be configured so that it can be connected to an input device 1005 and an output device 1006. The calculation processing apparatus 1000 may include the input device 1005 and the output device 1006. Further, the calculation processing apparatus 1000 may transmit/receive information to/from other calculation processing apparatuses and communication apparatuses through the communication IF 1007.

The nonvolatile recording medium 1004 is, for example, a computer readable CD (Compact Disc) or a computer readable DVD (Digital Versatile Disc). Further, the nonvolatile recording medium 1004 may be a USB (Universal Serial Bus) memory, an SSD (Solid State Drive), or the like. The nonvolatile recording medium 1004 holds (i.e., retains) a relevant program(s) even when no electric power is supplied, thus enabling the program(s) to be carried and transported. Note that the nonvolatile recording medium 1004 is not limited to the above-described media. Alternatively, instead of using the nonvolatile recording medium 1004, the relevant program(s) may be supplied through the communication IF 1007 and a communication network(s).

The volatile storage device 1002 can be read by a computer, and can temporarily store data. The volatile storage device 1002 is a memory or the like such as a DRAM (dynamic random access memory) or an SRAM (static random access memory).

That is, the CPU 1001 copies (i.e., loads) a software program (a computer program: hereinafter also simply referred to as a "program") stored in the disc 1003 into the volatile storage device 1002 when it executes the program, and thereby performs arithmetic processing. The CPU 1001 reads data necessary for executing the program from the volatile storage device 1002. When it is necessary to display an output result, the CPU 1001 displays the output result on the output device 1006. When a program is input from the outside, the CPU 1001 acquires the program through the input device 1005. The CPU 1001 interprets and executes programs corresponding to the above-described functions (the processes) of the respective components shown in FIGS. 5 to 7. The CPU 1001 performs the processes described in each of the above-described example embodiments. In other words, the above-described functions of the respective components shown in FIGS. 5 to 7 can be implemented by having the CPU 1001 execute a program(s) stored in the disc 1003 or the volatile storage device 1002.

That is, it can be considered that each example embodiment can be accomplished by the above-described program. Further, it can be considered that each of the above-described example embodiments can also be accomplished by a nonvolatile recording medium which can be read by a computer and in which the above-described program is recorded.

Modified Example

Note that the present invention is not limited to the above-described example embodiments, and they may be modified as appropriate without departing from the scope and spirit of the invention. For example, in the above-described flowcharts, the order of processes (steps) can be changed as appropriate. Further, at least one of a plurality of processes (steps) may be omitted (or skipped).

Further, although "generalizing" or "deleting" processing is performed for each attribute in the above-described example embodiments, the present invention is not limited to such a configuration. Any processing to which the above-described example embodiment can be applied can be performed for each attribute.

In the above-described examples, the program includes a set of instructions (or software codes) that, when being loaded into a computer, causes the computer to perform one or more of the functions described in the example embodiments. The program may be stored in a non-transitory computer readable medium or in a physical storage medium. By way of example rather than limitation, a computer readable medium or a physical storage medium may include a random-access memory (RAM), a read-only memory (ROM), a flash memory, a solid-state drive (SSD), or other memory technology, a CD-ROM, a digital versatile disk (DVD), a Blu-ray (registered trademark) disc or other optical disc storages, a magnetic cassette, magnetic tape, and a magnetic disc storage or other magnetic storage devices. The program may be transmitted on a transitory computer readable medium or a communication medium. By way of example rather than limitation, the transitory computer readable medium or the communication medium may include electrical, optical, acoustic, or other forms of propagating signals.

Although the present invention is described above with reference to example embodiments, the present invention is not limited to the above-described example embodiments. Various modifications that can be understood by those skilled in the art can be made to the configuration and details of the present invention within the scope and spirit of the invention.

The whole or part of the example embodiments disclosed above can be described as, but not limited to, the following supplementary notes.

(Supplementary Note 1)

An information processing system comprising:

a data providing apparatus configured to provide a data set including a plurality of data about at least one attribute;

a data processing apparatus configured to process at least one of the plurality of data; and a data receiving apparatus configured to receive the data set of which at least one data has already been processed, wherein the data providing apparatus comprises:

processing rule setting means for setting a processing rule for each of the at least one attribute;

random number setting means for setting predetermined random numbers for states corresponding to a plurality of attribute values, the plurality of attribute values being values that processing-target data about an attribute to be processed can take under the processing rule;

signature hash value calculation means for calculating, for each of the plurality of data, a signature hash value corresponding to the data;

signature generation means for generating a digital signature by using the signature hash value; and first transmitting means for transmitting the data set, the digital signature, and the random number to the data processing apparatus, the signature hash value calculation means calculates, for the processing-target data, a first hash value for a data sequence obtained by using the processing-target data and the random number set for the attribute value corresponding to the processing-target data, calculates an intermediate hash value for a data sequence obtained by combining the processing-target data and the first hash value, and calculates a signature hash value corresponding to the processing-target data by using the intermediate hash value, the data processing apparatus comprises:

processing performing means for performing a process for processing the processing-target data;

after-processing hash value calculation means for calculating, for each of the processing-target data, an after-processing hash value corresponding to the processing-target data; and second transmitting means for transmitting, to the data receiving apparatus, the data set of which the processing-target data has already been processed, the after-processing hash value corresponding to the processing-target data, and the digital signature, the after-processing hash value calculation means calculates, for the already-processed processing-target data, a first hash value for a data sequence obtained by using the not-yet-processed processing-target data and the random number set for an attribute value corresponding to this not-yet-processed processing-target data, calculates an intermediate hash value for a data sequence obtained by combining the not-yet-processed processing-target data and the first hash value, and calculates an after-processing hash value corresponding to the already-processed processing-target data by using the intermediate hash value, and the data receiving apparatus comprises:

verification hash value calculation means for calculating, for each of the plurality of data, a verification hash value corresponding to the data by using the data set of which the processing-target data has already been processed and the after-processing hash value; and verification means for verifying the verification hash value and the digital signature.

(Supplementary Note 2)

The information processing system described in Supplementary note 1, wherein the processing rule includes a hierarchical structure having layers corresponding to respective states including a not-yet-processed attribute value and an already-processed attribute value, set for each attribute to be processed, the signature hash value calculation means calculates, for the processing-target data, an intermediate hash value corresponding to a state of a layer higher than that of the attribute value of the processing-target data in the hierarchical structure for a data sequence obtained by combining the processing-target data and a first hash value corresponding thereto, and the after-processing hash value calculation means calculates, for the already-processed processing-target data, an intermediate hash value corresponding to a state of a layer higher than that of the attribute value of the not-yet-processed processing-target data in the hierarchical structure for a data sequence obtained by combining the not-yet-processed processing-target data and a first hash value corresponding thereto.

(Supplementary Note 3)

The information processing system described in Supplementary note 2, wherein the processing rule setting means sets, for each attribute to be processed, a generalized hierarchical tree having a hierarchical structure showing a rule for generalizing a not-yet-processed attribute value, and showing attribute values in such a manner that the higher a layer of an attribute value is, the more the attribute value has been generalized, and the first and second transmitting means transmit the generalized hierarchical tree.

(Supplementary Note 4)

The information processing system described in Supplementary note 3, wherein the signature hash value calculation means calculates, for a data sequence obtained by combining an intermediate hash value and an attribute value in a layer corresponding to this intermediate hash value, an intermediate hash value corresponding to a state of a layer higher than that of this attribute value in the hierarchical structure, and calculates a hash value calculated for a data sequence obtaining by combining an attribute value in a highest layer in the hierarchical structure and an intermediate hash value corresponding to this attribute value as the signature hash value, the after-processing hash value calculation means calculates, for a data sequence obtaining by combining an intermediate hash value and an attribute value in a layer corresponding to this intermediate hash value, an intermediate hash value corresponding to an attribute value in a layer higher than that of this attribute value in the hierarchical structure, and calculates an intermediate hash value corresponding to an attribute value corresponding to the already-processed processing-target data as the after-processing hash value corresponding to the already-processed processing-target data, and the verification hash value calculation means calculates, for a data sequence obtained by combining the after-processing hash value and an attribute value of the already-processed processing-target data corresponding to this after-processing hash value, an intermediate hash value corresponding to an attribute value in a layer higher than that of this attribute value in the hierarchical structure, and calculates a hash value calculated for a data sequence obtained by combining an attribute value in a highest layer in the hierarchical structure and an intermediate hash value corresponding to this attribute value as the verification hash value.

(Supplementary Note 5)

The information processing system described in Supplementary note 3, wherein the processing rule setting means sets a state in which an attribute value of the processing-target data is deleted in a layer higher than a second layer from a top, the second layer being a layer in which an attribute value is most generalized in the generalized hierarchical tree.

(Supplementary Note 6)

The information processing system described in Supplementary note 5, wherein the signature hash value calculation means calculates, for a data sequence obtained by combining an intermediate hash value and a state of a layer corresponding to this intermediate hash value, an intermediate hash value corresponding to a state of a layer higher than that of the state of the layer corresponding to the intermediate hash value in the hierarchical structure, and calculates a hash value calculated for an intermediate hash value corresponding to a state of a highest layer in the hierarchical structure as the signature hash value, the after-processing hash value calculation means:

calculates, for a data sequence obtaining by combining an intermediate hash value and an attribute value in a layer corresponding to this intermediate hash value, an intermediate hash value corresponding to a state of a layer higher than that of this attribute value in the hierarchical structure;

calculates, when generalizing processing has been performed for the processing-target data, an intermediate hash value corresponding to an attribute value corresponding to the already-processed processing-target data as the after-processing hash value corresponding to the already-processed processing-target data; and calculates, when deleting processing has been performed for the processing-target data, an intermediate hash value corresponding to a state of a highest layer in the hierarchical structure as the after-processing hash value corresponding to the already-processed processing-target data, and the verification hash value calculation means:

calculates, regarding the processing-target data that has already been subjected to generalizing processing, for a data sequence obtained by combining the after-processing hash value and an attribute value of the already-processed processing-target data corresponding to this after-processing hash value, an intermediate hash value corresponding to a state of a layer higher than that of this attribute value in the hierarchical structure, and calculates a hash value calculated for an intermediate hash value corresponding to a state of a highest layer in the hierarchical structure as the verification hash value; and calculates, regarding the processing-target data that has already been subjected to deleting processing, a hash value calculated for the after-processing hash value corresponding to this processing-target data as the verification hash value.

(Supplementary Note 7)

The information processing system described in Supplementary note 1 or 2, wherein the processing rule setting means sets a processing rule for deleting a not-yet-processed attribute value for each attribute to be processed, the signature hash value calculation means calculates, for the processing-target data, a hash value calculated for a data sequence obtained by combining this processing-target data and the first hash value as the signature hash value, the after-processing hash value calculation means calculates, for the processing-target data that has already been subjected to deleting processing, a hash value calculated for a data sequence obtained by combining this processing-target data and a first hash value corresponding thereto as the after-processing hash value, and the verification hash value calculation means calculates, for the processing-target data that has already been subjected to deleting processing, the after-processing hash value corresponding to this processing-target data as the verification hash value.

(Supplementary Note 8)

The information processing system described in any one of Supplementary notes 1 to 7, wherein the after-processing hash value calculation means calculates, for an attribute value that has not been processed among the attribute values to be processed under the processing rule, a first hash value calculated for a data sequence obtained by using this attribute value and the random number set for this attribute value as the after-processing hash value.

(Supplementary Note 9)

The information processing system described in any one of Supplementary notes 1 to 8, wherein the signature hash value calculation means calculates, for the processing-target data, a first hash value for a data sequence obtained by using this processing-target data, the random number set for an attribute value corresponding to the processing-target data, and an index for identifying the processing-target data, and the after-processing hash value calculation means calculates, for the processing-target data, a first hash value for a data sequence obtained by using this processing-target data, the random number set for an attribute value corresponding to the processing-target data, and an index for identifying the processing-target data.

(Supplementary Note 10)

A data providing apparatus comprising:

processing rule setting means for setting a processing rule for each of at least one attribute in a data set, the data set including a plurality of data about the at least one attribute;

random number setting means for setting predetermined random numbers for states corresponding to a plurality of attribute values, the plurality of attribute values being values that processing-target data about an attribute to be processed can take under the processing rule;

signature hash value calculation means for calculating, for each of the plurality of data, a signature hash value corresponding to the data;

signature generation means for generating a digital signature by using the signature hash value; and transmitting means for transmitting the data set, the digital signature, and the random number to a data processing apparatus, the data processing apparatus being configured to process at least one of the plurality of data, wherein the signature hash value calculation means calculates, for the processing-target data, a first hash value for a data sequence obtained by using the processing-target data and the random number set for the attribute value corresponding to the processing-target data, calculates an intermediate hash value for a data sequence obtained by combining the processing-target data and the first hash value, and calculates a signature hash value corresponding to the processing-target data by using the intermediate hash value.

(Supplementary Note 11)

The data providing apparatus described in Supplementary note 10, wherein the processing rule includes a hierarchical structure having layers corresponding to respective states including a not-yet-processed attribute value and an already-processed attribute value, set for each attribute to be processed, and the signature hash value calculation means calculates, for the processing-target data, an intermediate hash value corresponding to a state of a layer higher than that of the attribute value of the processing-target data in the hierarchical structure for a data sequence obtained by combining the processing-target data and a first hash value corresponding thereto.

(Supplementary Note 12)

The data providing apparatus described in Supplementary note 11, wherein the processing rule setting means sets, for each attribute to be processed, a generalized hierarchical tree having a hierarchical structure showing a rule for generalizing a not-yet-processed attribute value, and showing attribute values in such a manner that the higher a layer of an attribute value is, the more the attribute value has been generalized, and the transmitting means transmits the generalized hierarchical tree to the data processing apparatus.

(Supplementary Note 13)

The data providing apparatus described in Supplementary note 12, wherein the signature hash value calculation means calculates, for a data sequence obtained by combining an intermediate hash value and an attribute value in a layer corresponding to this intermediate hash value, an intermediate hash value corresponding to a state of a layer higher than that of this attribute value in the hierarchical structure, and calculates a hash value calculated for a data sequence obtaining by combining an attribute value in a highest layer in the hierarchical structure and an intermediate hash value corresponding to this attribute value as the signature hash value.

(Supplementary Note 14)

The data providing apparatus described in Supplementary note 12, wherein the processing rule setting means sets a state in which an attribute value of the processing-target data is deleted in a layer higher than a second layer from a top, the second layer being a layer in which an attribute value is most generalized in the generalized hierarchical tree.

(Supplementary Note 15)

The data providing apparatus described in Supplementary note 14, wherein the signature hash value calculation means calculates, for a data sequence obtained by combining an intermediate hash value and a state of a layer corresponding to this intermediate hash value, an intermediate hash value corresponding to a state of a layer higher than that of the state of the layer corresponding to the intermediate hash value in the hierarchical structure, and calculates a hash value calculated for an intermediate hash value corresponding to a state of a highest layer in the hierarchical structure as the signature hash value.

(Supplementary Note 16)

The data providing apparatus described in Supplementary note 10 or 11, wherein the processing rule setting means sets a processing rule for deleting a not-yet-processed attribute value for each attribute to be processed, and the signature hash value calculation means calculates, for the processing-target data, a hash value calculated for a data sequence obtained by combining this processing-target data and the first hash value as the signature hash value.

(Supplementary Note 17)

The data providing apparatus described in any one of Supplementary notes 10 to 16, wherein the signature hash value calculation means calculates, for the processing-target data, a first hash value for a data sequence obtained by using this processing-target data, the random number set for an attribute value corresponding to the processing-target data, and an index for identifying the processing-target data.

(Supplementary Note 18)

A data processing apparatus comprising:

processing performing means for performing a process for processing processing-target data about an attribute to be processed under a processing rule set for each of at least one attribute in a data providing apparatus, the data providing apparatus being configured to provide a data set including a plurality of data about the at least one attribute;

after-processing hash value calculation means for calculating, for each of the processing-target data, an after-processing hash value corresponding to the processing-target data; and transmitting means for transmitting, to a data receiving apparatus, the data set of which the processing-target data has already been processed, the after-processing hash value corresponding to the processing-target data, and a digital signature generated in the data providing apparatus, the data receiving apparatus being configured to receive the data set of which at least one data has already been processed, wherein the after-processing hash value calculation means calculates, for the already-processed processing-target data, a first hash value for a data sequence obtained by using the not-yet-processed processing-target data and a random number set for an attribute value corresponding to this not-yet-processed processing-target data, calculates an intermediate hash value for a data sequence obtained by combining the not-yet-processed processing-target data and the first hash value, and calculates an after-processing hash value corresponding to the already-processed processing-target data by using the intermediate hash value.

(Supplementary Note 19)

The data processing apparatus described in Supplementary note 18, wherein the processing rule includes a hierarchical structure having layers corresponding to respective states including a not-yet-processed attribute value and an already-processed attribute value, set for each attribute to be processed, and the after-processing hash value calculation means calculates, for the already-processed processing-target data, an intermediate hash value corresponding to a state of a layer higher than that of the attribute value of the not-yet-processed processing-target data in the hierarchical structure for a data sequence obtained by combining the not-yet-processed processing-target data and a first hash value corresponding thereto.

(Supplementary Note 20)

The data processing apparatus described in Supplementary note 19, wherein the transmitting means transmits, to the data receiving apparatus, a generalized hierarchical tree set in the data providing apparatus for each attribute to be processed, the generalized hierarchical tree having a hierarchical structure showing a rule for generalizing a not-yet-processed attribute value, and showing attribute values in such a manner that the higher a layer of an attribute value is, the more the attribute value has been generalized.

(Supplementary Note 21)

The data processing apparatus described in Supplementary note 20, wherein the after-processing hash value calculation means calculates, for a data sequence obtaining by combining an intermediate hash value and an attribute value in a layer corresponding to this intermediate hash value, an intermediate hash value corresponding to an attribute value in a layer higher than that of this attribute value in the hierarchical structure, and calculates an intermediate hash value corresponding to an attribute value corresponding to the already-processed processing-target data as the after-processing hash value corresponding to the already-processed processing-target data.

(Supplementary Note 22)

The data processing apparatus described in Supplementary note 20, wherein a state in which an attribute value of the processing-target data is deleted is set in a layer higher than a second layer from a top, the second layer being a layer in which an attribute value is most generalized in the generalized hierarchical tree.

(Supplementary Note 23)

The data processing apparatus described in Supplementary note 22, wherein

The after-processing hash value calculation means:

calculates, for a data sequence obtaining by combining an intermediate hash value and an attribute value in a layer corresponding to this intermediate hash value, an intermediate hash value corresponding to a state of a layer higher than that of this attribute value in the hierarchical structure;

calculates, when generalizing processing has been performed for the processing-target data, an intermediate hash value corresponding to an attribute value corresponding to the already-processed processing-target data as the after-processing hash value corresponding to the already-processed processing-target data; and calculates, when deleting processing has been performed for the processing-target data, an intermediate hash value corresponding to a state of a highest layer in the hierarchical structure as the after-processing hash value corresponding to the already-processed processing-target data.

(Supplementary Note 24)

The data processing apparatus described in Supplementary note 18 or 19, wherein a processing rule for deleting a not-yet-processed attribute value is set for each attribute to be processed, and the after-processing hash value calculation means calculates, for the processing-target data that has already been subjected to deleting processing, a hash value calculated for a data sequence obtained by combining this processing-target data and a first hash value corresponding thereto as the after-processing hash value.

(Supplementary Note 25)

The data processing apparatus described in any one of Supplementary notes 18 to 24, wherein the after-processing hash value calculation means calculates, for an attribute value that has not been processed among the attribute values to be processed under the processing rule, a first hash value calculated for a data sequence obtained by using this attribute value and the random number set for this attribute value as the after-processing hash value.

(Supplementary Note 26)

The data processing apparatus described in any one of Supplementary notes 18 to 25, wherein the after-processing hash value calculation means calculates, for the processing-target data, a first hash value for a data sequence obtained by using this processing-target data, a random number set for an attribute value corresponding to the processing-target data, and an index for identifying the processing-target data.

(Supplementary Note 27)

A data receiving apparatus comprising:

verification hash value calculation means for calculating, by using a data set including a plurality of data about at least one attribute, and after-processing hash values each corresponding to a respective one of processing-target data, calculated in a data processing apparatus, verification hash values each corresponding to a respective one of the plurality of data, the data set being a data set of which processing-target data is data about an attribute to be processed under a processing rule set for a respective one of the at least one attribute in a data providing apparatus and has already been processed, the data providing apparatus being configured to provide the data set, and the data processing apparatus being configured to process at least one of the plurality of data; and verification means for verifying the verification hash value and a digital signature generated in the data providing apparatus.

(Supplementary Note 28)

The data receiving apparatus described in Supplementary note 27, wherein the processing rule includes a hierarchical structure having layers corresponding to respective states including a not-yet-processed attribute value and an already-processed attribute value, set for each attribute to be processed.

(Supplementary Note 29)

The data receiving apparatus described in Supplementary note 28, wherein the verification hash value calculation means calculates the verification hash value by using a generalized hierarchical tree set in the data providing apparatus for each attribute to be processed, the generalized hierarchical tree having a hierarchical structure showing a rule for generalizing a not-yet-processed attribute value, and showing attribute values in such a manner that the higher a layer of an attribute value is, the more the attribute value has been generalized.

(Supplementary Note 30)

The data receiving apparatus described in Supplementary note 29, wherein the verification hash value calculation means calculates, for a data sequence obtained by combining the after-processing hash value and an attribute value of the already-processed processing-target data corresponding to this after-processing hash value, an intermediate hash value corresponding to an attribute value in a layer higher than that of this attribute value in the hierarchical structure, and calculates a hash value calculated for a data sequence obtained by combining an attribute value in a highest layer in the hierarchical structure and an intermediate hash value corresponding to this attribute value as the verification hash value.

(Supplementary Note 31)

The data receiving apparatus described in Supplementary note 29, wherein a state in which an attribute value of the processing-target data is deleted is set in a layer higher than a second layer from a top, the second layer being a layer in which an attribute value is most generalized in the generalized hierarchical tree.

(Supplementary Note 32)

The data receiving apparatus described in Supplementary note 31, wherein the verification hash value calculation means:

calculates, regarding the processing-target data that has already been subjected to generalizing processing, for a data sequence obtained by combining the after-processing hash value and an attribute value of the already-processed processing-target data corresponding to this after-processing hash value, an intermediate hash value corresponding to a state of a layer higher than that of this attribute value in the hierarchical structure, and calculates a hash value calculated for an intermediate hash value corresponding to a state of a highest layer in the hierarchical structure as the verification hash value; and calculates, regarding the processing-target data that has already been subjected to deleting processing, a hash value calculated for the after-processing hash value corresponding to this processing-target data as the verification hash value.

(Supplementary Note 33)

The data receiving apparatus described in Supplementary note 27 or 28, wherein a processing rule for deleting a not-yet-processed attribute value is set for each attribute to be processed, and the verification hash value calculation means calculates, for the processing-target data that has already been subjected to deleting processing, the after-processing hash value corresponding to this processing-target data as the verification hash value.

(Supplementary Note 34)

An information processing method comprising:

by a data providing apparatus configured to provide a data set including a plurality of data about at least one attribute, setting a processing rule for each of the at least one attribute;

setting predetermined random numbers for states corresponding to a plurality of attribute values, the plurality of attribute values being values that processing-target data about an attribute to be processed can take under the processing rule;

calculating, for each of the plurality of data, a signature hash value corresponding to the data by calculating, for the processing-target data, a first hash value for a data sequence obtained by using the processing-target data and the random number set for the attribute value corresponding to the processing-target data, calculating an intermediate hash value for a data sequence obtained by combining the processing-target data and the first hash value, and calculating a signature hash value corresponding to the processing-target data by using the intermediate hash value, generating a digital signature by using the signature hash value; and transmitting the data set, the digital signature, and the random number to a data processing apparatus, the data processing apparatus being configured to process at least one of the plurality of data, by the data processing apparatus, performing a process for processing the processing-target data;

calculating, for each of the processing-target data, an after-processing hash value corresponding to the processing-target data by calculating, for the already-processed processing-target data, a first hash value for a data sequence obtained by using the not-yet-processed processing-target data and a random number set for an attribute value corresponding to this not-yet-processed processing-target data, calculating an intermediate hash value for a data sequence obtained by combining the not-yet-processed processing-target data and the first hash value, and calculating an after-processing hash value corresponding to the already-processed processing-target data by using the intermediate hash value; and transmitting the data set of which the processing-target data has already been processed, the after-processing hash value corresponding to the processing-target data, and the digital signature to a data receiving apparatus, the data receiving apparatus being configured to receive the data set of which at least one data has already been processed, and by the data receiving apparatus, calculating, for each of the plurality of data, a verification hash value corresponding to the data by using the data set of which the processing-target data has already been processed and the after-processing hash value; and verifying the verification hash value and the digital signature.

(Supplementary Note 35)

A data providing method comprising:

setting a processing rule for each of at least one attribute in a data set, the data set including a plurality of data about the at least one attribute;

setting predetermined random numbers for states corresponding to a plurality of attribute values, the plurality of attribute values being values that processing-target data about an attribute to be processed can take under the processing rule;

calculating, for each of the plurality of data, a signature hash value corresponding to the data by calculating, for the processing-target data, a first hash value for a data sequence obtained by using the processing-target data and the random number set for the attribute value corresponding to the processing-target data, calculating an intermediate hash value for a data sequence obtained by combining the processing-target data and the first hash value, and calculating a signature hash value corresponding to the processing-target data by using the intermediate hash value;

generating a digital signature by using the signature hash value; and transmitting the data set, the digital signature, and the random number to a data processing apparatus, the data processing apparatus being configured to process at least one of the plurality of data.

(Supplementary Note 36)

A data processing method comprising:

performing a process for processing processing-target data about an attribute to be processed under a processing rule set for each of at least one attribute in a data providing apparatus, the data providing apparatus being configured to provide a data set including a plurality of data about the at least one attribute;

calculating, for each of the processing-target data, an after-processing hash value corresponding to the processing-target data by calculating, for the already-processed processing-target data, a first hash value for a data sequence obtained by using the not-yet-processed processing-target data and a random number set for an attribute value corresponding to this not-yet-processed processing-target data, calculating an intermediate hash value for a data sequence obtained by combining the not-yet-processed processing-target data and the first hash value, and calculating an after-processing hash value corresponding to the already-processed processing-target data by using the intermediate hash value; and transmitting, to a data receiving apparatus, the data set of which the processing-target data has already been processed, the after-processing hash value corresponding to the processing-target data, and a digital signature generated in the data providing apparatus, the data receiving apparatus being configured to receive the data set of which at least one data has already been processed.

(Supplementary Note 37)

A data receiving method comprising:

calculating, by using a data set including a plurality of data about at least one attribute, and after-processing hash values each corresponding to a respective one of processing-target data, calculated in a data processing apparatus, verification hash values each corresponding to a respective one of the plurality of data, the data set being a data set of which processing-target data is data about an attribute to be processed under a processing rule set for a respective one of the at least one attribute in a data providing apparatus and has already been processed, the data providing apparatus being configured to provide the data set, and the data processing apparatus being configured to process at least one of the plurality of data; and verifying the verification hash value and a digital signature generated in the data providing apparatus.

(Supplementary Note 38)

A non-transitory computer readable medium storing a program for causing a computer to perform:

a step of setting a processing rule for each of at least one attribute in a data set, the data set including a plurality of data about the at least one attribute;

a step of setting predetermined random numbers for states corresponding to a plurality of attribute values, the plurality of attribute values being values that processing-target data about an attribute to be processed can take under the processing rule;

a step of calculating, for each of the plurality of data, a signature hash value corresponding to the data by calculating, for the processing-target data, a first hash value for a data sequence obtained by using the processing-target data and the random number set for the attribute value corresponding to the processing-target data, calculating an intermediate hash value for a data sequence obtained by combining the processing-target data and the first hash value, and calculating a signature hash value corresponding to the processing-target data by using the intermediate hash value;

a step of generating a digital signature by using the signature hash value; and a step of transmitting the data set, the digital signature, and the random number to a data processing apparatus, the data processing apparatus being configured to process at least one of the plurality of data.

(Supplementary Note 39)

A non-transitory computer readable medium storing a program for causing a computer to perform:

a step of performing a process for processing processing-target data about an attribute to be processed under a processing rule set for each of at least one attribute in a data providing apparatus, the data providing apparatus being configured to provide a data set including a plurality of data about the at least one attribute;

a step of calculating, for each of the processing-target data, an after-processing hash value corresponding to the processing-target data by calculating, for the already-processed processing-target data, a first hash value for a data sequence obtained by using the not-yet-processed processing-target data and a random number set for an attribute value corresponding to this not-yet-processed processing-target data, calculating an intermediate hash value for a data sequence obtained by combining the not-yet-processed processing-target data and the first hash value, and calculating an after-processing hash value corresponding to the already-processed processing-target data by using the intermediate hash value; and a step of transmitting, to a data receiving apparatus, the data set of which the processing-target data has already been processed, the after-processing hash value corresponding to the processing-target data, and a digital signature generated in the data providing apparatus, the data receiving apparatus being configured to receive the data set of which at least one data has already been processed.

(Supplementary Note 40)

A non-transitory computer readable medium storing a program for causing a computer to perform:

a step of calculating, by using a data set including a plurality of data about at least one attribute, and after-processing hash values each corresponding to a respective one of processing-target data, calculated in a data processing apparatus, verification hash values each corresponding to a respective one of the plurality of data, the data set being a data set of which processing-target data is data about an attribute to be processed under a processing rule set for a respective one of the at least one attribute in a data providing apparatus and has already been processed, the data providing apparatus being configured to provide the data set, and the data processing apparatus being configured to process at least one of the plurality of data; and a step of verifying the verification hash value and a digital signature generated in the data providing apparatus.

REFERENCE SIGNS LIST

10 INFORMATION PROCESSING SYSTEM

100 DATA PROVIDING APPARATUS

110 PROCESSING RULE SETTING UNIT
120 RANDOM NUMBER SETTING UNIT
130 SIGNATURE HASH VALUE CALCULATION UNIT
140 SIGNATURE GENERATION UNIT
150 TRANSMISSION UNIT
200 DATA PROCESSING APPARATUS
210 PROCESS PROCESSING UNIT
220 AFTER-PROCESSING HASH VALUE CALCULATION UNIT
230 TRANSMITTING UNIT
300 DATA RECEIVING APPARATUS
310 VERIFICATION HASH VALUE CALCULATION UNIT
320 VERIFICATION UNIT

The invention claimed is:

1. An information processing system comprising:

a data providing apparatus configured to provide a data set including a plurality of data about at least one attribute;

a data processing apparatus configured to process at least one of the plurality of data; and a data receiving apparatus configured to receive the data set of which at least one data has already been processed, wherein the data providing apparatus comprises:

at least one first memory configured to store instructions; and at least one first processor configured to execute the instructions to:

set a processing rule for each of the at least one attribute;

set a predetermined random number for each of states corresponding to a plurality of attribute values, the plurality of attribute values being values that processing-target data about an attribute to be processed can take under the processing rule;

calculate, for each of the plurality of data, a signature hash value corresponding to the data;

generate a digital signature by using the signature hash value;

transmit the data set, the digital signature, and the predetermined random number to the data processing apparatus; and calculate, for the processing-target data, a first hash value for a data sequence obtained by using the processing-target data and the predetermined random number which is set for the attribute value corresponding to the processing-target data, calculate an intermediate hash value for a data sequence obtained by combining the processing-target data and the first hash value, and calculate a signature hash value corresponding to the processing-target data by using the intermediate hash value, wherein the data processing apparatus comprises:

at least one second memory configured to store instructions; and at least one second processor configured to execute the instructions to:

perform a process for processing the processing-target data;

calculate, for each of the processing-target data, an after-processing hash value corresponding to the processing-target data; and transmit, to the data receiving apparatus, the data set of which the processing-target data has already been processed, the after-processing hash value corresponding to the processing-target data, and the digital signature; and calculate, for already-processed processing-target data among the processing-target data, the first hash value for a data sequence obtained by using not-yet-processed processing-target data corresponding to the processed processing-target data and the predetermined random number which is set for an attribute value corresponding to this not-yet-processed processing-target data, calculates an intermediate hash value for a data sequence obtained by combining the not-yet-processed processing-target data and the first hash value, and calculates the after-processing hash value corresponding to the already-processed processing-target data by using the intermediate hash value, and wherein the data receiving apparatus comprises:

at least one third memory configured to store instructions; and at least one third processor configured to execute the instructions to:

calculate, for each of the plurality of data, a verification hash value corresponding to the data by using the data set of which the processing-target data has already been processed and the after-processing hash value; and verify the verification hash value and the digital signature.

2. The information processing system according to claim 1, wherein the processing rule includes a hierarchical structure having layers corresponding to respective states including a not-yet-processed attribute value and an already-processed attribute value, set for each attribute to be processed, the at least one first processor is further configured to execute the instructions to calculate, for the processing-target data, an intermediate hash value corresponding to a state of a layer higher than that of the attribute value of the processing-target data in the hierarchical structure for a data sequence obtained by combining the processing-target data and a first hash value corresponding thereto, and the at least one second processor is further configured to execute the instructions to calculate, for the already-processed processing-target data, an intermediate hash value corresponding to a state of a layer higher than that of the attribute value of the not-yet-processed processing-target data in the hierarchical structure for a data sequence obtained by combining the not-yet-processed processing-target data and a first hash value corresponding thereto.

3. The information processing system according to claim 2, wherein the at least one first processor is further configured to execute the instructions to set, for each attribute to be processed, a generalized hierarchical tree having a hierarchical structure showing a rule for generalizing a not-yet-processed attribute value, and showing attribute values in such a manner that the higher a layer of an attribute value is, the more the attribute value has been generalized, and the at least one first processor is further configured to execute the instructions to transmit the generalized hierarchical tree, and the at least one second processor is further configured to execute the instructions to transmit the generalized hierarchical tree.

4. The information processing system according to claim 3, wherein the at least one first processor is further configured to execute the instructions to calculate, for a data sequence obtained by combining an intermediate hash value and an attribute value in a layer corresponding to this intermediate hash value, an intermediate hash value corresponding to a state of a layer higher than that of this attribute value in the hierarchical structure, and calculate a hash value calculated for a data sequence obtaining by combining an attribute value in a highest layer in the hierarchical structure and an intermediate hash value corresponding to this attribute value as the signature hash value, the at least one second processor is further configured to execute the instructions to calculate, for a data sequence obtaining by combining an intermediate hash value and an attribute value in a layer corresponding to this intermediate hash value, an intermediate hash value corresponding to an attribute value in a layer higher than that of this attribute value in the hierarchical structure, and calculate an intermediate hash value corresponding to an attribute value corresponding to the already-processed processing-target data as the after-processing hash value corresponding to the already-processed processing-target data, and the at least one third processor is further configured to execute the instructions to calculate, for a data sequence obtained by combining the after-processing hash value and an attribute value of the already-processed processing-target data corresponding to this after-processing hash value, an intermediate hash value corresponding to an attribute value in a layer higher than that of this attribute value in the hierarchical structure, and calculate a hash value calculated for a data sequence obtained by combining an attribute value in a highest layer in the hierarchical structure and an intermediate hash value corresponding to this attribute value as the verification hash value.

5. The information processing system according to claim 3, wherein the at least one first processor is further configured to execute the instructions to set a state in which an attribute value of the processing-target data is deleted in a layer higher than a second layer from a top, the second layer being a layer in which an attribute value is most generalized in the generalized hierarchical tree.

6. The information processing system according to claim 5, wherein the at least one first processor is further configured to execute the instructions to calculate, for a data sequence obtained by combining an intermediate hash value and a state of a layer corresponding to this intermediate hash value, an intermediate hash value corresponding to a state of a layer higher than that of the state of the layer corresponding to the intermediate hash value in the hierarchical structure, and calculate a hash value calculated for an intermediate hash value corresponding to a state of a highest layer in the hierarchical structure as the signature hash value, the at least one second processor is further configured to execute the instructions to:

calculate, for a data sequence obtaining by combining an intermediate hash value and an attribute value in a layer corresponding to this intermediate hash value, an intermediate hash value corresponding to a state of a layer higher than that of this attribute value in the hierarchical structure;

calculate, when generalizing processing has been performed for the processing-target data, an intermediate hash value corresponding to an attribute value corresponding to the already-processed processing-target data as the after-processing hash value corresponding to the already-processed processing-target data; and calculate, when deleting processing has been performed for the processing-target data, an intermediate hash value corresponding to a state of a highest layer in the hierarchical structure as the after-processing hash value corresponding to the already-processed processing-target data, and the at least one third processor is further configured to execute the instructions to:

calculate, regarding the processing-target data that has already been subjected to generalizing processing, for a data sequence obtained by combining the after-processing hash value and an attribute value of the already-processed processing-target data corresponding to this after-processing hash value, an intermediate hash value corresponding to a state of a layer higher than that of this attribute value in the hierarchical structure, and calculates a hash value calculated for an intermediate hash value corresponding to a state of a highest layer in the hierarchical structure as the verification hash value; and calculate, regarding the processing-target data that has already been subjected to deleting processing, a hash value calculated for the after-processing hash value corresponding to this processing-target data as the verification hash value.

7. The information processing system according to claim 1, wherein the at least one first processor is further configured to execute the instructions to set a processing rule for deleting a not-yet-processed attribute value for each attribute to be processed, the at least one first processor is further configured to execute the instructions to calculate, for the processing-target data, a hash value calculated for a data sequence obtained by combining this processing-target data and the first hash value as the signature hash value, the at least one second processor is further configured to execute the instructions to calculate, for the processing-target data that has already been subjected to deleting processing, a hash value calculated for a data sequence obtained by combining this processing-target data and a first hash value corresponding thereto as the after-processing hash value, and the at least one third processor is further configured to execute the instructions to calculate, for the processing-target data that has already been subjected to deleting processing, the after-processing hash value corresponding to this processing-target data as the verification hash value.

8. The information processing system according to claim 1, wherein the at least one second processor is further configured to execute the instructions to calculate, for an attribute value that has not been processed among the attribute values to be processed under the processing rule, a first hash value calculated for a data sequence obtained by using this attribute value and the predetermined random number set for this attribute value as the after-processing hash value.

9. The information processing system according to claim 1, wherein the at least one first processor is further configured to execute the instructions to calculate, for the processing-target data, a first hash value for a data sequence obtained by using this processing-target data, the predetermined random number set for an attribute value corresponding to the processing-target data, and an index for identifying the processing-target data, and the at least one second processor is further configured to execute the instructions to calculate, for the processing-target data, a first hash value for a data sequence obtained by using this processing-target data, the predetermined random number set for an attribute value corresponding to the processing-target data, and an index for identifying the processing-target data.

10. A data providing apparatus comprising:

at least one memory configured to store instructions; and at least one processor configured to execute the instructions to:

set a processing rule for each of at least one attribute in a data set, the data set including a plurality of data about the at least one attribute;

set a predetermined random number for each of states corresponding to a plurality of attribute values, the plurality of attribute values being values that processing-target data about an attribute to be processed can take under the processing rule;

calculate, for each of the plurality of data, a signature hash value corresponding to the data, the signature hash value being calculated by (a) calculating for the processing-target data, a first hash value for a data sequence obtained by using the processing-target data and the predetermined random number set for the attribute value corresponding to the processing-target data, (b) calculating an intermediate hash value for a data sequence obtained by combining the processing-target data and the first hash value, and (c) calculating a signature hash value corresponding to the processing-target data by using the intermediate hash value;

generate a digital signature by using the signature hash value; and transmit the data set, the digital signature, and the predetermined random number to a data processing apparatus, the data processing apparatus being configured to process at least one of the plurality of data and to transmit the data set to a data receiving apparatus to verify the digital signature.

11. The data providing apparatus according to claim 10, wherein the processing rule includes a hierarchical structure having layers corresponding to respective states including a not-yet-processed attribute value and an already-processed attribute value, set for each attribute to be processed, and the at least one processor is further configured to execute the instructions to calculate, for the processing-target data, an intermediate hash value corresponding to a state of a layer higher than that of the attribute value of the processing-target data in the hierarchical structure for a data sequence obtained by combining the processing-target data and a first hash value corresponding thereto.

12. The data providing apparatus according to claim 11, wherein the at least one processor is further configured to execute the instructions to:

set, for each attribute to be processed, a generalized hierarchical tree having a hierarchical structure showing a rule for generalizing a not-yet-processed attribute value, and showing attribute values in such a manner that the higher a layer of an attribute value is, the more the attribute value has been generalized, and transmit the generalized hierarchical tree to the data processing apparatus.

13. The data providing apparatus according to claim 12, wherein the at least one processor is further configured to execute the instructions to calculate, for a data sequence obtained by combining an intermediate hash value and an attribute value in a layer corresponding to this intermediate hash value, an intermediate hash value corresponding to a state of a layer higher than that of this attribute value in the hierarchical structure, and calculate a hash value calculated for a data sequence obtaining by combining an attribute value in a highest layer in the hierarchical structure and an intermediate hash value corresponding to this attribute value as the signature hash value.

14. The data providing apparatus according to claim 12, wherein the at least one processor is further configured to execute the instructions to set a state in which an attribute value of the processing-target data is deleted in a layer higher than a second layer from a top, the second layer being a layer in which an attribute value is most generalized in the generalized hierarchical tree.

15. The data providing apparatus according to claim 14, wherein the at least one processor is further configured to execute the instructions to calculate, for a data sequence obtained by combining an intermediate hash value and a state of a layer corresponding to this intermediate hash value, an intermediate hash value corresponding to a state of a layer higher than that of the state of the layer corresponding to the intermediate hash value in the hierarchical structure, and calculate a hash value calculated for an intermediate hash value corresponding to a state of a highest layer in the hierarchical structure as the signature hash value.

16. The data providing apparatus according to claim 10, wherein the at least one processor is further configured to execute the instructions to:

set a processing rule for deleting a not-yet-processed attribute value for each attribute to be processed, and calculate, for the processing-target data, a hash value calculated for a data sequence obtained by combining this processing-target data and the first hash value as the signature hash value.

17. The data providing apparatus according to claim 10, wherein the at least one processor is further configured to execute the instructions to calculate, for the processing-target data, a first hash value for a data sequence obtained by using this processing-target data, the predetermined random number set for an attribute value corresponding to the processing-target data, and an index for identifying the processing-target data.

18. A data processing apparatus comprising:

at least one memory configured to store instructions; and at least one processor configured to execute the instructions to:

perform a process for processing processing-target data about an attribute to be processed under a processing rule set for each of at least one attribute in a data providing apparatus, the data providing apparatus being configured to provide a data set including a plurality of data about the at least one attribute;

calculate, for each of the processing-target data, an after-processing hash value corresponding to the processing-target data, the after-processing hash value being calculated by (a) calculating, for already-processed processing-target data among the processing-target data, a first hash value for a data sequence obtained by using not-yet-processed processing-target data corresponding to the processed processing-target data and the predetermined and a random number which is set for an attribute value corresponding to this not-yet-processed processing-target data, (b) calculating an intermediate hash value for a data sequence obtained by combining the not-yet-processed processing-target data and the first hash value, and (c) calculating the after-processing hash value corresponding to the already-processed processing-target data by using the intermediate hash value; and transmit, to a data receiving apparatus, the data set of which the processing-target data has already been processed, the after-processing hash value corresponding to the processing-target data, and a digital signature generated in the data providing apparatus, the data receiving apparatus being configured to receive the data set of which at least one data has already been processed and to verify the digital signature.

19. The data processing apparatus according to claim 18, wherein the processing rule includes a hierarchical structure having layers corresponding to respective states including a not-yet-processed attribute value and an already-processed attribute value, set for each attribute to be processed, and the at least one processor is further configured to execute the instructions to calculate, for the already-processed processing-target data, an intermediate hash value corresponding to a state of a layer higher than that of the attribute value of the not-yet-processed processing-target data in the hierarchical structure for a data sequence obtained by combining the not-yet-processed processing-target data and a first hash value corresponding thereto.

20. The data processing apparatus according to claim 19, wherein the at least one processor is further configured to execute the instructions to transmit, to the data receiving apparatus, a generalized hierarchical tree set in the data providing apparatus for each attribute to be processed, the generalized hierarchical tree having a hierarchical structure showing a rule for generalizing a not-yet-processed attribute value, and showing attribute values in such a manner that the higher a layer of an attribute value is, the more the attribute value has been generalized.

21. The data processing apparatus according to claim 20, wherein the at least one processor is further configured to execute the instructions to calculate, for a data sequence obtaining by combining an intermediate hash value and an attribute value in a layer corresponding to this intermediate hash value, an intermediate hash value corresponding to an attribute value in a layer higher than that of this attribute value in the hierarchical structure, and calculate an intermediate hash value corresponding to an attribute value corresponding to the already-processed processing-target data as the after-processing hash value corresponding to the already-processed processing-target data.

22. The data processing apparatus according to claim 20, wherein a state in which an attribute value of the processing-target data is deleted is set in a layer higher than a second layer from a top, the second layer being a layer in which an attribute value is most generalized in the generalized hierarchical tree.

23. The data processing apparatus according to claim 22, wherein the at least one processor is further configured to execute the instructions to:

calculate, for a data sequence obtaining by combining an intermediate hash value and an attribute value in a layer corresponding to this intermediate hash value, an intermediate hash value corresponding to a state of a layer higher than that of this attribute value in the hierarchical structure;

calculate, when generalizing processing has been performed for the processing-target data, an intermediate hash value corresponding to an attribute value corresponding to the already-processed processing-target data as the after-processing hash value corresponding to the already-processed processing-target data; and calculate, when deleting processing has been performed for the processing-target data, an intermediate hash value corresponding to a state of a highest layer in the hierarchical structure as the after-processing hash value corresponding to the already-processed processing-target data.

24. The data processing apparatus according to claim 18, wherein a processing rule for deleting a not-yet-processed attribute value is set for each attribute to be processed, and the at least one processor is further configured to execute the instructions to calculate, for the processing-target data that has already been subjected to deleting processing, a hash value calculated for a data sequence obtained by combining this processing-target data and a first hash value corresponding thereto as the after-processing hash value.

25. The data processing apparatus according to claim 18, wherein the at least one processor is further configured to execute the instructions to calculate, for an attribute value that has not been processed among the attribute values to be processed under the processing rule, a first hash value calculated for a data sequence obtained by using this attribute value and the random number set for this attribute value as the after-processing hash value.

26. The data processing apparatus according to claim 18, wherein the at least one processor is further configured to execute the instructions to calculate, for the processing-target data, a first hash value for a data sequence obtained by using this processing-target data, a random number set for an attribute value corresponding to the processing-target data, and an index for identifying the processing-target data.

27. A data receiving apparatus comprising:

at least one memory configured to store instructions; and at least one processor configured to execute the instructions to:

calculate, by using a data set including a plurality of data about at least one attribute, and an after-processing hash value corresponding to a respective one of processing-target data, calculated in a data processing apparatus, verification hash value corresponding to a respective one of the plurality of data, the data set being a data set of which processing-target data is data about an attribute to be processed under a processing rule which is set for a respective one of the at least one attribute in a data providing apparatus and has already been processed, the data providing apparatus being configured to provide the data set, and the data processing apparatus being configured to process at least one of the plurality of data; and verify the verification hash value and a digital signature generated in the data providing apparatus, wherein the after-processing hash value is calculated, for already-processed processing-target data, by calculating a first hash value for a data sequence obtained by using the not-yet-processed processing-target data and the random number which is set for an attribute value corresponding to this not-yet-processed processing-target data, calculating an intermediate hash value for a data sequence obtained by combining the not-yet-processed processing-target data and the first hash value, and calculating the after-processing hash value corresponding to the already-processed processing-target data by using the intermediate hash value.

28. The data receiving apparatus according to claim 27, wherein the processing rule includes a hierarchical structure having layers corresponding to respective states including a not-yet-processed attribute value and an already-processed attribute value, set for each attribute to be processed.

29. The data receiving apparatus according to claim 28, wherein the at least one processor is further configured to execute the instructions to calculate the verification hash value by using a generalized hierarchical tree set in the data providing apparatus for each attribute to be processed, the generalized hierarchical tree having a hierarchical structure showing a rule for generalizing a not-yet-processed attribute value, and showing attribute values in such a manner that the higher a layer of an attribute value is, the more the attribute value has been generalized.

30. An information processing method comprising:

by a data providing apparatus configured to provide a data set including a plurality of data about at least one attribute:

setting a processing rule for each of the at least one attribute;

setting a predetermined random number for each of states corresponding to a plurality of attribute values, the plurality of attribute values being values that processing-target data about an attribute to be processed can take under the processing rule;

calculating, for each of the plurality of data, a signature hash value corresponding to the data by calculating, for the processing-target data, a first hash value for a data sequence obtained by using the processing-target data and the predetermined random number set for the attribute value corresponding to the processing-target data, calculating an intermediate hash value for a data sequence obtained by combining the processing-target data and the first hash value, and calculating a signature hash value corresponding to the processing-target data by using the intermediate hash value, generating a digital signature by using the signature hash value; and transmitting the data set, the digital signature, and the predetermined random number to a data processing apparatus, the data processing apparatus being configured to process at least one of the plurality of data, by the data processing apparatus:

performing a process for processing the processing-target data;

calculating, for each of the processing-target data, an after-processing hash value corresponding to the processing-target data by calculating, for already-processed processing-target data among the processing-target data, a first hash value for a data sequence obtained by using not-yet-processed processing-target data corresponding to the processed processing-target data and the predetermined random number which is set for an attribute value corresponding to this not-yet-processed processing-target data, calculating an intermediate hash value for a data sequence obtained by combining the not-yet-processed processing-target data and the first hash value, and calculating the after-processing hash value corresponding to the already-processed processing-target data by using the intermediate hash value; and transmitting the data set of which the processing-target data has already been processed, the after-processing hash value corresponding to the processing-target data, and the digital signature to a data receiving apparatus, the data receiving apparatus being configured to receive the data set of which at least one data has already been processed, and by the data receiving apparatus:

calculating, for each of the plurality of data, a verification hash value corresponding to the data by using the data set of which the processing-target data has already been processed and the after-processing hash value; and verifying the verification hash value and the digital signature.

* * * * *